United States Patent
Lorden et al.

(10) Patent No.: US 8,909,494 B2
(45) Date of Patent: Dec. 9, 2014

(54) SELF CALIBRATING HOME SITE FUEL USAGE MONITORING DEVICE AND SYSTEM

(75) Inventors: Theodore J. Lorden, Dunstable, MA (US); Steven B. Siroonian, Abington, MA (US); Brandon L. Paul, Uxbridge, MA (US); John Merl Nelson, Holliston, MA (US)

(73) Assignee: Lorden Oil Company, Inc., Ayer, MA (US)

( * ) Notice: Subject to any disclaimer, the term of this patent is extended or adjusted under 35 U.S.C. 154(b) by 250 days.

(21) Appl. No.: 13/134,912

(22) Filed: Jun. 20, 2011

(65) Prior Publication Data

US 2012/0185197 A1    Jul. 19, 2012

Related U.S. Application Data

(60) Provisional application No. 61/398,444, filed on Jun. 25, 2010.

(51) Int. Cl.

| G01R 21/00 | (2006.01) |
| G01F 9/00 | (2006.01) |
| G01F 25/00 | (2006.01) |
| G01F 15/06 | (2006.01) |

(52) U.S. Cl.
CPC ............ *G01F 9/001* (2013.01); *G01F 25/0007* (2013.01); *G01F 15/063* (2013.01)
USPC ............................................. 702/100; 702/61

(58) Field of Classification Search
CPC .......................... H02J 2003/143; Y02B 30/762
USPC .................... 702/100, 61, 45, 55, 85; 701/102
See application file for complete search history.

(56) References Cited

U.S. PATENT DOCUMENTS

| 4,262,530 A | 4/1981 | Gerquest |
| 4,296,727 A | 10/1981 | Bryan |
| 4,530,247 A | 7/1985 | Haas |
| 4,839,790 A | 6/1989 | Fujimoto et al. |
| 4,845,486 A | 7/1989 | Knight et al. |
| 4,924,404 A | 5/1990 | Reinke, Jr. |
| 5,063,527 A | 11/1991 | Price et al. |
| 5,126,721 A | 6/1992 | Butcher et al. |
| 5,270,684 A | 12/1993 | Faraci, Jr. |
| 5,511,411 A | 4/1996 | Zegray |
| 5,515,297 A | 5/1996 | Bunting |
| 5,619,560 A | 4/1997 | Shea |

(Continued)

*Primary Examiner* — Michael Nghiem
*Assistant Examiner* — Eman Alkafawi
(74) *Attorney, Agent, or Firm* — John H. Pearson, Jr.; Walter F. Dawson; Pearson & Pearson, LLP

(57) ABSTRACT

A home site fuel monitor device in conjunction with a remote central site system to provide accurate fuel usage data used in planning fuel deliveries. The fuel monitor device is an internet based, compact, and low cost home heating site monitor device that is easily installed in the home heating site without modification to the home site's heating system. The monitor device includes a microprocessor which measures heating system run times using real time clock values. The microprocessor computes heating system fuel usage and the rate of fuel usage using heating system run times and heating burner parameters down loaded from the remote central site system. The monitor device continuously adjusts or recalibrates the rate of fuel usage defined as a burn coefficient value to coincide with the latest delivery information received from the central site system which results in increased accuracy over time.

7 Claims, 45 Drawing Sheets

(56) References Cited

U.S. PATENT DOCUMENTS

| | | |
|---|---|---|
| 5,885,067 A | 3/1999 | Jang |
| 6,023,667 A | 2/2000 | Johnson |
| 6,823,290 B2 | 11/2004 | Sakamoto et al. |
| 7,229,278 B1 | 6/2007 | Newberry |
| 7,295,919 B2 | 11/2007 | Humphrey |
| 7,305,875 B1 | 12/2007 | Pindus et al. |
| 7,533,703 B2 | 5/2009 | Shuey |
| 8,315,717 B2 * | 11/2012 | Forbes et al. .................. 700/22 |
| 2005/0190074 A1 | 9/2005 | Cumeralto et al. |
| 2006/0243347 A1 | 11/2006 | Humphrey |
| 2008/0033668 A1 | 2/2008 | Humphrey |
| 2011/0040785 A1 * | 2/2011 | Steenberg et al. ............ 707/769 |
| 2011/0082599 A1 * | 4/2011 | Shinde et al. ................. 700/295 |
| 2011/0153246 A1 * | 6/2011 | Donaldson et al. ............. 702/65 |

* cited by examiner

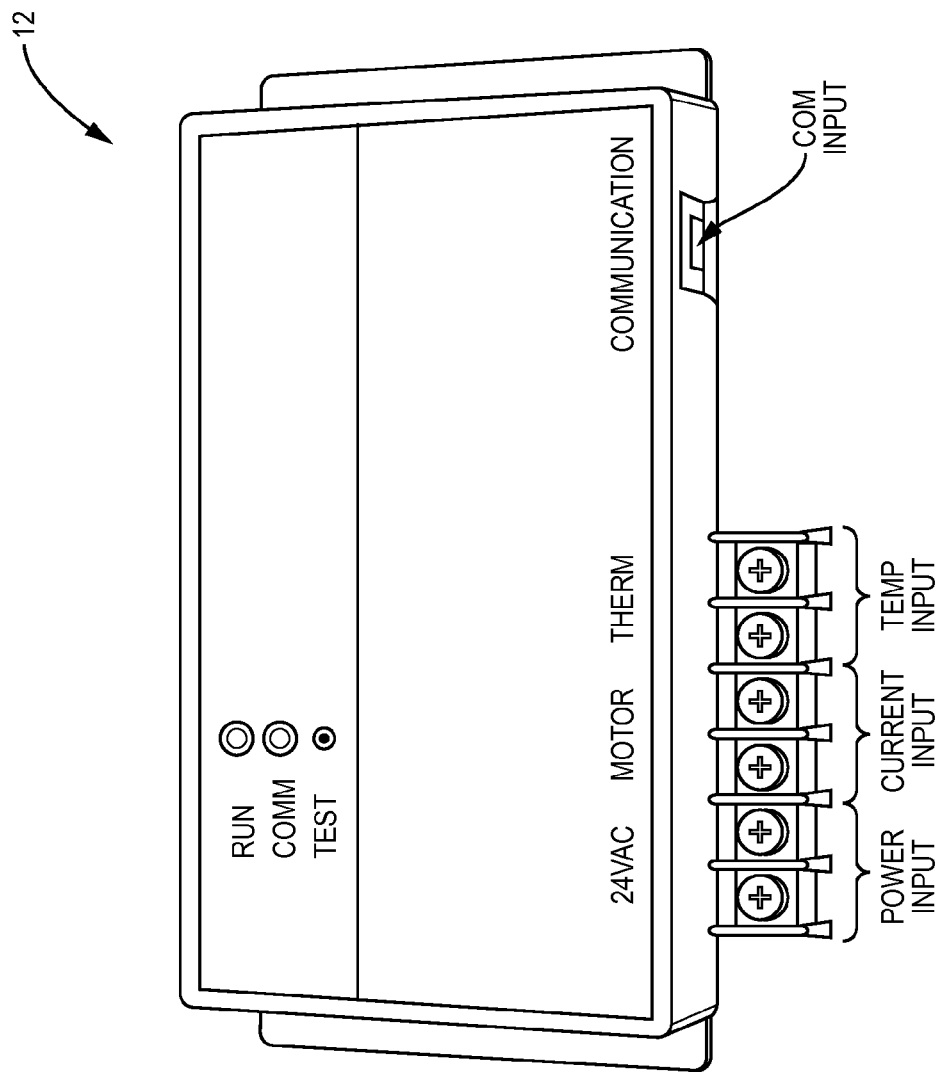

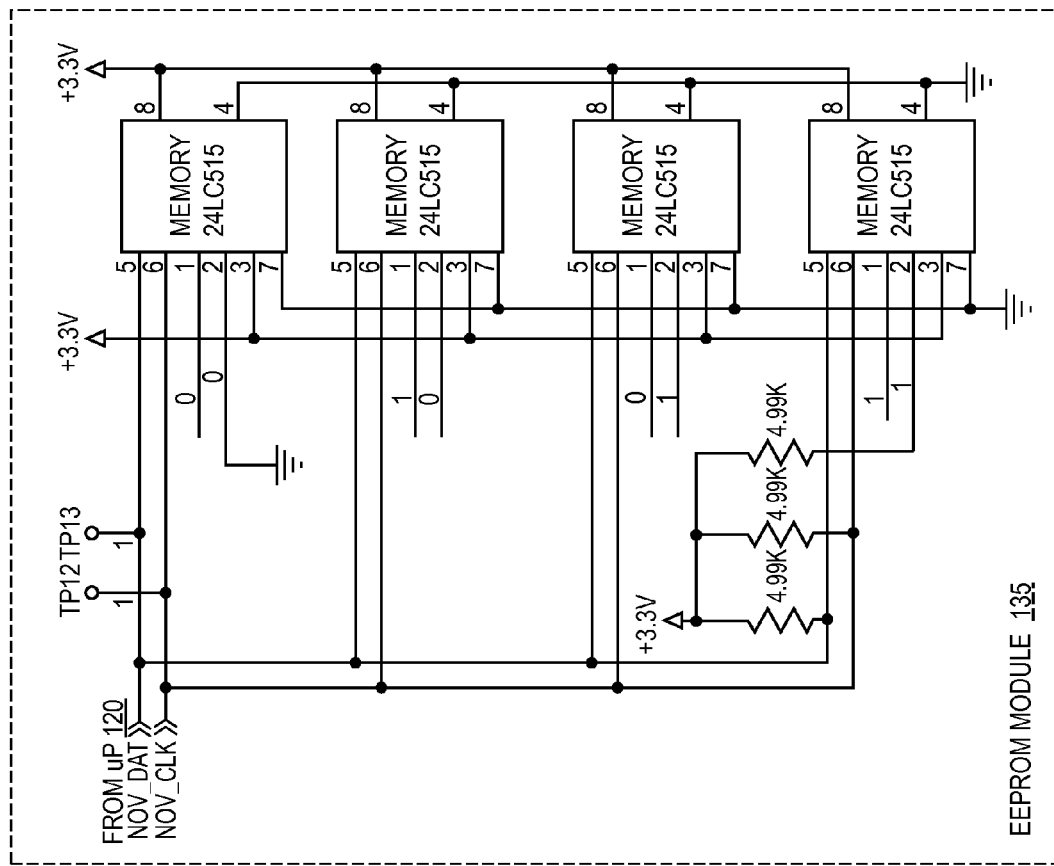
FIG. 2H
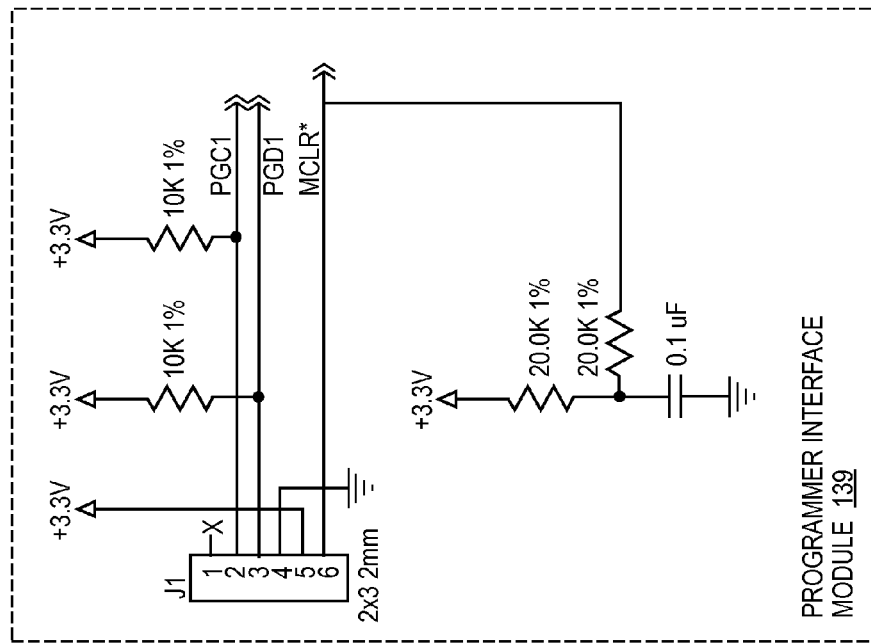

EEPROM MEMORY MODULE
Communication Parameter Information Area
    Internet Server Parameters

(Dial up Option Specific)
        ISP1 Telephone mode & number
        ISP1 Password
        ISP1 User name
        ISP2 Telephone mode & number
        ISP2 Password
        ISP2 User name FTP1 IP Number
        FTP Password
        FTP User name
        FTP2 IP Number
        FTP File name
        Download Directory
        Upload Directory

*Configuration Information Area*
    Call Schedule Parameters:
        Call in Start Time Window
        Call in End Time Window
        Normal_Frequency
        Critical_Error_Frequency
        Call In Last Time
        Call In Next Time
        Call In Cut Off Time
    Fuel Burner Parameters (BURN_PARMS):
        Burner Coefficient (BURN_Coef) (Bf)
        Burner Pre-Purge Time (BURN_Pre)
        Burner Post-Purge Time (BURN_Post)
    System Operational Status Data:
        High Current Threshold (HiCur)
        Tank Size (TankSize)
        Low Fuel Threshold (LowFuel)
        Programmable Call In Fuel Used Threshold
        (CIFI)
*Processed Information Area*
    Accumulated Run Data:
        Run Logs: Motor_Run_Time Data Structure
    Delivery Data:
        Delivery_Date
        Delivery_Date_Old
        Delivery_Time
        Delivery_Time_Old

Delivery Data Cont.:
    Delivery_Gallons
    Tank_Full_Flag

Results Data:
    Gallons Accumulated (Gallons_Accum)
    GallonsStatic_Sum
    Gallon ProgUsed_Sum
    Computed No. of Gallons Burned (Gr)
    No. of Gallons Delivered Since Last
      Fill up Delivery (Gu)
    Coefficient Filter Sum Accumulator (Ba)

Storage Area for Flags:

Storage Area for Run Records (Starts):

Home Site Device Initialization

Initialization Screen

| Field | Value |
|---|---|
| Serial # | 000001011 |
| Date Installed | 05/18/11 |
| Account Number | 123456 |
| Last Name | Smith |
| Street Address | 100 Main Street |
| City | Ayer |
| State | MA |
| Zip | 01432 |

Decommission This Monitor Device ☐

Primary ISP Information
- Phone Mode: 0
- Phone #: 1-800-123-4567
- User Name: user@isp.net
- Password: *******

Secondary ISP Information
- Phone Mode: 0
- Phone #: 1-800-444-1234
- User Name: user2@isp.net
- Password: *******

FTP Information
- #1 IP Address: 216.66.23.7
- #2 IP Address: 216.68.101.99
- User Name: ftpuser
- Password: *******

Heating System Information
- Tank Size: 275
- Nozzle GPH: .85
- Pre-Purge: 50
- Post-Purge: 50
- PSI: 160
- Burn Coefficient: 1.08
- Low Fuel Level: 0040
- High Current: 200

Timing & Frequency Control
- Call In Start Time: 1:00
- Call In End Time: 5:00
- Normal Frequency: 5
- Critical Error Frequency: 2

Programmable Gallons Used Threshold
- Gallons Used: 75

Directory Information
- Download
- Upload

Delivery/Inventory Information
- Delivery Date: 04/30/11
- Delivery Time: 12:32
- Initial Inventory: 100
- Tank Full ☐

[Save] [Cancel]

Status

FIG. 9

Critical Alerts

Status Data As Of 6/6/2011 3:00:16 PM

[Show Low Fuel Only] [Show All] [Show All Non-Critical] [Show Resets] [Show Alerts] [Show Low Temp]

☐ Green
▨ Red

| | Monitor ID | Status Date | Last Name | Address | City | Avg. Curr | Gals Used | Run Time | Low Temp | Reset | Low Fuel | Lock Out | RunRec Full |
|---|---|---|---|---|---|---|---|---|---|---|---|---|---|
| Select | 00000000001 | 12/1/2009 12:00:00 AM | Smith | 79 West River Street | Ayer | 005 | 0096.00 | 01101 | | | | | |
| Select | 00000000002 | 2/1/2010 12:00:00 AM | Adams | 15 Hersey Way | Townsend | 012 | 0110.00 | 00050 | | | | | |
| Select | 00000000003 | 1/1/2010 12:00:00 AM | Who | 275 Maine Street | Townsend | 008 | 0059.00 | 01000 | | | | | |
| Select | 00000000004 | 5/19/2011 1:13:25 PM | Peterson | 639 Granite Street | Townsend | 190 | 0055.00 | 00025 | | | | | |
| Select | 00000000005 | 5/19/2011 1:13:25 PM | Mariner | 67 South Lane | Groton | 017 | 0095.00 | 00054 | | | | | |

FIG. 10A

Non-Critical Alerts

Status Data As Of 6/6/2011 2:51:48 PM

[Show Low Fuel Only] [Show All] [Show All Critical] [Show Resets] [Show Low Temp]

☐ Green
▨ Yellow

| | Monitor ID | Status Date | Last Name | Address | City | Avg. Curr | Gals Used | Run Time | 100Gal Used | ProgGal Used | PushBut |
|---|---|---|---|---|---|---|---|---|---|---|---|
| Select | 00000000001 | 12/1/2009 12:00:00 AM | Smith | 79 West River Street | Ayer | 005 | 0096.00 | 01101 | | | |
| Select | 00000000002 | 2/1/2010 12:00:00 AM | Adams | 15 Hersey Way | Townsend | 012 | 0110.00 | 00050 | | | |
| Select | 00000000003 | 1/1/2010 12:00:00 AM | Who | 275 Maine Street | Townsend | 008 | 0059.00 | 01000 | | | |
| Select | 00000000004 | 5/19/2011 1:13:25 PM | Peterson | 639 Granite Street | Townsend | 190 | 0055.00 | 00025 | | | |
| Select | 00000000005 | 5/19/2011 1:13:25 PM | Mariner | 67 South Lane | Groton | 017 | 0095.00 | 00054 | | | |

SELF CALIBRATING HOME SITE FUEL USAGE MONITORING DEVICE AND SYSTEM

CROSS REFERENCE TO RELATED APPLICATIONS

This application claims the benefit of U.S. Provisional Patent Application No. 61/398,444, filed Jun. 25, 2010, the disclosure of which is incorporated by reference herein in its entirety.

BACKGROUND OF THE INVENTION

1. Field of the Invention

The present invention relates to fuel usage monitoring devices for electric motor operated heating systems and also to devices for detecting the occurrence of abnormal operations occurring in the operation of such systems.

2. Description of Related Art

It has been found desirable to monitor the operation of fuel heating systems such as oil fueled heating systems to keep track of the amount of fuel consumed and the amount of fuel remaining in the heating system fuel supply tank in order to prevent a heating outage. This becomes necessary since the fuel supply tank must be refilled periodically to ensure that an adequate supply of fuel is always available when needed. The decision to refill the fuel supply tank has been made traditionally by the fuel dealer based on historical usage and on recent weather conditions. Also, the decision to refill generally has been made by using estimates based on solely "degree days" that define probable fuel usage based on the record of daily outdoor temperatures. These approaches have been found to be imprecise and can cause in multiple deliveries resulting in increased dealer delivery costs both in terms of time and energy expenditures.

Alternative approaches have involved the use of devices installed or attached to a fuel supply tank such as fuel flow devices which measure the amount of fuel remaining in the fuel supply tank and provide manual or automatic reporting of such information to the fuel dealer. Examples of these types of systems include: U.S. Pat. No. 5,619,560 to Shea issued on Apr. 6, 1997; U.S. Pat. No. 5,515,297 to Bunning issued on May 7, 1966; U.S. Pat. No. 5,063,527 to Price et al issued on Nov. 5, 1991; U.S. Pat. No. 4,845,486 to Knight issued 1984; U.S. Pat. No. 5,885,067 to Jang issued in 1997; U.S. Pat. No. 5,511,411 to Zegray issued in 1996; U.S. Pat. No. 7,305,875 to Pindus et al issued on Dec. 11, 2007; U.S. Pat. No. 7,533,703 to Shuey issued on May 19, 2009 and U.S. Pat. No. 4,296,727 to Bryan issued on Oct. 27, 1981.

Another approach utilized involves collecting and recording fuel consumption data and reporting the recorded data to a remote central monitoring site. Using historical data of fuel deliveries and consumption and sensor supplied running information received from microprocessor devices installed at user heating system site locations, the remote central site system computes the fuel consumption and determines when the microprocessor devices should call and report again. Examples of this approach can be found in U.S. Pat. No. 6,023,667 to Johnson issued on Feb. 8, 2000 and U.S. Pat. No. 7,229,278 to Newberry issued on Jun. 12, 2007. It has been found that this approach still lacks some imprecision and can prove costly to heating system users.

Additionally, other approaches such as those of Humphrey described in U.S. Pat. No. 7,295,919 issued on Nov. 13, 2007 and patent applications 20060243347 and 20080033668 published on Nov. 2, 2006 and Feb. 7, 2008 respectively to disclose a system for delivering propane or other consumable liquid to remotely located storage tanks that provides remote monitoring of customer tanks and a method of using the remote monitoring data to optimally schedule deliveries, improve safety, and more efficiently operate a propane dealership. Such approaches provide solutions that are not directly applicable to heating systems that are electronically driven.

SUMMARY OF THE INVENTION

Accordingly, it is a primary object of the present invention to provide a more precise and less costly method and system for monitoring heating system fuel consumption and establishing fuel delivery times.

It is a further object of the present invention to provide a compact installable monitor device in a home heating site for monitoring heating system fuel usage.

It is still a further object of the present invention to provide a remotely located central site system for managing fuel consumption data received from a number of home heating sites.

It is still another object of the present invention to provide a home heating site monitor device capable of detecting abnormalities in the operation of the heating system being monitored and for transmitting data alert information to a remote central site system.

It is a more specific object of the present invention to provide a central site system which is capable of processing data alert information received from a number of home heating site fuel usage monitoring devices and generating multiple email notification messages.

The above and other objects are achieved according to an illustrated embodiment of the device, method and system of the present invention that includes a communications (e.g. internet) based compact home heating site monitor device which operatively connects to central site system for establishing bidirectional communications. The home monitor device is constructed to be low in cost and is easily installed in the home heating site without modification to the home site's heating system. Since the devices and system are internet based, the devices and system are capable of monitoring a broad range of in home processes, events and conditions in home sites covering a broad geographic area.

In the illustrated embodiment of the present invention, the home site monitor device includes a microprocessor programmed to periodically sample heating system motor AC current for measuring heating system run times measured using accurate real time clock values. According to the teachings of the present invention, the microprocessor computes heating system fuel usage in gallons per minute in addition to fuel usage rate using heating system run times and heating burner parameters including an initial burn coefficient value, pre and post purge values initially down loaded from the central site system and stored in memory by the device microprocessor. For each run time, the device microprocessor stores the corresponding computed fuel usage result and accumulates the results over a time. The home site monitor device microprocessor periodically checks a call schedule also previously down loaded from the central site system to determine if a call is to be made to the remotely located central site system.

When the call schedule indicates that a call is to be made, the home site monitor device performs a sequence or series of operations which includes a download operation followed by an upload operation. During the download operation, the home site monitor device downloads any new delivery data and any updated parameters from the central site system and recomputes the rate of fuel consumption defined by the burn coefficient value which is updated according to the received delivery data.

Following the download operation, the home site monitor device uploads to the remote central site system, the most recent computed fuel operation results since the last fill-up delivery along with the corresponding burn coefficient value. Also, the device uploads status data indicating the occurrence of any alert conditions (e.g. average motor current, total runtime, the total number of motor starts and error codes). The central site system processes the status data to determine the occurrence of any critical or abnormal conditions and displays them to a user for taking action.

By continuously recomputing the rate of fuel usage and recalibrating itself with the latest fill-up delivery information, the home site monitor device of the present invention is able to increase its accuracy over time. By providing the capabilities of "self adjustment" and communicating the results of such self adjustment to the central site system, the home site monitor device of the present invention provides more accurate fuel usage data defined by updated burn coefficient values based on actual fuel usage. This enables the central site system to devise more accurate fuel delivery schedules/routes utilizing accurate burn coefficient values and make more accurate estimates of fuel consumption through the availability of more accurate fuel usage data thereby resulting in increased efficiency over the above discussed prior art approaches.

The home site device of the illustrated embodiment utilizes microprocessor software routines to perform functions often implemented in external hardware devices such as integrated circuits. These functions include those used for monitoring heating system operations such as for example, the amplitude detection of heating system AC burner motor current. Additionally, microprocessor software routines are used to implement various communications functions (e.g. modem and application program interface) used for conducting bidirectional communications between the home site device and the central site system in an efficient manner. This results in being able to provide a simple internet capable "appliance that can be cost effectively produced and installed in volume.

Also, in accordance with the teachings of the present invention, the remote central site system of the illustrated embodiment that operatively connects to the home site devices includes an application server system, a system database and server in addition to an Internet based file transfer protocol (FTP) server. The FTP server provides the interface to the home site monitor devices of the present invention. In the illustrated embodiment, the application server system creates/generates initialization and other files containing control and configuration data to be used by a home site monitor device in communicating with the central site system and for carrying out its monitoring and fuel usage computation operations. The initialization file and other files are transferred to the FTP server 200 by the application server system for downloading by the monitor device.

In the illustrated embodiment of the present invention, the application server system is also connectable via the Internet to receive delivery data provided by a local or remote facility. During operation, the application server system continually searches for record files uploaded to the central site system by home site monitor devices. Each file located by the application server system is read and logged into a database accessed via the database server by the application server system.

A process running on the application server system analyzes monitor device uploaded data stored in the database and converts such data into a form appropriate for displaying status and alert conditions to a user. For example, this may include displaying selected different types of alert conditions using different colors. This process is accessible by personnel from any location through an Internet connection following the entering of appropriate login credentials by the user. Once logged in, the user can display all, some or just selected critical alert conditions data under the control of the process.

In accordance with the present invention, the application server system also includes a process for generating email notification messages for communicating critical alert conditions to personnel responsible for taking corrective action. The application server process can be programmed to generate multiple e-mail notification messages for such alerts.

Additional objects, features and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and which includes the following.

FIG. 2A illustrates in greater detail, the compact construction of the home site monitor device of FIG. 1A including the indicators and various heating system inputs that connect to the device.

FIG. 2C-2I illustrates the different circuits used to implement various module components of the device of FIG. 2A.

FIG. 3 shows in greater detail, the mapping of the EEPROM memory module component of the monitor device of FIG. 2A utilized for storing configuration and parameter information used by the home site monitor device.

FIG. 9 is a graphical display screen representation used in describing the initialization operation of home site monitor device using data generated by the central site system according to the system operation flow chart of FIG. 4A.

FIG. 10A and FIG. 10B are graphical display screen representations used in describing the display operations performed by the central site system of FIG. 1A.

DESCRIPTION OF ILLUSTRATIVE EMBODIMENT

FIG. 1A

Figure 1A:
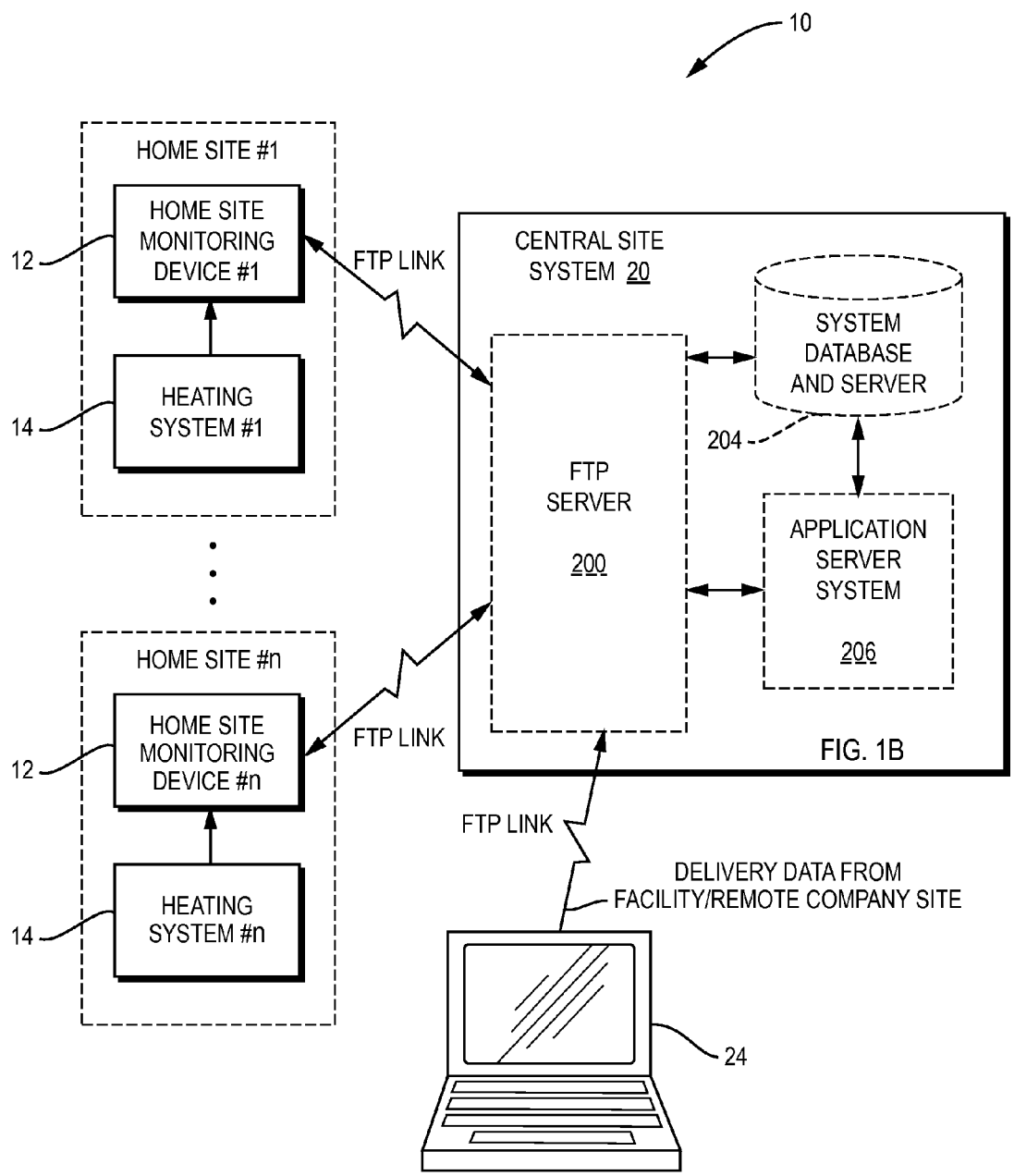
FIG. 1A is a block diagram of the illustrated embodiment of the system of the present invention that incorporates the home site monitor device, method and system of the present invention.

Referring to FIG. 1A, there is shown an illustrative embodiment of a system 10 that incorporates the device, method and apparatus of the present invention. As shown, system 10 includes a plurality of home site monitor devices 12 labeled 1 through n installed in a corresponding number of home sites represented by the dotted blocks. Each home site monitor device 12 connects to a heating system 14 and operates to monitor the operation of the heating system 14. Additionally, each device 12 operatively connects to communications network such as an internet based network over which the home site device 12 establishes two way communications with a central site system 20. Such two way communications are used to initiate file transfer protocol (FTP) operations (e.g. sequences of download and upload operations).

For example, at scheduled call-in time periods, each home site device 12 establishes communications with the central site system 20 and downloads files containing parameters and delivery data. The device uses to recalibrate itself by updating a burn coefficient value indicative of the heating system rate of fuel burning used to compute actual fuel usage with actual delivery data. Also, at such scheduled call-in time periods, each home site monitor device 12 performs an upload operation in which it transfers file records containing accumulated fuel usage and status data records from the time of the last fuel delivery to the central site system 20. The central site system 20 uses the fuel usage information provided by the home site device 12 to accurately determine when fuel deliveries should be made and delivery amounts for efficiently managing delivery scheduling as described herein.

Additionally, the central site system 20 processes and utilizes the status of alert conditions information received from each monitor device 12 to display color-coded alert status conditions and generate notifications. For example, in response to the detection of specific types of alert conditions, the central site system 20 generates a number of email notification messages to the appropriate personnel so that they are able to take appropriate actions pertaining to maintaining efficient operation of home site heating systems.

As shown in FIG. 1A, the central site system 20 includes an FTP server 200 component, an application server system 206 component and a system database and server 204 component. The FTP server 200 component connects through an Internet based link for receiving FTP transfers of delivery data maintained/hosted at a local or remote company facility/site represented a computer 24 which for example, in its simplest form may be a laptop computer 24 or like device. For the sake of simplicity, only a single computer is shown in FIG. 1A. The central site system 20 utilizes the fuel delivery data received from the computer to create file records containing fuel delivery data that are subsequently transferred to the home site monitor devices 12 during a device initiated download operation. As previously indicated, this data enables the home site monitor device 12 to reconcile fuel delivery time data with the fuel usage (run time) records it has been accumulating so that the fuel usage record data transferred to the central site system is based on actual fuel usage data. That is, as previously indicated, according to the present invention, the device 12 in response to each delivery fuel tank fill up operation performs a recalibration operation. This operation enables the device 12 to re-compute the burn coefficient value indicative of the fuel burn rate of heating system using the actual amount of fuel required to fill up the home site fuel tank as described herein. Thus, over time such as after a number of deliveries, the home site monitor device recalibration operations performed on such burn coefficient parameter value result in increasingly a more accurate indication of the fuel burn rate of the home site heating system as described herein.

FIG. 1B

Figure 1B:
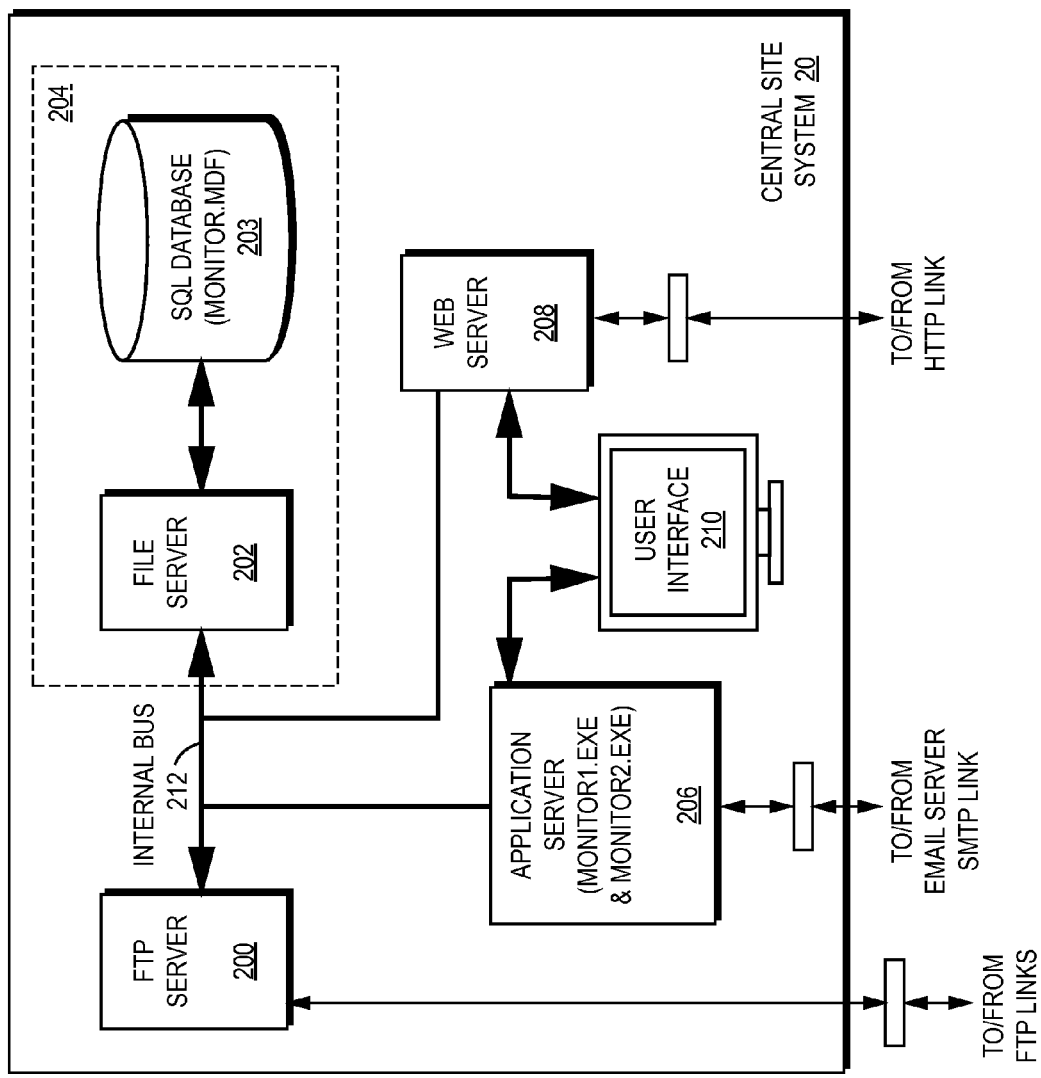
FIG. 1B illustrates in greater detail, the units that comprise a central site included in the illustrated embodiment of FIG. 1A.

FIG. 1B shows in greater detail the central site system 20 components of FIG. 1A. That is, FIG. 1B shows in greater detail, the organization of the plurality of servers 200, 208 application server 206 and database server 204. The database server 204 includes a file server 202 and standard SQL database system 203. The database server 204, application server 206, FTP server 200 and database server 204, all connect in common to an internal network 212 as shown. The FTP server 200 operatively connects to the Internet based network for carrying out the two-way communications between the home site devices 12 and the central site system 20.

The FTP server 200 runs an FTP server process that it uses to communicate via the standard FTP protocol with client processes running on the home site monitor devices 12. The file server 202 connects to the SQL database 203 (i.e. designated as MONITOR.MDF) as shown and responds to access requests from the FTP server 200, the application server system 206 and the web server 208. The application server system 206 runs a monitor process/program MONITOR1.EXE described in further detail herein that operates to monitor and decode data received by the FTP server 200 in response to calls received from the home site devices 12. As discussed herein, the application server 206 also operatively couples to a user interface in the form of a display unit 210 which enable a user to enter and receive prompting information as required for carrying out the various operations of the central site system. The display unit 210 is conventional in design and includes a standard keyboard and mouse device for entering and selecting data for viewing. The application server system 206 monitor process also performs the operations of fetching the data and storing it in the SQL database system 203 accessed via file server 202. Additionally, application server system 206 component connects to an email server SMTP link over which notification emails are communicated to field personnel. Also, the application server system 206 component runs a second process/program MONITOR2.EXE that operates to perform delivery and routing computations in accordance with the teachings of the present invention.

The web server 208 provides a web based interface for the application server system 206 and runs a process that feeds the data obtained from the SQL database 203 accessed via file server 202 to a display 210. The web server process operates to process and format the data for presentation to central site user personnel and off site authenticated users. As discussed in greater detail herein, the resulting displayed data includes the status of various operational conditions detected by a home site device 12 (e.g. critical alerts). Communications over the web based interface are implemented using the standard HTTP protocol. While FIG. 1B illustrates several different servers as hardware components, it will be appreciated to those skilled in the art that the web server and file server functions can also be implemented as processes running on the application server system 206 shown in greater detail in FIG. 1C sheet 1. In the illustrated embodiment, the application server 206 is a Microsoft Windows based system that runs on an HP server platform that utilizes an Intel Xeon 64 bit microprocessor that provides standard real time clock facilities in addition to other facilities. The Microsoft Windows based system provides a user interface that enables a user to enter, display and receive prompting information through display unit 210. It will be appreciated that other operating systems and platforms may also be used to implement server 206.

FIG. 1C

Figure 1C:
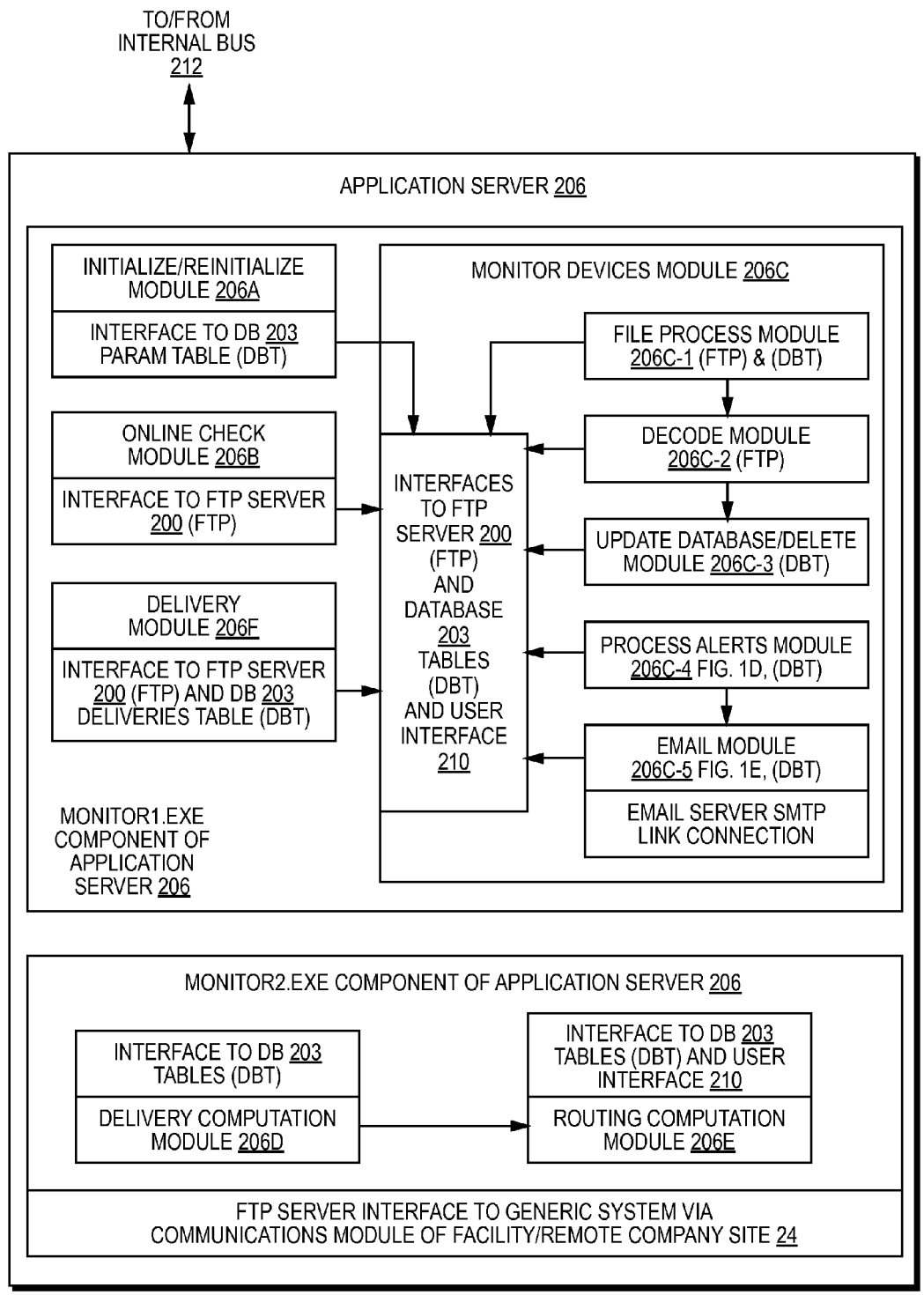
FIG. 1C illustrates in greater detail, the two major components of application server system of FIGS. 1A and 1B.

FIG. 1C shows in greater detail the organization of the modules included in the two major components identified as the MONITOR1.EXE and MONITOR2.EXE processes/programs that run on application server 206. The first major component MONITOR1.EXE will now be described.

MONITOR1.EXE

As shown, the first major component MONITOR1.EXE process/program includes modules 206A, 206B, 206C and 206F. The module 206A is an initialize/reinitialization module that has an interface to a Param Table included within database component 203 of FIG. 1F in addition to the user interface provided by display unit 210. The module 206A is used to initialize a monitor home site device 12 or re-initialize a home site device 12 by displaying on display unit 210 a screen of parameters utilized by an operator to create a text (e.g. initialization) file as discussed herein. As indicated, these parameters are obtained from the Param Table stored in SQL Database (Monitor.MDF) 203. Once these parameters are saved into the database 203 by the operator they are also written out to a text file (initialization file) by the MONITOR-.EXE component and are then saved on FTP server 200 component in a designated storage area that the device 12 is assigned to communicate/utilize. As discussed above, if the text file exists or has been stored on FTP server 200 when the device 12 communicates with the FTP server 200 component, the device 12 downloads the file and uses it to update the device's parameters according to the data included in the text file.

The module 206B is an online check module that has an interface to FTP server 200 component and to the user interface provided by display unit 210. The check module 206B scans/searches tables included in the SQL database (i.e. Monitoring_Index & Monitoring Tables) and checks/verifies the last time a home site device 12 called in to the FTP server 200 component to determine if a call in is not overdue. If it is over due, then the on-line check module 206B generates an alert message that it sent via an internal path not shown to the appropriate module included in monitor devices module 206C (i.e. sent to the email module 206C-5).

The on-line check module 206B performs the above operations by executing the following sequence of operations:

For Each Home Site Monitor Device
a. Retrieve 'Monitor_Status_1' from Monitoring_Index table to get most current monitor device_status_number
b. Retrieve current status from Monitoring table using the device monitor_status_number
c. Get Date_Time_Received from the Monitoring Table for the monitoring device
d. Compare Date_Time_Received to Current Date & Time obtained from server 206
e. If Current Date_Time is greater than or equal to the Date_Time_Received (i.e. last received communication status)+30 days then:
 1. Set Alert_type to 'No Comms'=True
 2. Save Alert in Monitoring Table
 3. Update Monitoring Index Table
 4. Read 'Recipients Table' for the Monitor Serial Number
 5. Send Information to Email Module containing:
  a. Monitor Serial Number
  b. For each Email Recipient
  c. Recipient Email Address, Alert Type.

The deliveries module 206F is a deliveries module that has interfaces to the FTP server 200 component, to the user interface provided by display unit 210 and to a deliveries table of database 203. The deliveries module 206F scans/searches area(s) of the FTP server 200 component for the presence of delivery information records (i.e. Delivs.txt) obtained from the local or remote facility 24 as described herein. The module 206F uses the delivery information to create new text files to be downloaded by the home site devices 12 and for updating the deliveries table as discussed in greater herein. The deliveries module 206F performs these operations by executing the following sequence of operations:

1. If file exists:
a. Open the file
b. For each record
 1. Create a new text file using the naming convention: serialnumber.txt (e.g. 00000012301.txt)
 2. Save the file on the FTP server 200
 3. Update the 'Deliveries Table' in the monitor.mdf database 203.

The structure for each text file is as follows: DLV: Delivery_Date, Delivery_Time, Tank_Full.

The module 206C is a monitor device module that has interfaces to the FTP server 200 component, the database 203 component, the user interface provided by display unit 210 and the email server HTTP link connection. As shown in FIG. 1C, the module 206C further includes a file process module 206C-1, a decode module 206C-2, an update database/delete module 206C-3, a process alerts module 206C-4, and an email module 206C-5. These modules operate in conjunction with the FTP server 200 and database interfaces in addition to the SMTP link connection as indicated by the designations FTP, DBT and SMTP link.

Considering these modules in greater detail, the file process module 206C-1 is the specific module that performs the functions of scanning/searching the areas of the FTP server 200 component looking for upload record files uploaded by the home site devices 12. Each time the module 206C finds a record file, it opens then reads the file contents which are passed on to the decode module 206C-2. The decode module 206C-2 decodes the different record types contained in the record file and converts the data contents into logical variables to be used by the update database/delete module 206C-3 in determining device detected status conditions and for updating the monitoring table of the database component 203 as described herein.

The update database/delete module 206C-3 updates all the entry fields in the Monitoring Table with all the record information resulting from the decode module 206C-2 having decoded file. During the write operation to the Monitoring table, the module 206C-3 generates a unique key as the key field for this new record being written into the table. Also, the module 206C-3 adds an address entry into an associated Monitoring Index table for the particular device 12 which points to the newly created record written into the Monitoring table. Once the database tables have been updated, the module 206C then deletes the file stored in the area of the FTP server 200 component assigned to the home site monitoring device.

The process alerts module 206C-4 scans/searches the database 203 component tables (i.e. Monitoring & Monitoring_Index) for the presence of alerts. If an alert is found, the module 206C-4 retrieves email recipient information from the database 203 component (i.e. Recipients Table) and sends the information to the email module 206C-5 by storing an appropriate alert entry in an Email Alerts table of the database 203 component for processing by email module 206C-5. The email module 206C-5 checks for new alert entries in the Email Alert table of the database 203 component. When a new alert is found, the email module 206C-5 generates an appropriate notification email message and sends the message out to the appropriate personnel via the SMTP link connection.

MONITOR2.EXE

As shown in FIG. 1C, the second major component MONITOR2.EXE primarily scans or searches for requests transmitted to and received from a "generic system" provided via a communications module included within the local or remote facility site 24. As shown, the MONITOR2.EXE process/program component includes a delivery computation module 206D and a routing computation module 206E. The MONITOR2.EXE component has an FTP server interface to the "generic system". Both modules 206D and 206E have an interface (shared or separate) to the database 203 component and to user interface provided by display unit 210.

Generic System and Communications Module

Before describing the modules 206D and 206E in greater detail, it is helpful to provide some background information and details about the "generic system" and the communications module referenced in FIG. 1C. The term "generic system" is used to refer to the fuel application software system that fuel companies commonly use for storing customer database information and for tracking and for determining when to make customer deliveries. Since control of the "generic system" of a fuel company may not be accessible, the fuel company's "generic system" is required to create text files of its delivery information (i.e. when deliveries are made) and to save the files on storage media accessible by the communications module included as part of the local/remote facility 24.

In greater detail, the "generic system" creates the text file (Delivs.txt) referenced about having the following structure:
Monitor Serial Number, Delivery_Date, Delivery_Time, Tank_Full
Example: 00000123010,2007/04/20,10:00,0100.50,F.

The file Delivs.txt can contain multiple device serial numbers (records). As discussed, once a Delivs.txt file is created, the "generic system" stores this file on a shared storage area of a network accessible by both the "generic system and communications module designated herein as the "MonitorComm1.exe Module". The MonitorComm Module serves as the communications interface between the "generic system" and the central site 20 and/or any other company site that is going to perform the monitoring device 12 operations according to the present invention.

Thus, the MonitorComm module is implemented as a separate piece of software code that runs on a computer on the same local area network that the "generic system" resides. Also, in this arrangement, a shared communications directory is provided which is accessible by both the "generic system" and the system (computer) on which the MonitorComm module is run or hosted. The directory path for the communications directory is stored in a configurable file designated as "xcomm.conf" that resides on in the same directory path as the communications module (MonitorComm).

The "generic system" also can include the capability of requesting an inventory or list of fuel tanks/home site devices 12 being monitored by the Central site system 20 and/or any other company site for aiding a dispatcher in deciding when and where to delivery fuel. This capability allows the "generic system" to create a file designated as (Tanks.txt) that lists such home monitor devices 12 having the following structure:

Account Number, Monitor Serial Number, Latitude, Longitude.
Example of Tanks.txt:
100156, 00000000012,42.77564, −71.36678
102345, 00000000009,42.56743. −71.36990
300009, 00000000101, 42.5589, −71.40000

The file Tanks.txt can contain multiple device serial numbers (records). When an ordered route is not desired, the Latitude and Longitude coordinate fields are left blank. In that case, the returning file will be optimized/organized in route order. Once a Tanks.txt file is created by the "generic system", it is stored on the shared area of the network for processing by the MonitorComm Module. The example implementation of the MonitorComm Module is illustrated in the Appendix section entitled "Communications Module.

Continuing with the description of the MONITOR2.EXE component of FIG. 1C, the delivery computation module 206D as discussed above scans or searches for requests transmitted to and received from the "generic system" via the communications module. In general, the generic system sends a text file (Tanks.txt) containing the list of monitor devices 12 for which it is requesting a return file containing a "K-Factor", Gallons Used and routing information for each listed device 12. Each return file record is formatted to include the device serial number, latitude and longitude. When routing information is not required then the latitude and longitude values are left blank.

Utilizing the accurate parameter values (i.e. actual gallons used since last delivery (GalsUsed) and burn coefficient (BURN_Coef) computed by the home site device 12 and included record information received from the monitor home site device 12, the delivery computation module 206D creates a computed "K-Factor" value according to the teachings of the present invention. Once the K-Factor values for all of the listed devices 12 are computed and verified, this information is passed on to the Routing Computation Module 206E. The module 206E operates to create an optimized route using a standard program product such as the Microsoft Mappoint route optimization API and then computes the distance from one home site device (account) to another. Upon completion of such computations, module 206E builds a new text file (Tanks2.text) for each listed home site device 12 that includes the following information:

Average motor current
Current gallons used since last delivery
Total run time in minutes
Total number of starts
Burn Coefficient
Alerts
Computed K-Factor
Computed Gallons Burned
Distance to next delivery stop.

The records are ordered according to the optimized route. The file is then sent to the FTP server 200 component by the routing computation module 206E whereupon it can be retrieved by the Communications module.

FIG. 1F

Figure 1D:
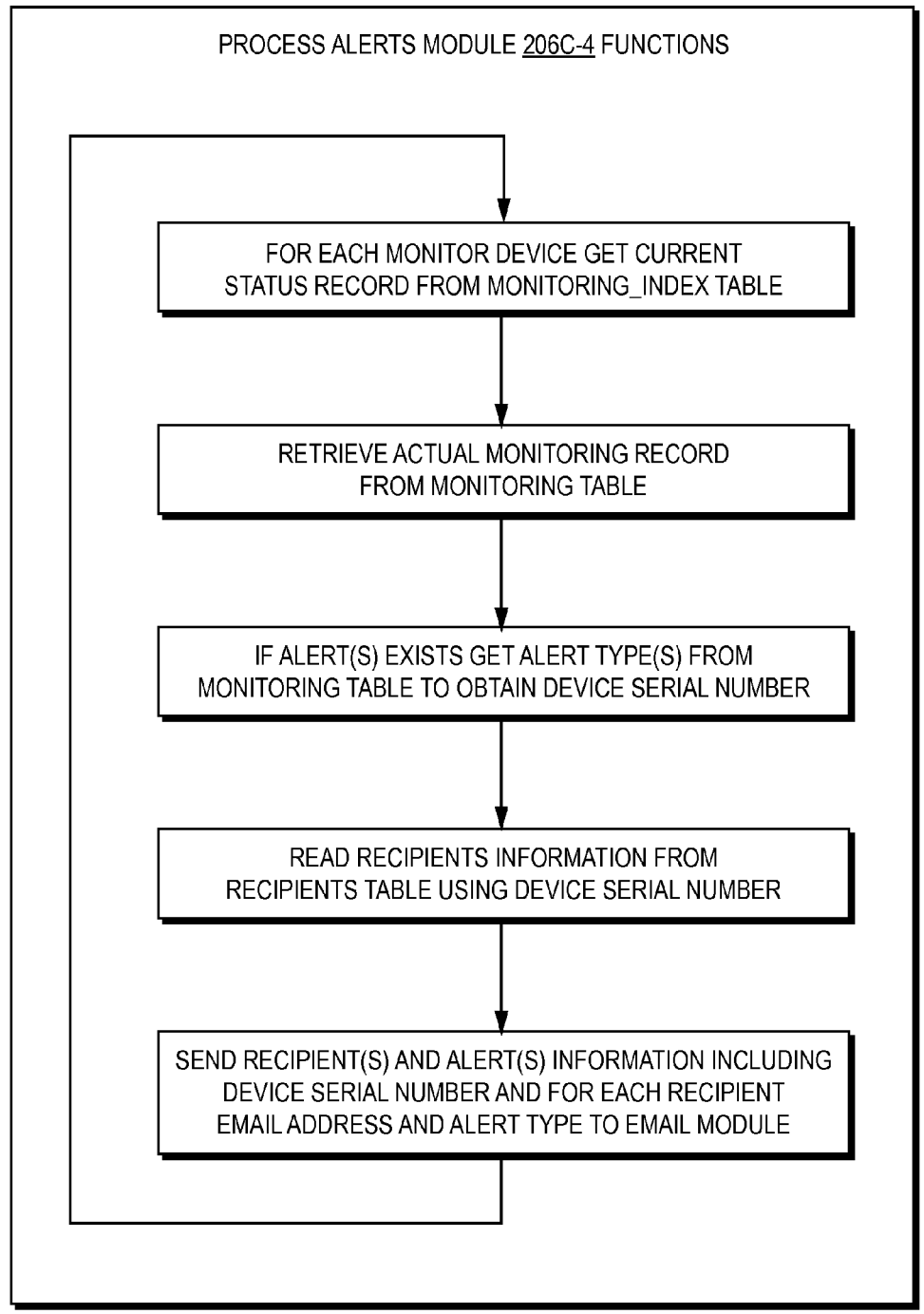
FIG. 1D AND FIG. 1E illustrate the functions performed by specific module components of FIG. 1C used in explaining the operation of the application server system of FIG. 1B.
Figure 1E:
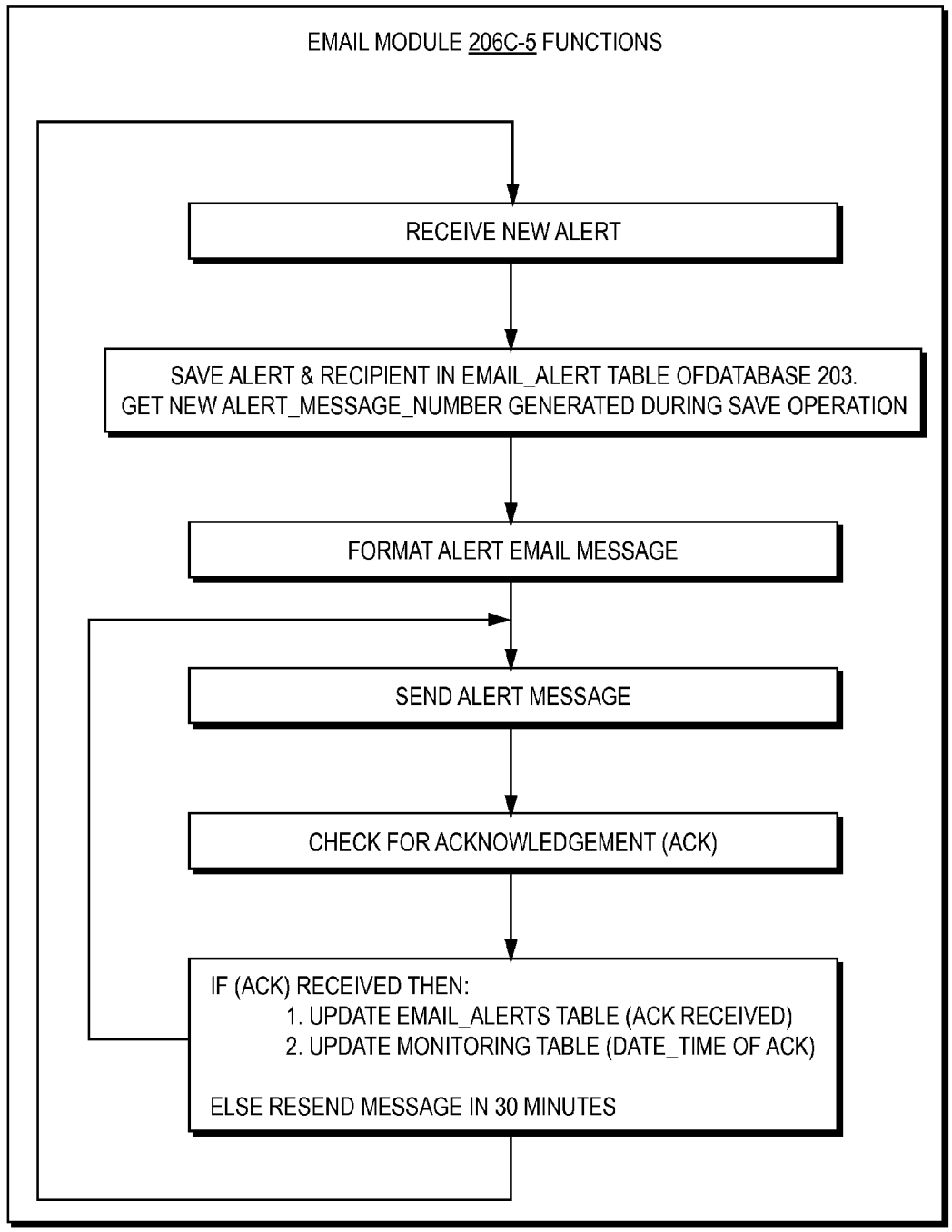
Figure 1F:
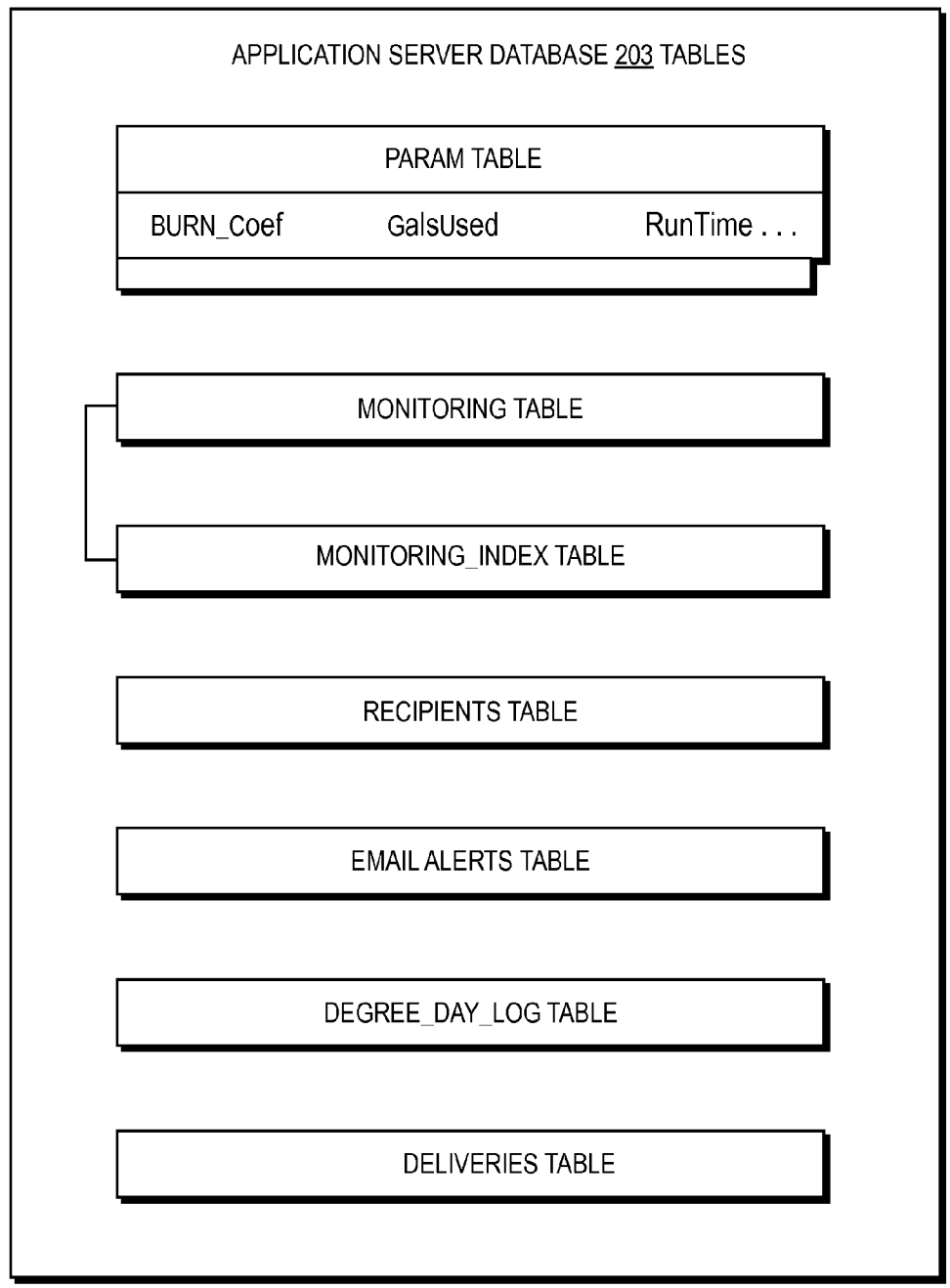
FIG. 1F illustrates in greater detail, the database component of the central site of FIG. 1B.

FIG. 1F illustrates in greater detail, the tables that comprise the database 203 component of FIG. 1B. As shown, these tables include a Param Table, a Monitoring Table accessible through a Monitoring_Index Table, a Recipients Table, an Email Alerts Table, a Degree_Day_Log Table and a Deliveries Table.

The Param Table stores the following information:

---

Field(0) 'Monitor_Id' (Monitor' Serial Number - Unique Key Field)
Field(1) 'Date Installed'
Field(2) 'Account #'
Field(3) 'Last Name'
Field(4) 'Street Address'
Field(5) 'City'
Field(6) 'State'
Field(7) 'Zip'
Field(8) 'ISP1_Phone_Mode'
ISP1_Phone_Number
ISP1_User_Name
ISP1_User_Password
ISP2_Phone_Mode
ISP2_Phone_Number
ISP2_User_Name
ISP2_User_Password
ISP1_IP_Address
ISP1_User_Name
ISP1_Password
ISP2_IP_Address
ISP2_User_Name
ISP2_Password
Field(8) 'Tank Size'
Field(9) 'Nozzle GPH'
PSI
Pre Purge
Post Purge
Low Fuel Level
High Current
Call In Start Time
Normal Frequency
Critical Error Frequency
Call In End Time
Initial Inventory (i.e. amount of fuel in tank)
Last Delivery Date
Last Delivery Time
Tank Full Y/N
GALS USED (Actual gallons used since Last Delivery)

---

The Monitoring Table of FIG. 1F is used to store each record of an upload file received from the monitor home sit devices 12. The table has sufficient storage for up to 100 of the most recent records for each monitor.

---

Field(0) 'Monitor Status_Number' (Auto Generated) - Unique Key Field
Field(1) 'Date_Time_Received' (Date/Time)
Field(2) 'Date_Time_Acknowledged' (Date/Time)
Field(3) 'Call Type' (Normal or Critical)
Field(4) '100 Gallons Used' (True or False)
Field(5) 'Programmable Gallons Used' (True or False)
Field(6) 'Pushbutton Pressed' (True or False)
Field(7) 'Average Motor Current' (string)
Field(8) 'Current Gallons Used Since Last Delivery' (string)

Appendix A in the upload file section, the variable name in the data structure is (GalsUsed)

Field(9) 'Total Run Time' since last delivery (string) shown in the upload file section of Appendix A represented by the variable name (Runtime) in the data structure.

Field(10) 'Total Number Of Starts' since last delivery (string) shown in the upload file section of Appendix A represented by the variable name (Starts) in the data structure.

Field(11) 'System In Reset' (True or False)

Field(12) 'Low Fuel' (True or False)

Field(13) 'High Current' (True or False)

Field(14) 'Low Temp' (True or False)

Field(15) "Burn Coeff" (string)

Field(16) 'No Comms' (True or False)—used to signify when the device 12 is not communicating with the FTP server 200 component.

The Monitoring_Index Table serves as an index table used for tracking pointers to the latest 100 calls received from a monitor home site device 12 for providing quicker access to the actual Status Records received from a specific home site device 12. The MONITOR1.EXE first reads the most current 'Monitor Status Number' (Field#1) from the 'Monitoring_Index'Table and uses it to then read the actual information from the 'Monitoring' Table. The other 'Monitor Status' records are stored for historical purposes.

The Monitoring_Index Table of FIG. 1F contains the following information:

---
Field(0) 'Monitor_Id' - Unique Key field (MonitorDevice's Serial Number)
Field(1) 'Monitor_Status_1' (Pointer to current Monitor Status Record - see monitoring table)
Field(2) 'Monitor_Status_2' (Pointer to $2^{nd}$ recent Monitor Status Record - see monitoring table)
Field(3) 'Monitor_Status_3' (Pointer to 3rd recent Monitor Status Record - see monitoring table)
.Field(100) 'Monitor_Status_2' (Pointer to 100th recent Monitor Status Record - see monitoring table).
---

The Recipients Table of FIG. 1F contains the following information:

---
Field(0) 'Monitor_Id' - Key field (Monitor's Serial Number)
Field(1) 'Email_Address_0'
Field(2) 'Notify_Low_Fuel' (True or False)
Field(3) 'Notify_Low_Temp' (True or False)
Field(4) 'Notify_High_Current' (True or False)
Field(5) 'Notify_System_In_Reset' (True or False)
Field(6) 'Email_Address_1'
Field(7) 'Notify_Low_Fuel' (True or False)
Field(8) 'Notify_Low_Temp' (True or False)
Field(9) 'Notify_High_Current' (True or False)
Field(10) 'Notify_System_In_Reset' (True or False)
.
.
.
Field(x) 'Email_Address_9' ( Storage for up to 10 email addresses).
---

The Email_Alerts Table of FIG. 1F contains the following information:

---
Field(0) 'Alert_Message_Number' (Auto Assigned-Unique Key)
Field(1) 'Monitor_Serial_Number (String)
Field(2) 'Monitor Status_Number' (from Monitoring Table)
Field(3) 'Acknowledged'.
---

The Degree_Day_Log Table of FIG. 1F contains the following information:

---
Degree_Day_Log Table
Zip Code, Date, Degree Day.
---

The Deliveries Table is used for storing the last 100 deliveries made to each home monitor device 12 site. The Deliveries Table of FIG. 1F contains the following information:

---
Field(0) ' Monitor_Serial_Number'
Field(1) ' Date_of_Most_Current_Delivery
Field(2) ' Time_Of_Most_Current_Delivery'
Field(3) ' Gallons_Delivered_Of_Most_Current_Delivery'
Field(4) ' Date_of_Most_Current_Delivery +1
Field(5) ' Time_Of_Most_Current_Delivery +1'
Field(6) ' Gallons_Delivered_Of_Most_Current_Delivery +1 '
Field(7) ' Date_of_Most_Current_Delivery +2
Field(8) ' Time_Of_Most_Current_Delivery +2'
Field(9) ' Gallons_Delivered_Of_Most_Current_Delivery +2 '.
.
.
.
Field(x) ' Date_of_Most_Current_Delivery +99
Field(x) ' Time_Of_Most_Current_Delivery +99'
Field(x) ' Gallons_Delivered_Of_Most_Current_Delivery +99. '
---

FIG. 2A

FIG. 2A illustrates the compact construction of home site device 12 which is housed by a plastic enclosure having a front panel machined to accommodate, inputs, outputs, LED display lamps and operator pushbutton switch. The home site device 12 can be easily installed into the heating system 14 without modification to the heating system 14 by simply connecting the appropriate inputs of the heating system 14 to the appropriate ones of the pairs of power, current and temp input terminals of the device 12 shown in FIG. 2A. A com input receptacle of the device 12 is used for connecting the device 12 to a communications telephone network As indicated in FIG. 2A, the device 12 is powered from a 24 volt AC source. The heating system burner sense input connection terminals of the device 12 include a burner motor (current sensing) and an input for an external temperature sensor such as a secondary Thermostat installed in the room as the primary Thermostat. The secondary Thermostat set point would be set below the primary Thermostat set point. If the secondary Thermostat detects a low temp based off its set point will close a relay that the home site will detect as a critical error and make a call to the central site system and report the Low Temp Detected "LoTemp" status error codes. device 12 also includes a pair of operator LED display lamps visible from the front panel that comprise two LED lamps labeled COMM and RUN as shown. During normal operation, the LED lamp (COMM) blinks at a 2.5 Hz rate and changes to a solid indication whenever the device 12 is communicating over the Internet based network. The other LED lamp (RUN) lights up whenever heating system 14 operation is detected. Both LED lamps blink together at a 2.5 hertz rate when the home site device 12 requires attention.

As shown in FIG. 2A, the device 12 further includes an operator test push button located on the device's front panel. The test push button when pressed for one-second initiates a normal call-in (e.g. dial-in) session immediately. This causes the device 12 to light up the front panel COMM LED lamp. Pressing the test push button and holding it down for 10 seconds causes the device 12 to reset all downloaded parameter variables to default values as discussed herein and to initiate a call-in (dial-in) operation to the central site system using the pre-programmed default values. The device 12 illuminates both LED lamps during this process. In the illustrated embodiment, the device 12 also includes a standard communications interface (e.g. TELCO) that connects to the telephone line. The interface in the case of a dial-up communications connection provides hook and control off-hook sensing as discussed herein.

FIG. 2B

Figure 2B:
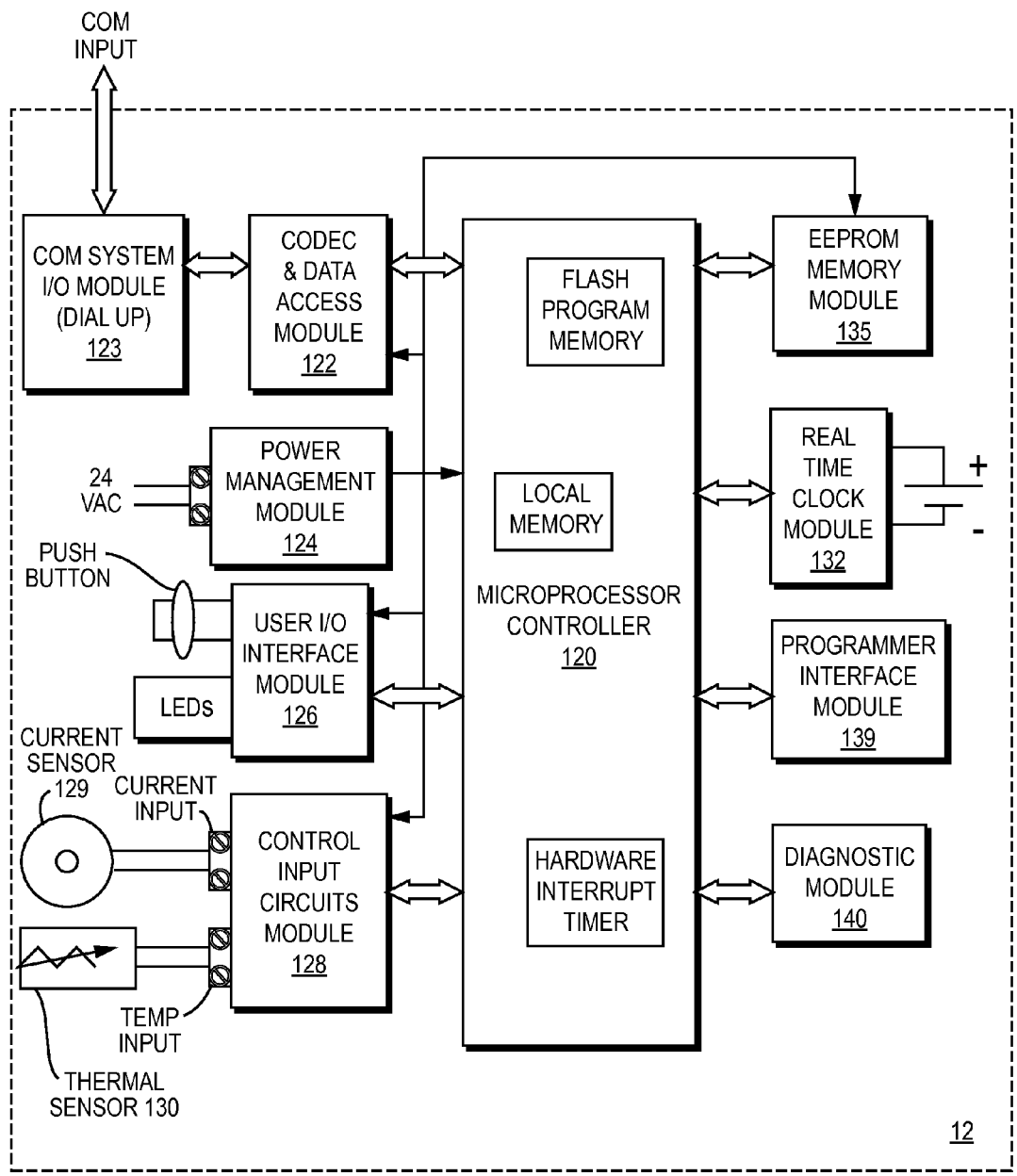
FIG. 2B is block diagram of the home site monitor device of FIGS. 1A and 2A illustrating the various module components that comprise the monitor device.

FIG. 2B is a block diagram of the plurality of module components that comprise home site device 12 that includes as a primary module component, a microprocessor controller module component 120. As shown, the microprocessor module component 120 connects to the remaining module components that include a CODEC and data access module component 122, a Com System I/O module 123 and a power management module component 124. Additionally, the microprocessor module component 120 operatively couples to: a user I/O interface module component 126; a control input circuits module component 128; an EEPROM memory module component 135; a real time clock (RTC) module component 137; a programmer interface module component 139 and a diagnostic module component 140 arranged as shown.

The microprocessor module component 120 utilizes a digital signal controller (DSC) which in the illustrated embodiment is a dsPIC33FJ256GP506 RISC chip manufactured by Microchip Technology Inc. Obviously, other types of chips may be used to implement the component 120. The microprocessor module component 120 includes all of the necessary circuits to interface to all of the other modules. As shown in FIG. 2B, microprocessor component 120 also contains a FLASH program memory for program storage, and a RAM local memory for performing internal data processing such as recalibration operations and processing file parameters as described herein.

As shown, the microprocessor module component 120 further includes hardware interrupt timer circuits for establishing time intervals during which various types of monitoring operations are to be performed. The microprocessor module component 120 chip (e.g. dsPIC33FJ256GP506) has sufficient processing power which is used to implement a software modem, FTP client application, a TCP/IP stack for Internet access, timers and timing and interrupt capability to implement real time processing of all circuit inputs and outputs. For further information on this chip, reference may be made to the publication DS70286A entitled "MICROCHIP ds33PICFJXXXGPX06/X08/X10 Data Sheet Copyright 2007 Microchip Technology Inc. or to the following URL: http://www.microchip.com/wwwproducts/Devices.aspx?dDocName=en024677.

Figure 2C:
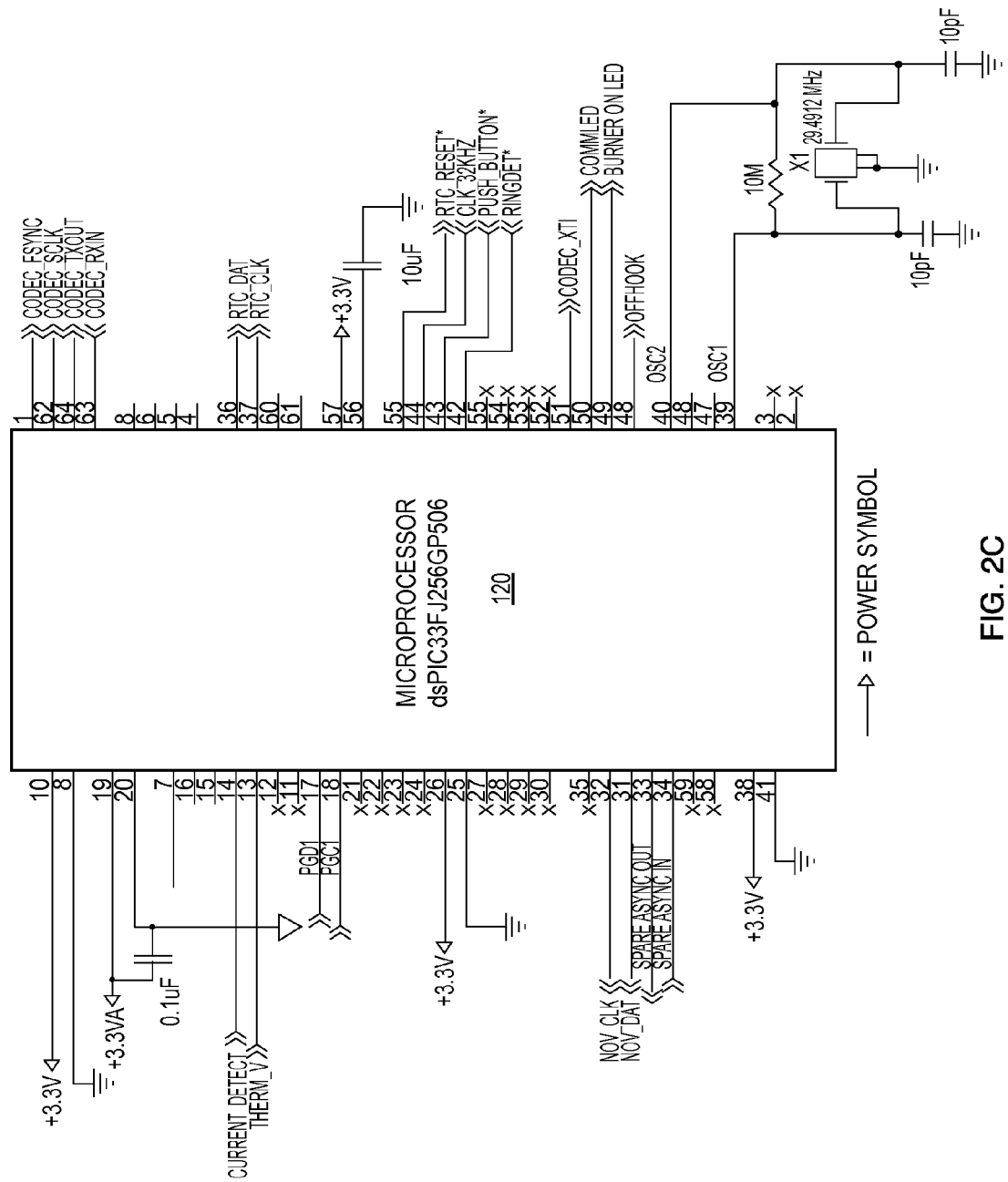
Figure 2D:
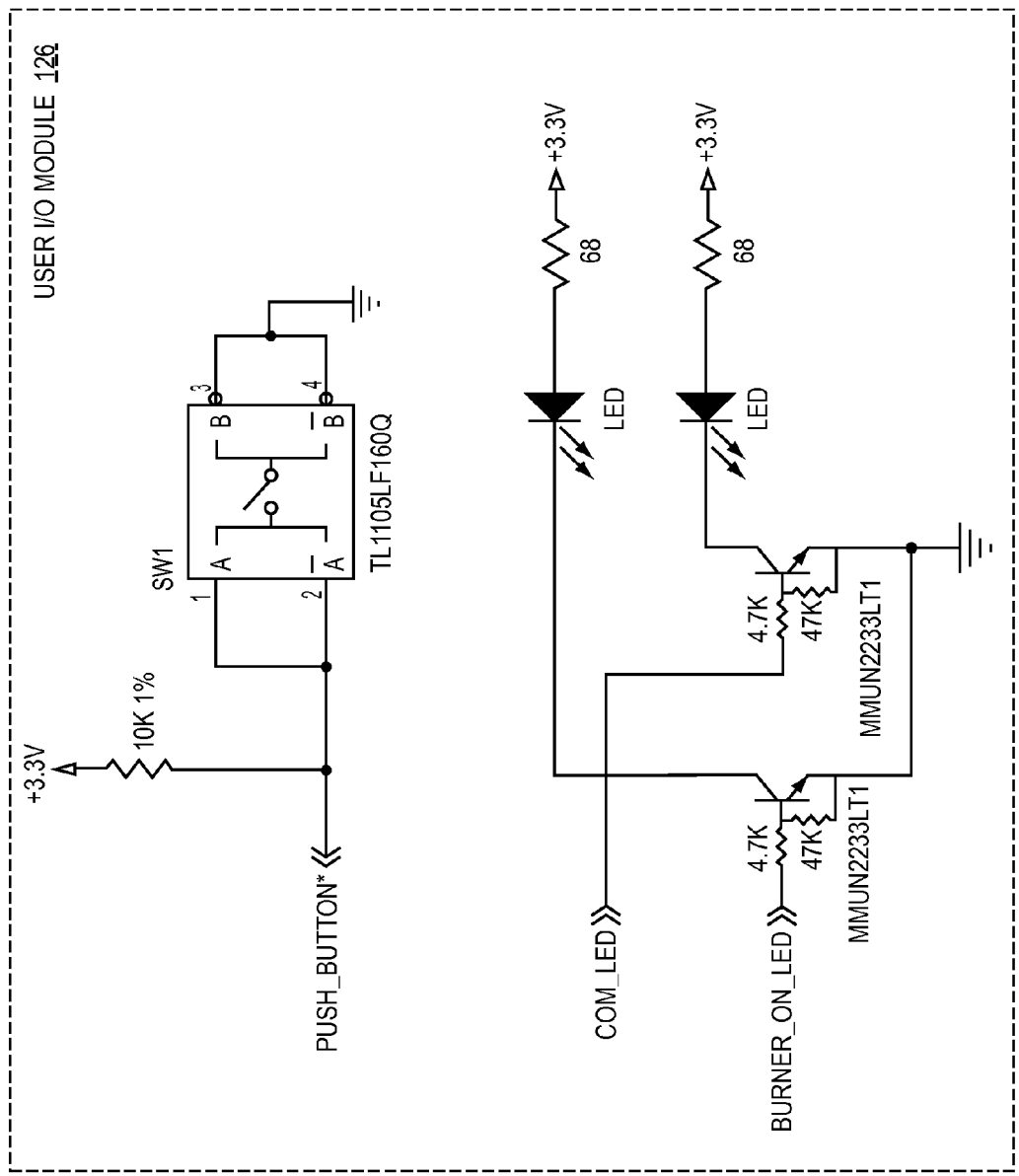
Figure 2E:
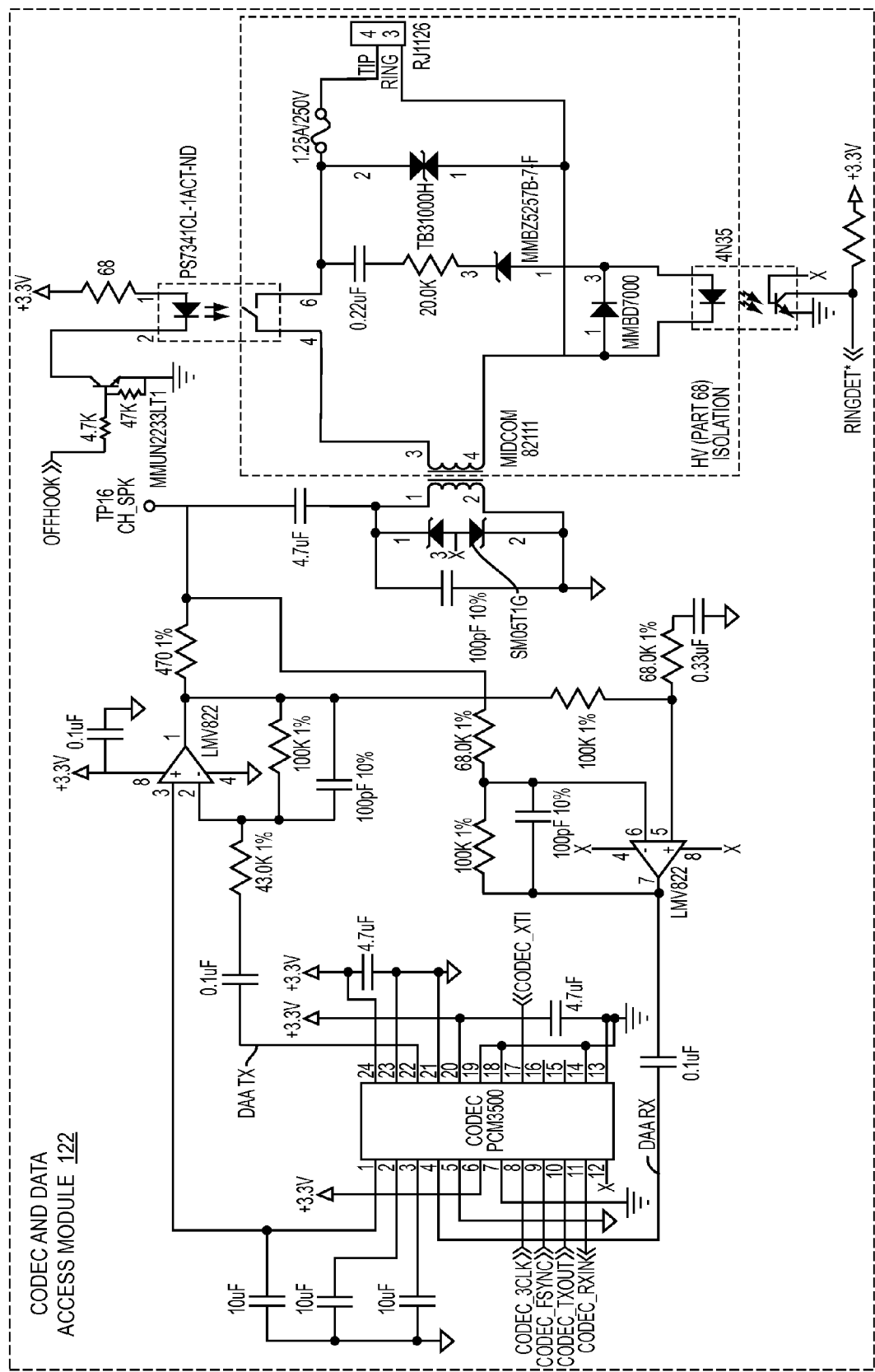
Figure 2F:
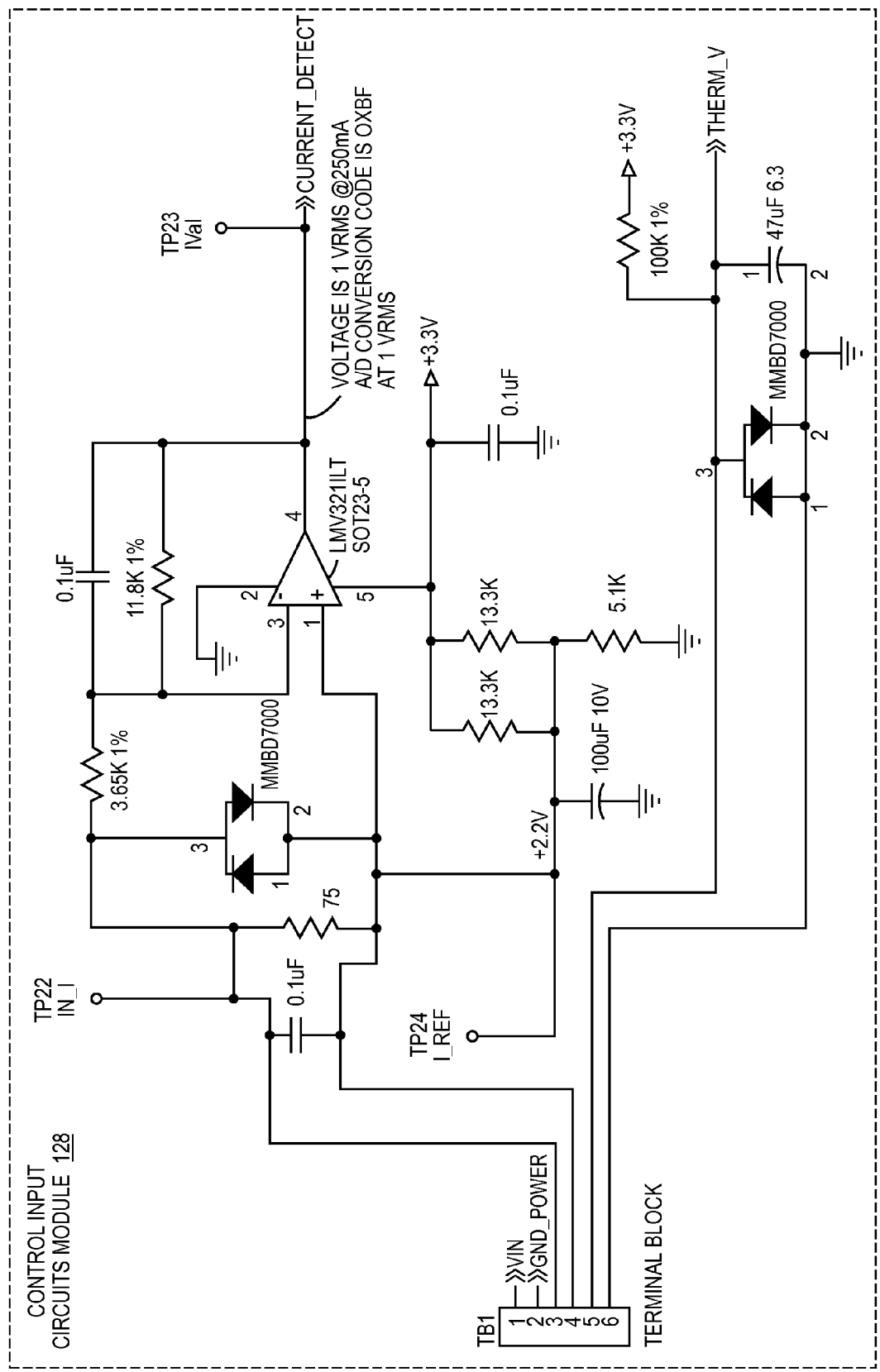
Figure 2G:
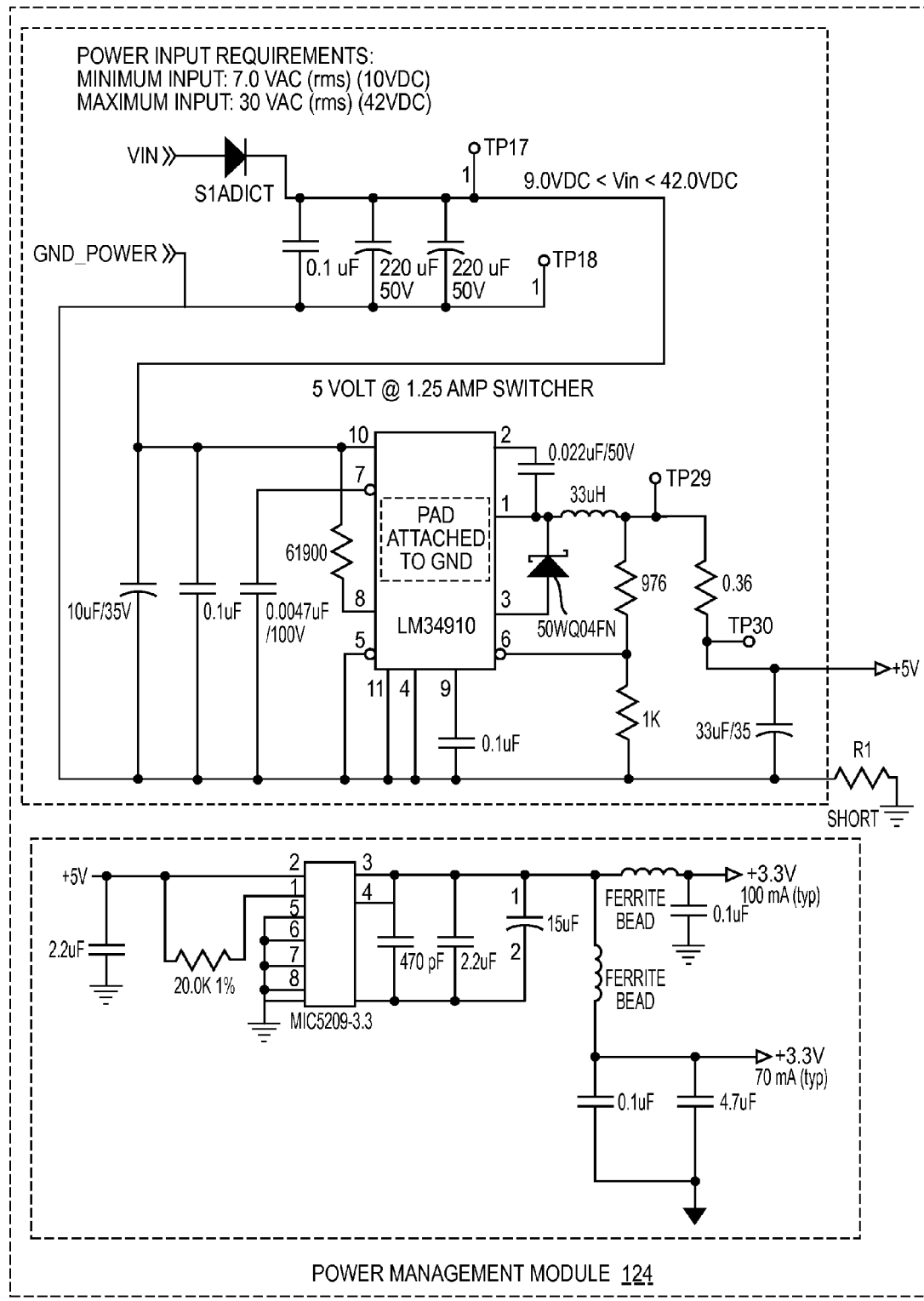
Figure 2I:
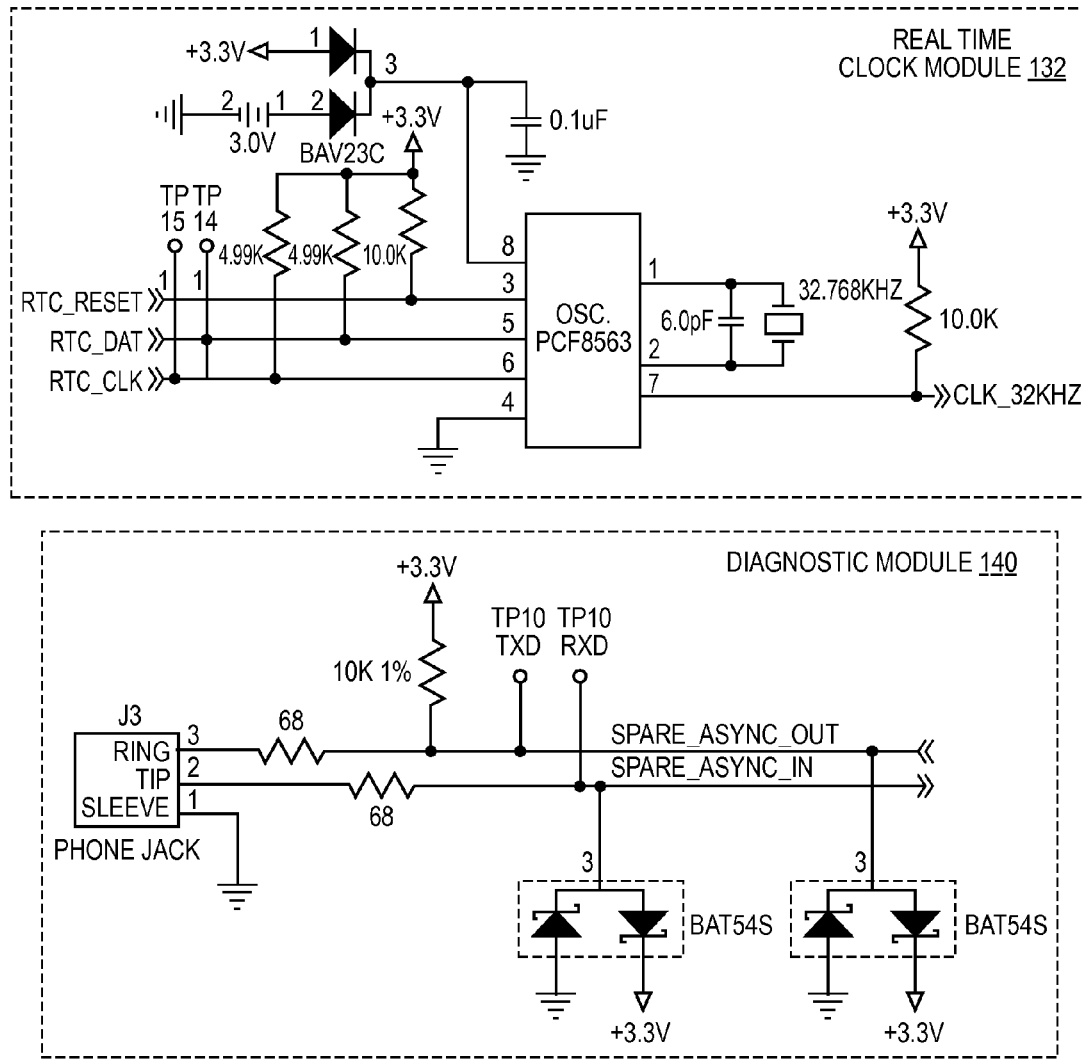
Figure 2J:
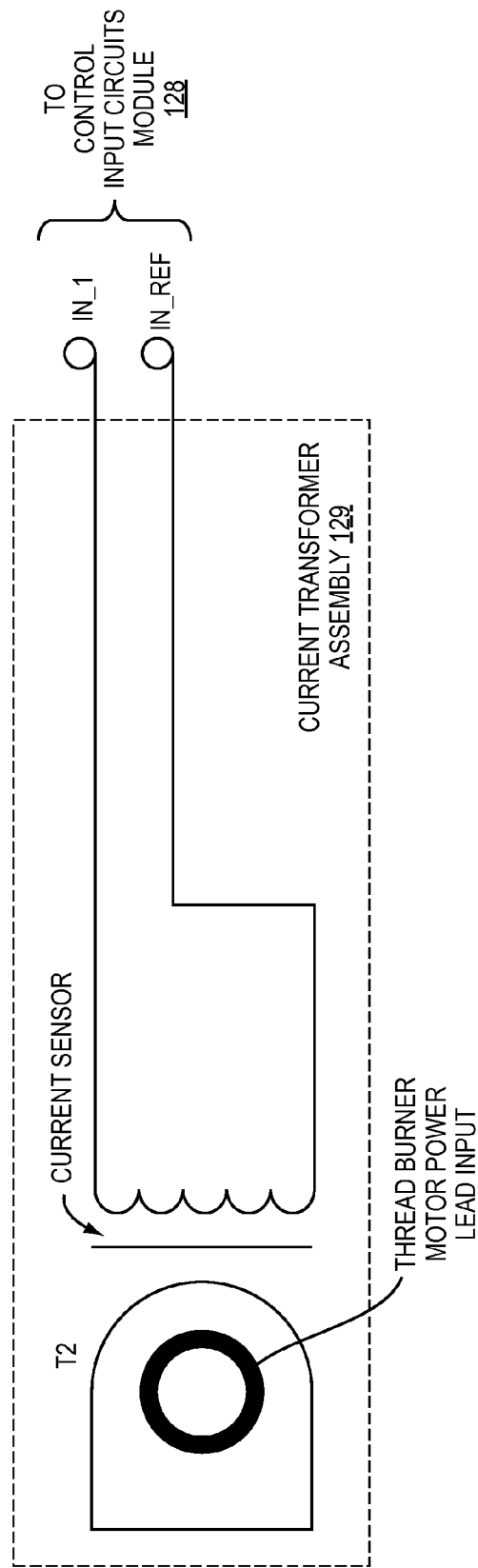
FIG. 2J shows in greater detail, the current sensor arrangement for coupling the home site heating burner system to a user I/O interface module component of the home site monitor device of FIG. 2A.
Figure 2K:
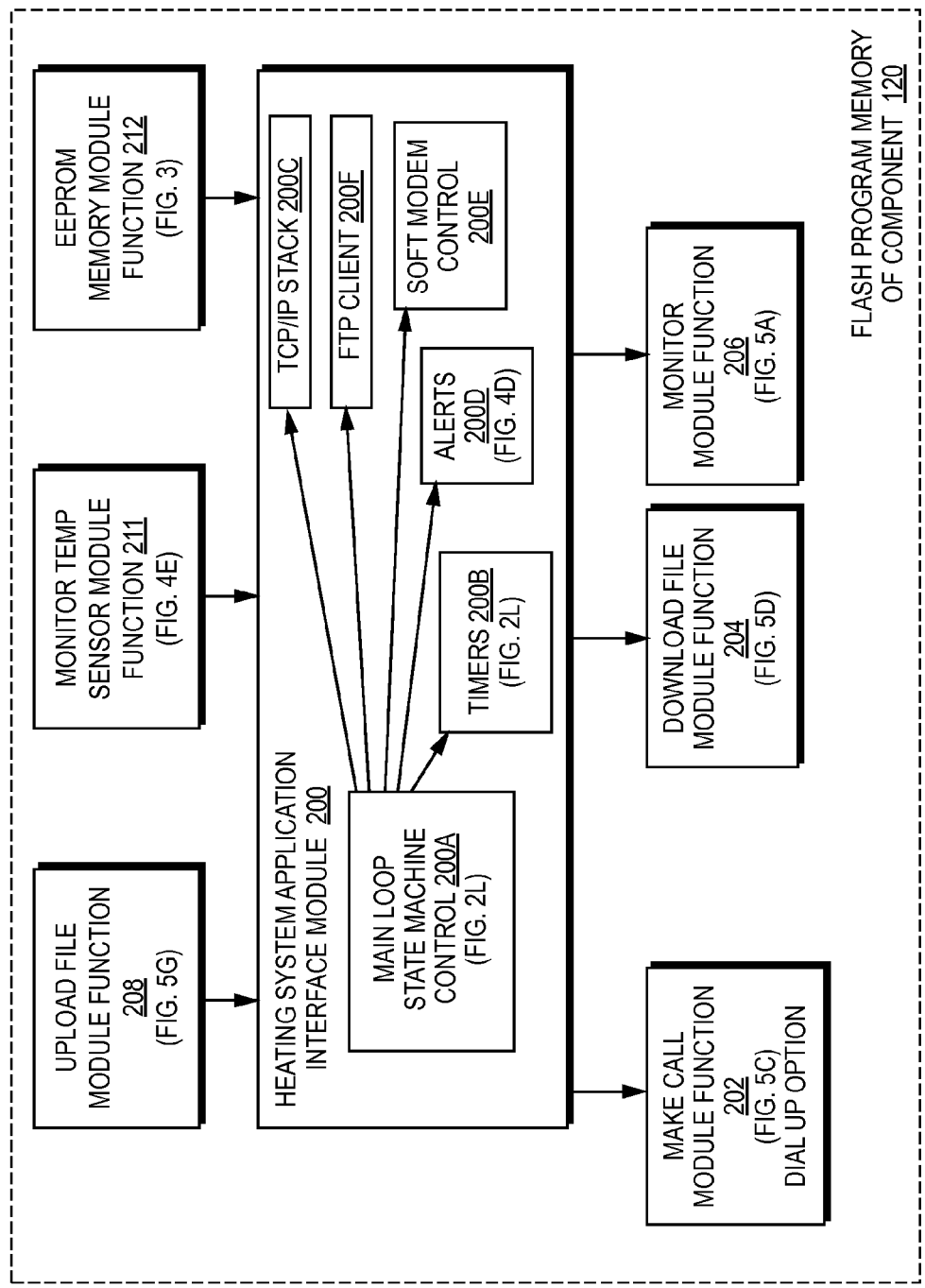
FIG. 2K shows the software module components included in the home site monitor device of FIG. 2A used in carrying out its functions according to the teachings of the present invention.

The microprocessor module component 120 utilizes software module components illustrated in FIG. 2K that perform the above and other functions. As indicted in FIG. 2K, the application program code for these components is stored in the FLASH program memory and executed from such memory. These functions in addition to the other functions will be described in greater detail in connection FIG. 2K. By way of background information, certain ones of these software module components perform software module functions for components such a TCP/IP stack software and soft modem software developed by Microchip Technologies Inc. that are made available from licensed software libraries. For further information about these libraries reference may be made to the Microchip Technology Inc. website at http://www.microchip.com.

As previously discussed, using microprocessor software routines to implement functions such as a communications FTP client application, TCP/IP stack, a software modem, a state machine control and an application program interface function that provides an interface to the various modules used for performing download, upload and monitoring operations results in a simple internet appliance which can be produced in a cost effective manner.

As shown in FIG. 2B, the CODEC and data access module component 122 connects to the Com System I/O module component 123 that provides the TELCO interface to a communications dial-in telephone network. The CODEC module component 122 performs the function of converting digital data to analog data and analog data to digital data. The digital data is data sent to/or received from the microprocessor controller module component 120. The digital data sent to the CODEC module component 122 is generated by the software modem module component of the microprocessor controller module component 120. The software modem module component includes routines that provide the capability of generating DTMF tones for dialing, as well as standard modem tones for data transmission. The data sent from the CODEC module component 122 to the microprocessor controller module component 120 is applied as an input to the software modem module component.

The Com System I/O module component 123 that provides the telephone interface performs the function of converting the data applied into and out of the CODEC module component 122 into a form that conforms to the requirements of a standard telephone interface. Additionally, the telephone interface includes standard circuits necessary for enabling the microprocessor controller module component 120 to place the telephone interface in an "off hook" state as well as enabling the module component 120 to detect a ring signal on the telephone line.

The power management module component 124 of FIG. 2A includes standard circuits that accept nominal 24 VAC input power and condition the module component 124 to provide the necessary voltages required by all of the internal circuits of the home site device 12.

The User I/O interface module component 126 includes standard circuits that provide conditioning signals for a push button input switch and LED lamp outputs. As previously discussed, the push button provides a means for causing the home site device 12 to initiate an immediate dial-in/communications session. The module component 126 also provides a means for resetting all down loaded parameter variables stored in the EEPROM memory module component 135 and for initiating a dial-in session using pre-programmed default values. As discussed, the LED lamps provide system status for indicating that the heating system motor is running, that the home site device 12 is connected to the Internet.

The Control Input Circuits module component 128 of FIG. 2A includes standard circuits that process the inputs from a current sensor circuit 129 connected to monitor the operation of the heating system motor (not shown). The current sensor circuit provides the microprocessor controller module component 120 with current information that can be used to determine the amount of time that the heating system motor is operating, as well as the amount of actual current being drawn by the heating system motor. Additionally, the circuits of module component 128 are connected to process signals received from the thermal sensor 130.

EEPROM memory module component 135 of FIG. 2A contains non-volatile storage for data required to be maintained at all times (i.e. in the event of a power outage). As shown in FIG. 3, this data includes but is not limited to, Call-in start and end times, Fuel usage in addition to other results data, telephone numbers for ISPs for dialup communications, passwords and other Internet access information. The use of this data will be described in connection with EEPROM memory map of FIG. 3.

The Real Time Clock (RTC) module component 132 contains standard real time clock circuits with independent battery backup power. This module component provides the microprocessor module component 120 software with access to real time information for performing such tasks as limiting dial-in times to specific time intervals, the logging of delivery times, etc.

The programmer interface module component 139 includes standard circuits that enable the programming of the microprocessor controller module component 120 for use in carrying out testing and debugging operations and load firmware to the microcontroller.

FIG. 2C Details Of Circuits of FIG. 2B

FIG. 2C-2I illustrate the specific circuits used to implement the module components of FIG. 2B. The individual circuits of each module component can be considered conventional in design and therefore, are not described in detail herein. Some components have been grouped together for ease of explanation. FIG. 2C illustrates the microprocessor module 120 component and FIG. 2D illustrates the user I/O module 126 component. As indicated in FIG. 2C-2I, the microprocessor controller module component 120 includes the microprocessor controller chip dsPIC33FJ256GP506 chip which is connected to receive inputs and supply outputs to different ones on the circuits contained in the module components of FIG. 2B. More specifically, the microprocessor chip receives the inputs PGC and PGD in addition to master clear MCLR from a programming interface module component 139 connector. Also, output SPARE_ASYNC_OUT signal and input SPARE_ASYNC_IN that serve as UART transmit and receive signals shown in the diagnostic module component 140 connector of FIG. 2I are used to apply asynchronous signals to and from pins 34 and 33 of the microprocessor chip 120 as shown. Additionally, the control input circuits module component 128 of FIG. 2F described herein applies sensor inputs CURRENT DETECT and THERM_V to other inputs of the microprocessor chip.

As shown, the microprocessor controller chip provides a plurality of control outputs CODEC_FSYCH, CODEC_SCLK, and CODEC_TXOUT for application to the CODEC and Data Access module 122 component circuits of FIG. 2E and receives from the module component 122, the receive input CODEC_RX. Additionally, the microprocessor chip provides off-hook and external timer signal inputs OFF-HOOK and CODEC_XTI for application to the CODEC module 122 and receives there from, the input ring detection signal RINGDET.

As shown, the microprocessor chip also provides a plurality of control outputs RTC_DAT, RTC_CLK, AND RTC_RESET as inputs to the RTC module component 132 of FIG. 2I. Also, the microprocessor chip provides data and clock outputs NOV_CLK and NOV_DAT as inputs to the EEPROM memory module component 135 of FIG. 2G as shown. Additionally, the microprocessor chip provides voltage outputs to the LED lamp driver circuits and inputs to the push button switch included in the User I/O interface module component 126 of FIG. 2D.

The implementations of the different module components will now be described. FIG. 2I illustrates the implementations of the Real Time Clock module 132 component and the diagnostic module 140 component. It is seen from the figure that the RTC module component 132 of FIG. 2B includes a PCK8563 oscillator chip that provides a 32.768 kilohertz clock signal output CLK_32 KHZ and receives the previously mentioned control inputs RTC_RESET, RTC_DAT, and RTC_CLK from the microprocessor module component 120. The PCK8563 chip is a CMOS real-time clock/calendar that includes a programmable clock output, an interrupt output and a low voltage detector. It provides as an output, year, month, day, weekday, hours, minutes and seconds based on a 32.768 kHz quartz crystal.

The EEPROM memory module component 135 of FIG. 2H includes 4 24LC515 memory chips organized as a 256K×8 (512K-bit) bit memory. The EEPROM memory module component 135 as mentioned receives the clock and data inputs NOV_CLK and NOV_DAT.

The CODEC and Data Access Module component 122 of FIG. 2E includes a PCM 3500 chip which is a low cost, 16 bit CODEC unit that includes all of the functions needed for a modem or voice CODEC unit and that provides a synchronous serial interface to the microprocessor controller chip. The voltage output VOUT (Pin 22) of the PCM3500 chip is applied as an input to a first operational amplifier circuit LMV822 chip. This circuit is a low voltage low power operational amplifier circuit that in turn applies an output to the VIN input (Pin 4) of the PCM3500 chip. A further output from the first amplifier circuit LMV822 chip is applied to the primary winding of a transformer circuit whose secondary winding connects to a ring detection circuit. This circuit receives the OFFHOOK input from the microprocessor module component 120 chip and TIPRING inputs from an input connector. The CODEC module component 122 ring circuits generate the ring detector output RINGDET which is applied to the microprocessor module component 120 chip as shown.

The circuits of power management module component 124 are shown in FIG. 2G. These circuits include converter circuit chip LM34910 which is a high efficiency switching regular circuit (dc/dc converter circuit). As shown, the circuit receives a VAC signal input VIN which it converts into a 5 VDC output signal that is applied to input pin 2 of a MIC5208 3.3 volt voltage regular chip. This chip is a linear voltage regulator circuit that generates an output 3.3 volts signal that is applied to a low ripple circuit configuration consisting of two pairs of series inductor-capacitor LC circuits (i.e. ferrite bead and 0.1 uF capacitor and ferrite bead and 0.1 uf and 4.7 uF capacitors connected in parallel as shown. These LC circuits provide the 3.3 volts and 3.3 VA signal power outputs for distribution to the circuits of the above discussed module components. For further information regarding circuit LM34910 and the above discussed operation, reference may be made to the publication designated as DS201109 entitled "High Voltage (40 v, 1.25) Step Down Switching Regulator, Copyright 2005 National Semiconductor Corporation.

The circuits of control input circuits module component 128 are shown in FIG. 2F. These circuits include an input current sensing operational amplifier circuit LMV321LT chip. This chip is a low power single operational amplifier circuit and is connected to receive the current sense inputs from an input connector TB1. The circuit measures motor sensor current draw relative to a pre-established reference input. The amplifier circuit chip generates a current detector voltage output CURRENT_DETECT which is applied to the circuits of the microprocessor module component 120. Additionally, the module component 128 includes a diode circuit network arrangement which is used to generate the thermal voltage output THERM_V also applied to the circuits of microprocessor component 120 in response to the thermal sense inputs received from a connector TB1 as shown.

FIG. 2J illustrates in greater detail, the construction of the current sensor 129 of FIG. 2B. As shown, the sensor 129 includes a current transformer assembly. The primary of the transformer assembly couples to a power lead of heating system 14 motor that passes there through as indicated. The secondary of the current transformer assembly connects to the control input circuits module component 128 as shown in FIG. 2J.

FIG. 2K

FIG. 2K illustrates the specific primary software module component/function that are utilized by the microprocessor controller module component 120. As shown, these module components include an application interface module component 200. This module component serves as an interface to the remaining module components that include a make call module component 202, a download file module component 204, a monitor module component 206, an upload module component 208, a monitor temp sensor module component 211 and a control EEPROM module component 212. As shown, the application interface module component 200 includes software components 200A through 200F. These components correspond to a main loop state machine control software component 200A, a software timers component 200B, a TCP/IP stack software component 200C, an alerts software component 200D, a soft modem control software 200E and a FTP client software component 200F. The operations/functions performed by the module components are shown in greater in the figures indicated in FIG. 2K and will be described in connection with those figures.

FIG. 2L

Figure 2L:
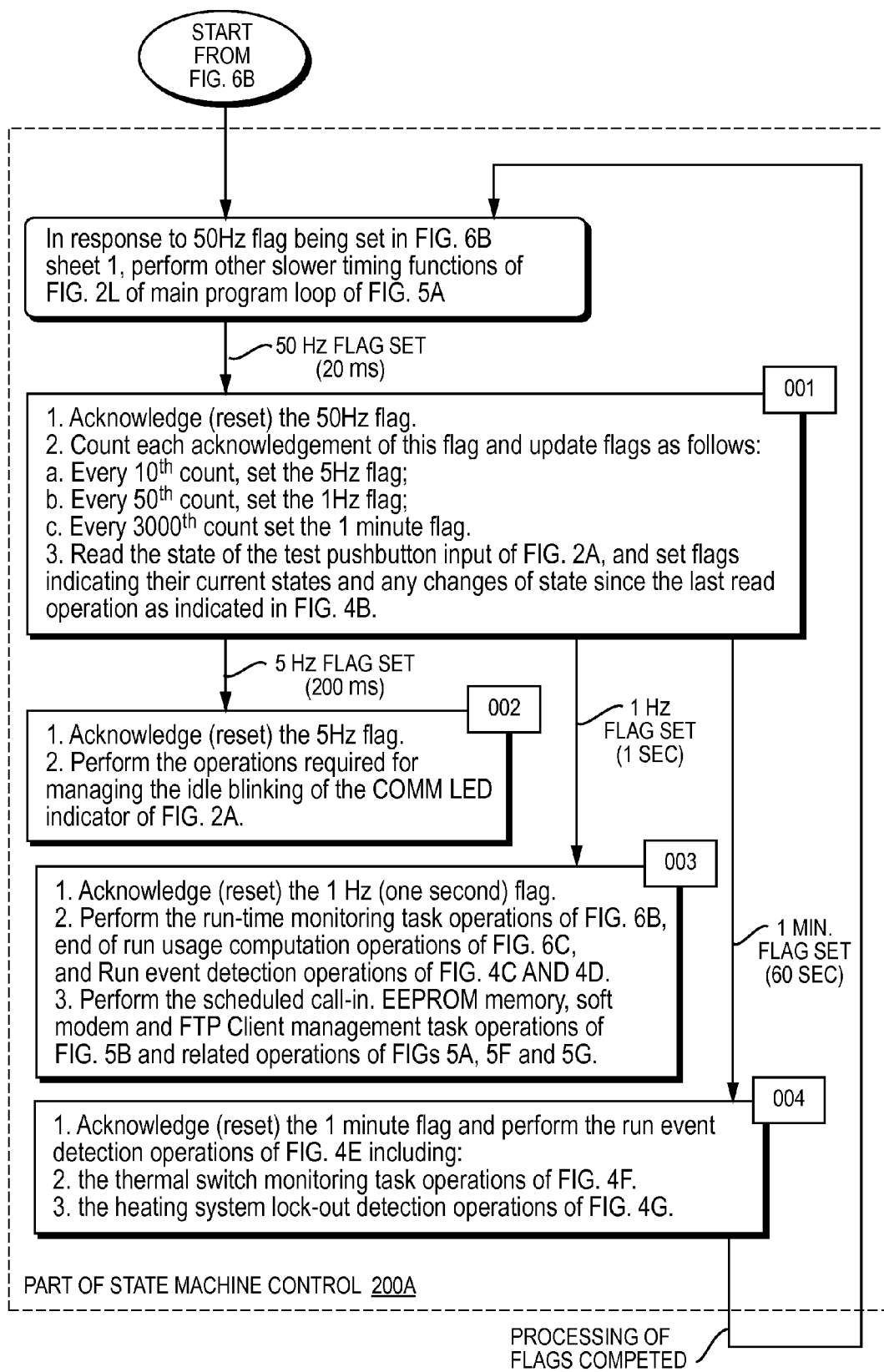
FIG. 2L shows in greater detail, a portion of the state machine control of FIG. 2K.

FIG. 2L illustrates in greater detail, the operations and sequencing of a part of the state machine control component 200A. As shown, the control component 200A defines a plurality of states labeled 001 through 004 represented by blocks 001 through 004 that are used for carrying out slower timing functions of the main program loop of FIG. 5B. The switching from state to state is established in response to setting different ones of the indicated flags (i.e. 50 Hz, 5 Hz, 1 Hz, 1 min. flags). This is done by counters (not shown) used to divide down the frequencies establishing the counts at which the different flags are to be set (e.g. the 50 Hz flag is set every 10th count, the 1 Hz flag is set every 50th count) as indicated in FIG. 2L.

At different time intervals of 20 ms, 200 ms, 1 sec and 60 sec, the operations specified in each of the blocks 001 through 004 are performed. For example, at 20 ms intervals, the microprocessor module component 120 reads the state of the test pushbutton input of the device 12 of FIG. 2A and sets the appropriate flags indicating their current states/status and any changes in states/status since the last read operation as indicated in FIG. 4B. These operations will be discussed in greater detail relative to FIG. 4B.

Figure 4A:
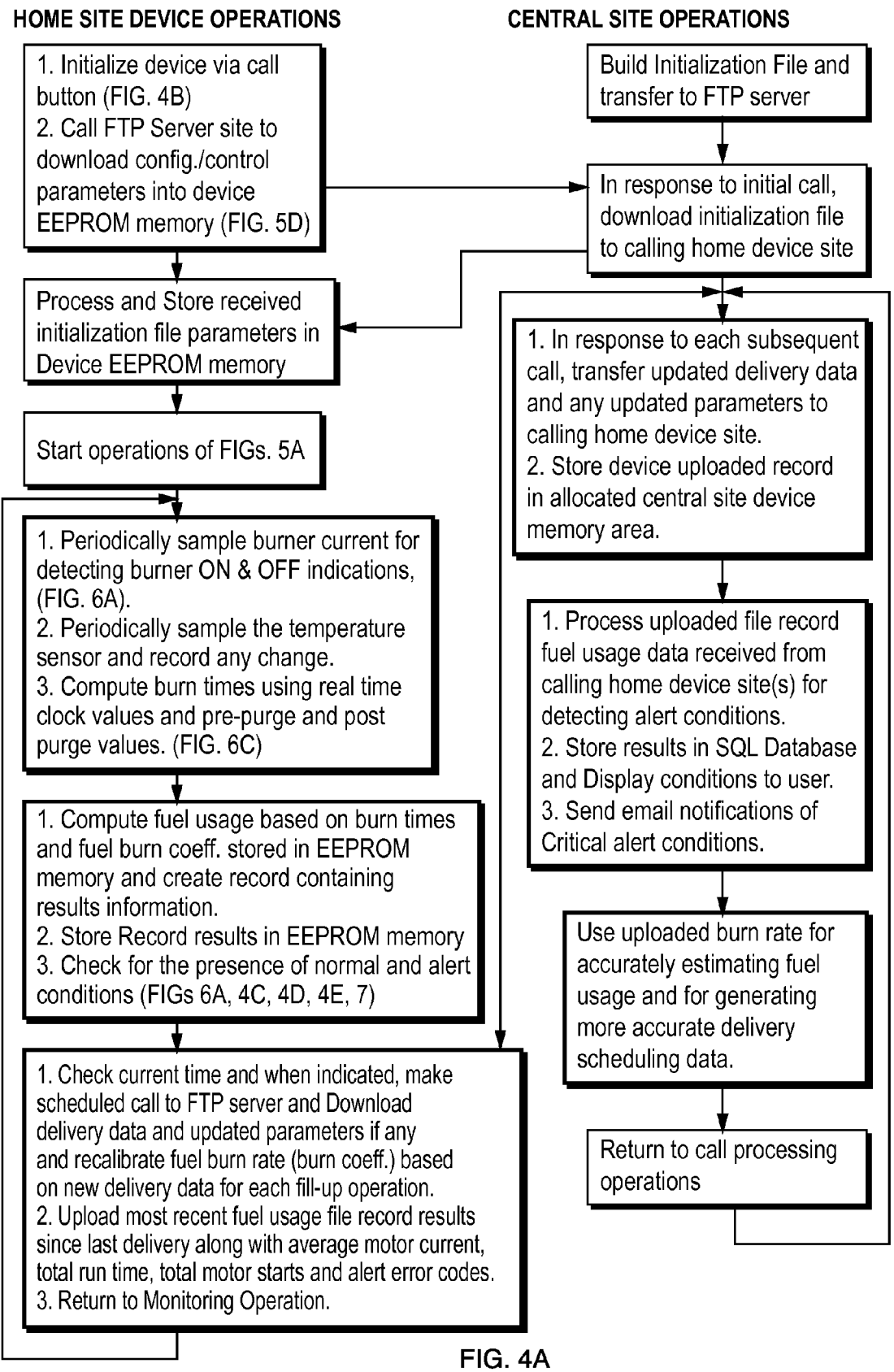
FIG. 4A is a high-level flow chart illustrating the overall operation of the system of FIG. 1A.
Figure 4B:
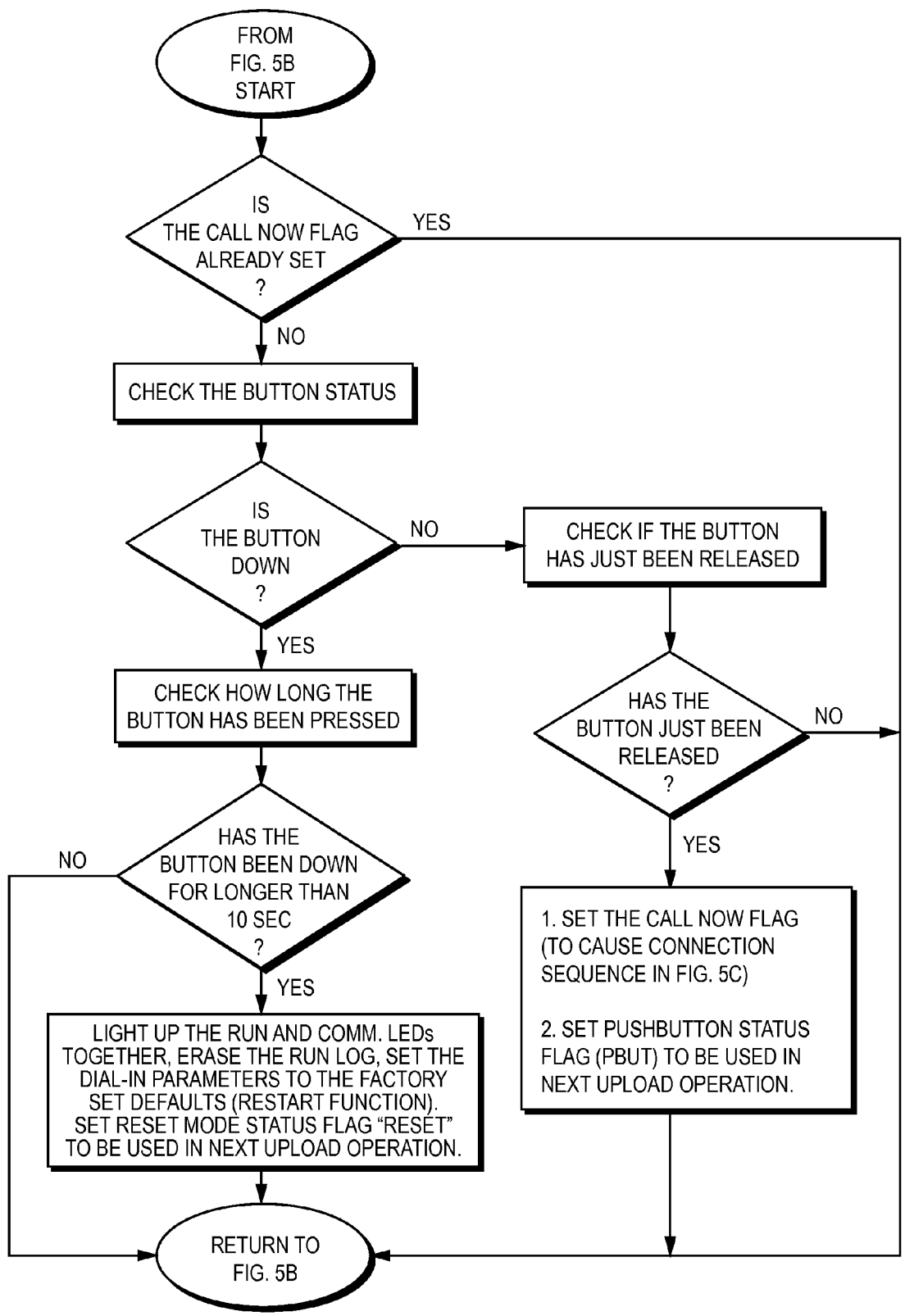
FIG. 4B is flow chart illustrating a server connection call-in button function read by the state machine control module component of FIG. 2K that is used to initialize and reset the home site monitor device of FIG. 2A. The function of FIG. 4B is performed by the home site device of FIG. 2A as part of the main loop of FIG. 5A.
Figure 4C:
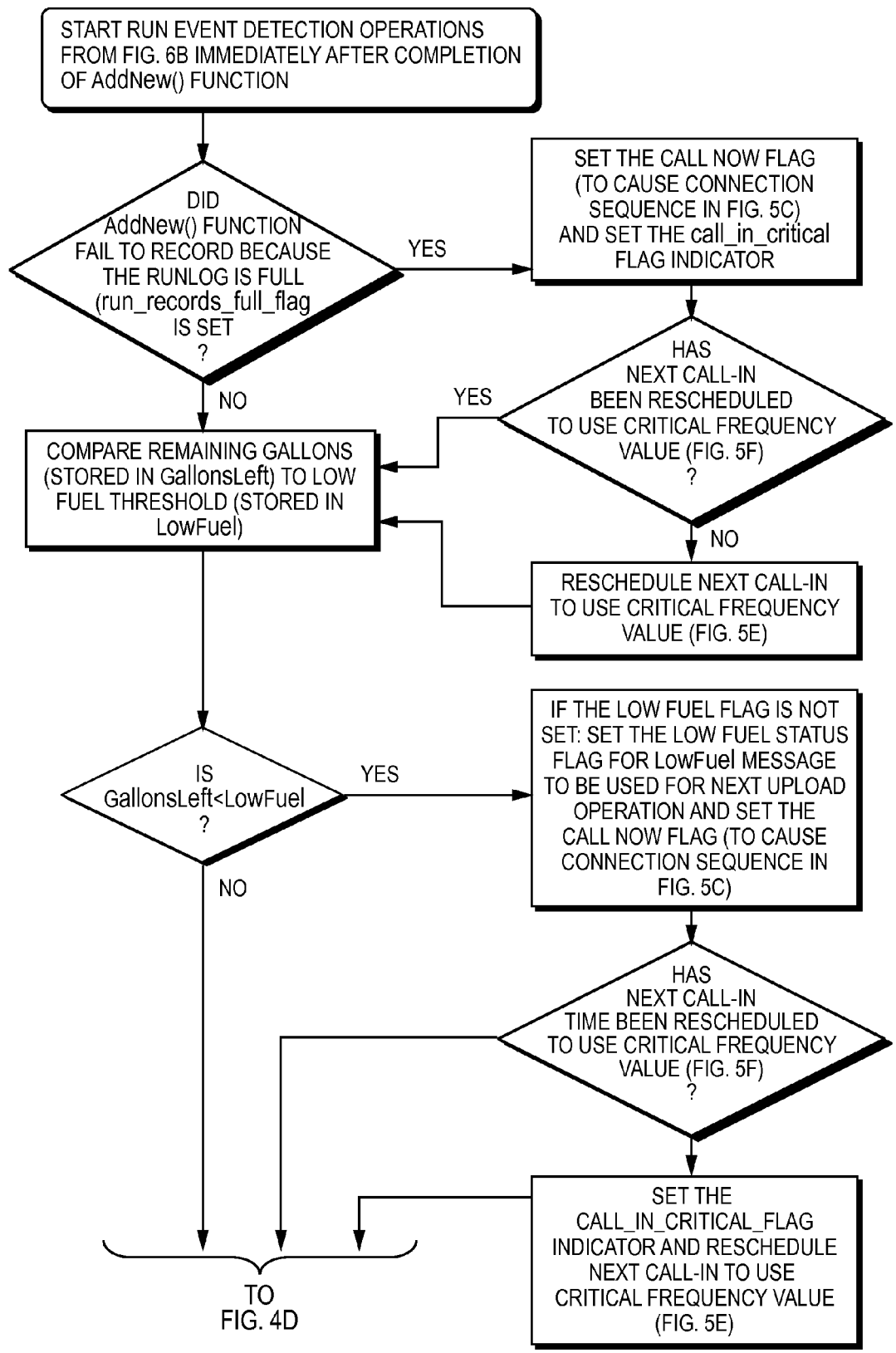
FIG. 4C-4D are flow charts illustrating the one second run event detection operations of FIG. 2K performed by the home site device state machine control FIG. 2K for processing critical alerts.
Figure 4D:
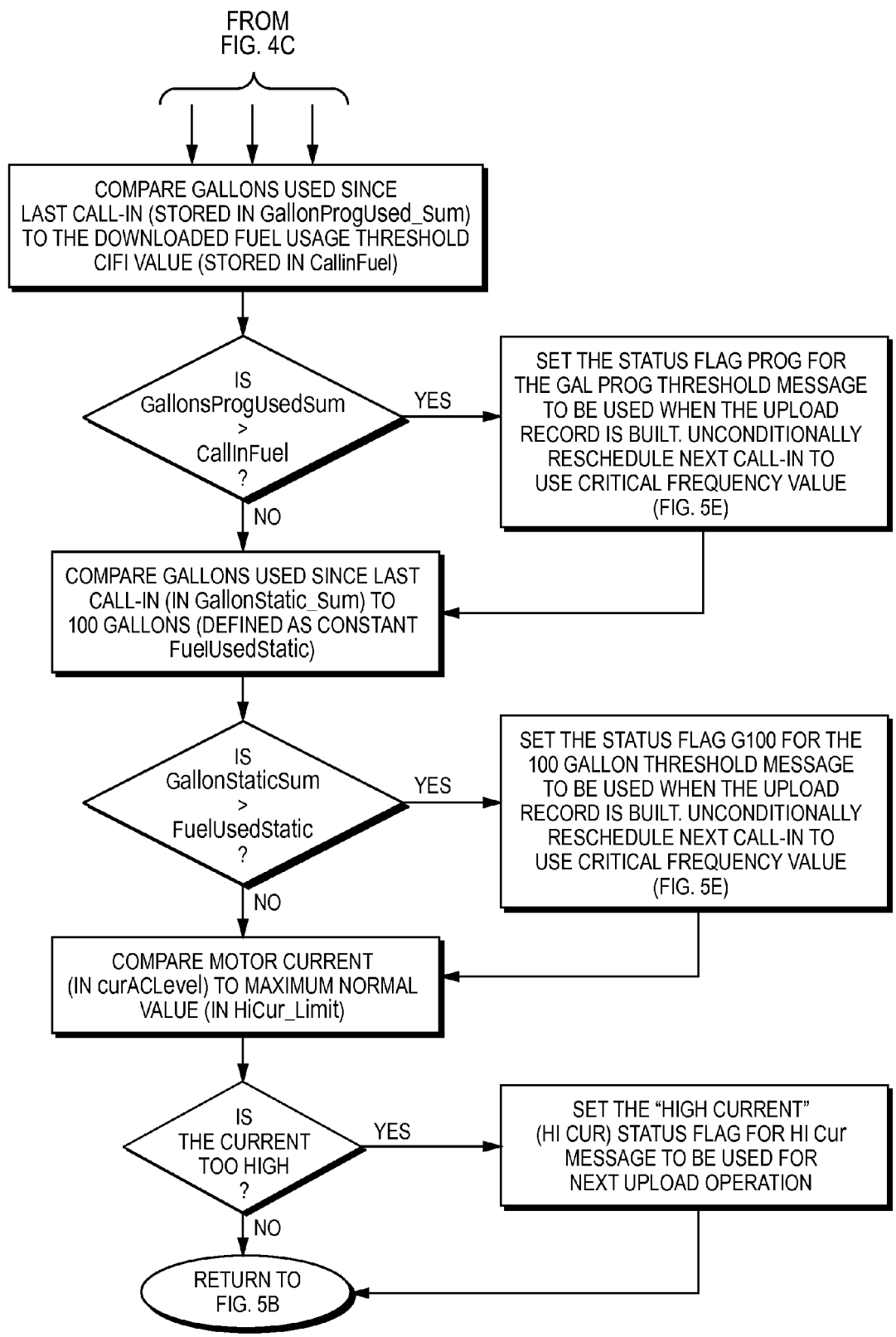

At 200 ms intervals, microprocessor module component 120 performs the operations required for managing the idle blinking of the COMM LED indicator of FIG. 2A. At 1 sec intervals, microprocessor module component 120 performs the following operations: the runtime monitoring operations of FIG. 6B; end of run usage computation operations of FIG. 6B; and run event detection operations of FIG. 4C-4D. Also the microprocessor component 120 performs scheduled call-ins, EEPROM memory operations, soft modem and FTP client management task operations of FIG. 5B and related operations of FIGS. 5D, 5E and 5F. These operations will be described in greater detail with reference to these figures.

Figure 4E:
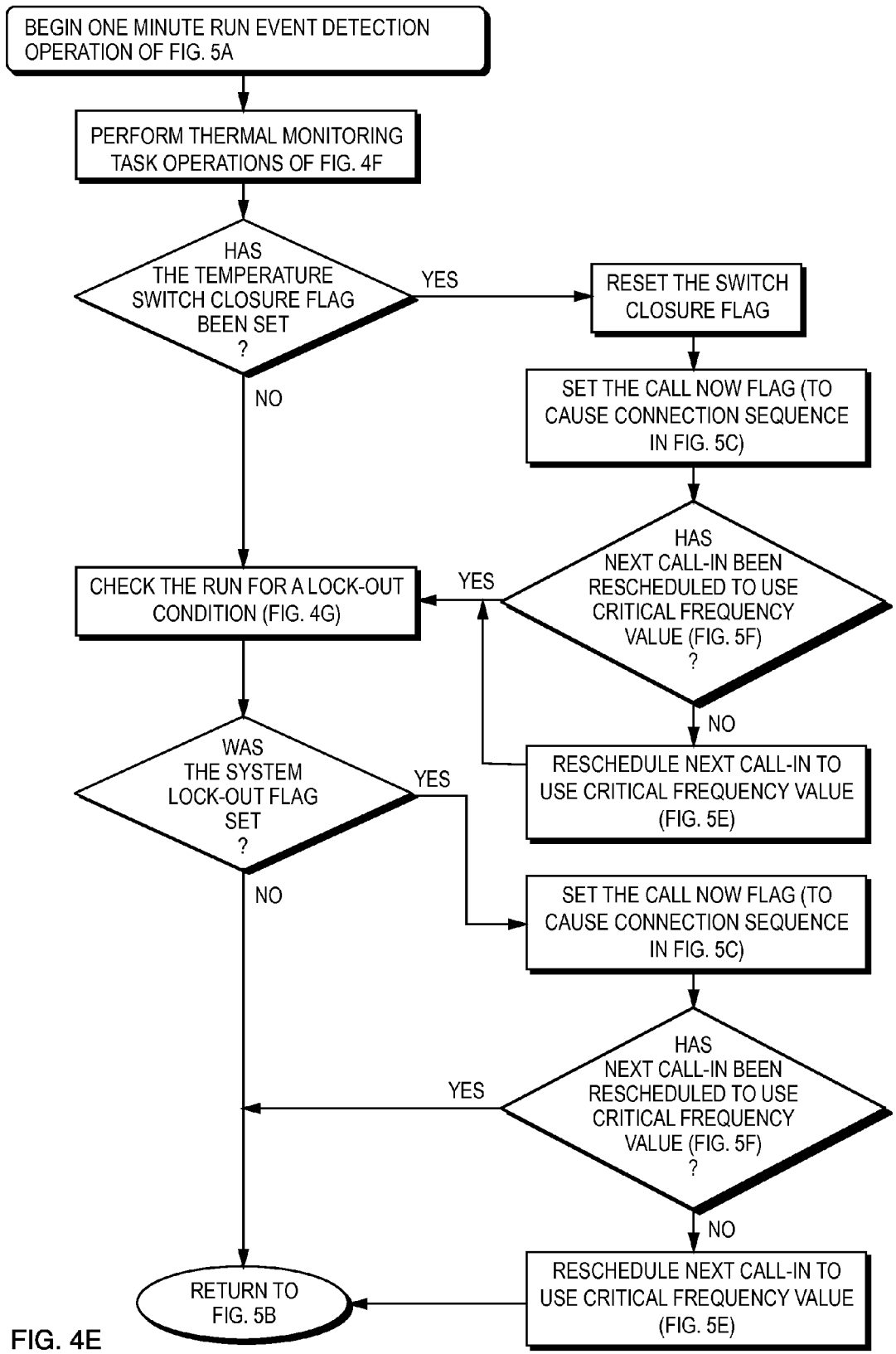
FIG. 4E is a flow chart illustrating the one minute run event detection operations performed by the home site device state machine control of FIG. 2K for processing other critical alert conditions.
Figure 4F:
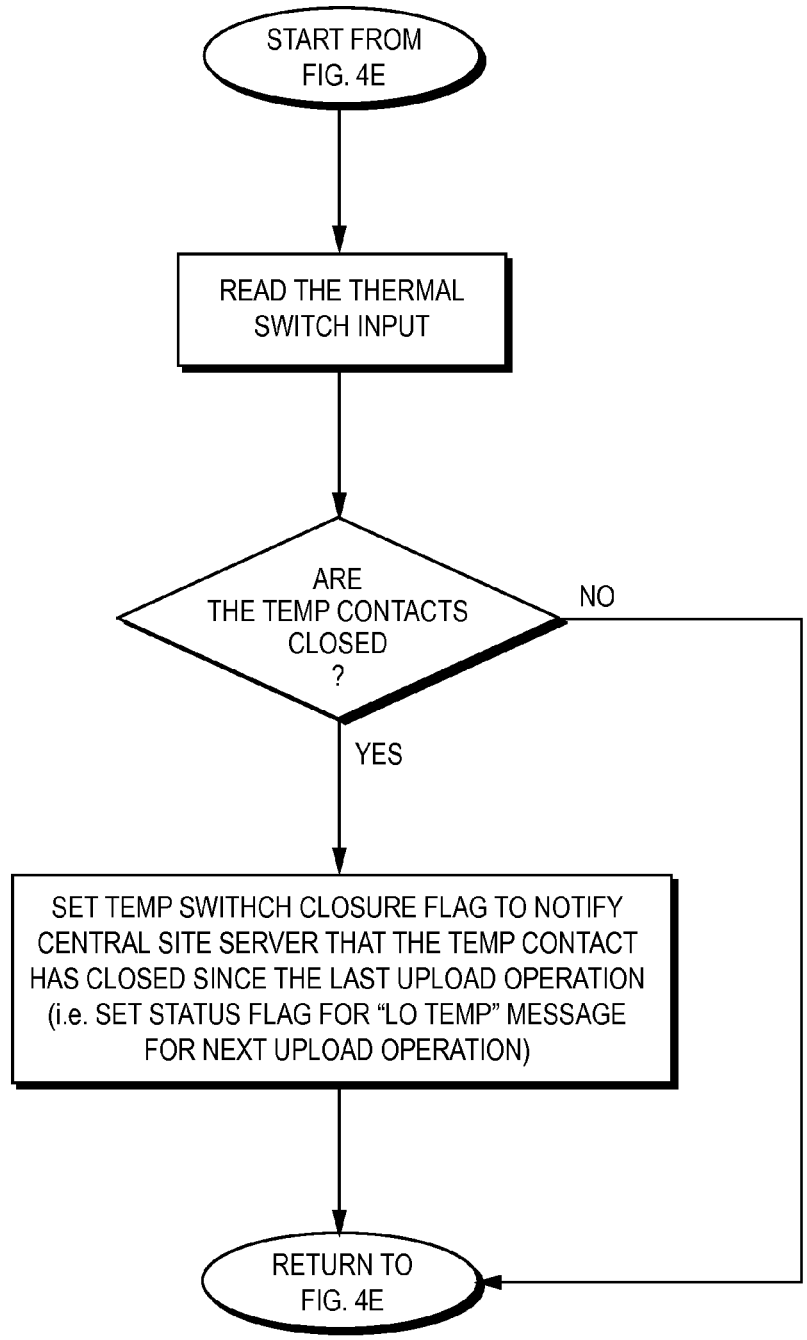
FIG. 4F is a flow chart illustrating the thermal input monitoring operations of FIG. 2K performed as part of the critical alert conditions processing operations of FIG. 4E.
Figure 4G:
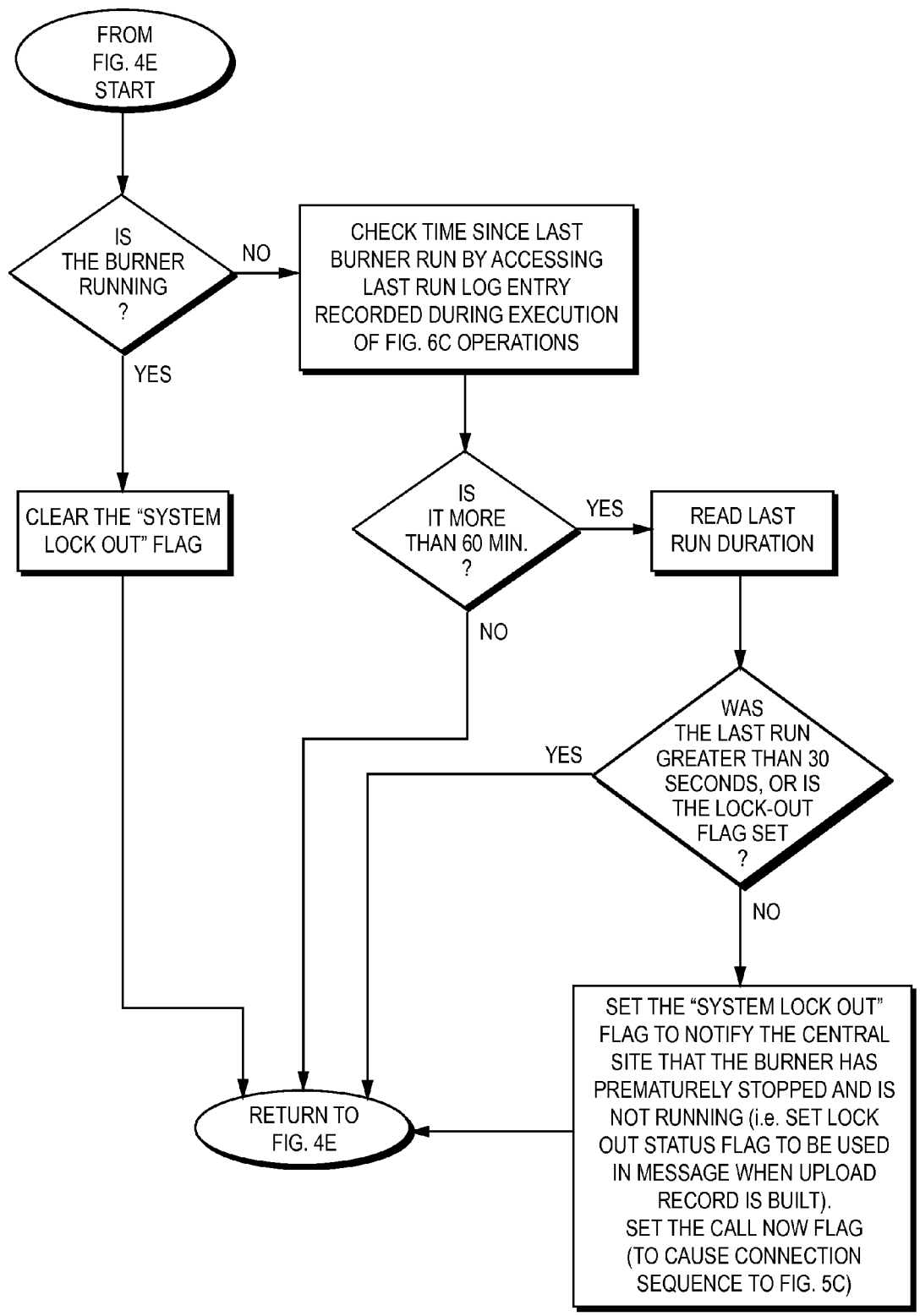
FIG. 4G is a flow chart illustrating the operations of a burner lock-out function performed by the home site device state machine control of FIG. 2K as part of the critical alert conditions processing operations of FIG. 4E.

Lastly, at one minute intervals, microprocessor module component 120 performs the run event detection operations of FIG. 4E that includes the thermal switch monitoring operations of FIG. 4F and the heating system lock-out detection operations of FIG. 4G. These operations will be described in greater detail with reference to these figures.

FIG. 3

FIG. 3 illustrates the organization of EEPROM memory module component 135 of FIG. 2B. As shown, the memory module component 135 is divided up into a number of main sections or areas that include a Communications Parameter Information Area, a Configuration Information Area and a Processed Information Area. As shown, the Communications Parameter Area is used to store Internet Server Parameters that are included in an initialization file that downloaded from the Central site system following the initialization of home site home site monitor device 12. As discussed above, the home site monitor device 12 uses these parameters for establishing two way communications between the device 12 and central site system 20. By way of example, the parameters used for establishing communications through a dial-up option are contained in the dotted block of FIG. 3. The structure and format of these parameters are described in greater detail in APPENDIX A. The use of these parameters is discussed in greater detail in the device description of operation portion of the specification.

The Configuration Information Area of EEPROM memory component 135 is used to store parameters that are used to configure and control the operation of the home site monitor device 12. For example, this area stores parameters used for scheduling calls to the central site system 20 in addition to parameters defining various thresholds and parameters that to be used in computing fuel usage in accordance with the teachings of the present invention. As discussed herein, these parameters are generally included in an initialization file and subsequently generated files downloaded by the home site device 12 from central site system 20 and are described in greater detail in APPENDIX A.

The Processed Information Area of EEPROM memory component 135 is used by the home site monitor device 12 for storing parameters that it uses in carrying out its monitoring operations and processing results obtained from performing such monitoring operations. For example, this area is used to store information such as accumulated run data, delivery data, burn parameter values and results data that the home site monitor device 12 continuously updates during its monitoring of heating system operations in accordance with the teachings of the present invention. The use of these parameter values will also be discussed herein in greater detail in connection with describing the operations of the home site device 12.

General Description of Overall System Operation

Introduction

As discussed herein, the home site home site monitor device 12 and the central site 20 of the illustrated embodiment are combined to provide an Internet based energy monitoring system that provides significantly more accurate fuel or energy usage information. This enables optimization of fuel delivery scheduling by the central site system 20. The illustrated embodiment describes an easy to install, low cost and reliable operating home site monitor device 12 which operates in conjunction with the central site system 20 to provide these advantages.

As previously described, each home site monitor device 12 connects through a standard communications interface such as Com System I/O module component 123 of FIG. 2B. This interface establishes communications with a local (ISP) Internet server over an Internet communications network. In the illustrated embodiment, the home site monitor device standard interface component 123 connects to a telephone system network which it uses to access the local internet server to establish an internet connection with the central site system 20 and perform various internet communication tasks.

Since the Home site device 12 is Internet based, it is capable of communicating with the central home site device 20 for monitoring a broad range of in home processes, events and conditions over a large geographic area.

FIG. 4A

FIG. 4A illustrates the overall system interoperability between the home site home site monitor device 12 and the central site computer system 20 of the illustrated embodiment of the present invention. For ease of understanding, the overall operations of the home site monitor device 12 and central site system 20 will now be described with reference to FIG. 4A. FIG. 4A is a simplified diagram illustrating the types of operations performed by both the device 12 and central system site 20. These operations will also be later described in greater detail herein.

As discussed, the principal method of communication between the home site monitor devices 12 and the central site Internet FTP server 200 involves a two way FTP transfer of heating system information files comprising a plurality of data records using the standard FTP protocol. This two way transfer includes a download FTP transfer operation (i.e. download) that allows a home site device 12 to transfer file records from the central site internet FTP server providing the home site device 12 with access to configuration and control information (e.g. initialization parameters). Also, the two way transfer includes an upload FTP file transfer operation (i.e. upload) that allows each home site monitor device 12 to transfer operational records to the central site Internet FTP server 200.

Referring to FIG. 4A, it is seen that following the installation of the home site monitor device 12 of FIG. 2A into a home heating system 14, the home site monitor device 12 is first initialized or reset by a technician by depressing the device panel operator test push button of FIG. 2A for 10 sec until both LED lamps light up. This results in the device 12 making a call in to the central site system FTP server 200 over the Internet network. In response to the call in, the device 12 downloads an initialization file containing the previously discussed various configuration and control parameters that the central site system previously built and stored on its FTP server 200. As discussed, the home site device 12 stores these parameters in the appropriate areas of EEPROM memory component 135. Also, as discussed, these parameters are then used by the home site monitor device 12 in carrying out its required monitoring operations and in communicating with the central site system 20 at specified times for reporting fuel usage amounts and the detection of alert and status conditions as described herein. Briefly, following receipt of the downloaded site initialization record file from the central site 20, the home site monitor device 12 updates the following parameter values in the Processed Information Area and Configuration Information Area of EEPROM memory component 135 illustrated in FIG. 3 except as otherwise noted:

1. Last Delivery Date (_Delivery_Date, Delivery_Date_Old);
2. Last Delivery Time (_Delivery_Time, _Delivery_Time_Old);
3. Gallons Delivered (Delivery_Gallons);
4. Start and End Times (Call_In_Start_Time Window) and (CallIn_End_Time Window) to initially connect to the central site system FTP server 200, these times define the earliest and latest time that a Home site monitor device 12 will attempt to initially connect to the FTP server 200;
5. The Frequency parameter expressed in days defines the times that the Home site monitor device 12 is to call in to the central site system 120. This parameter includes a normal frequency parameter and a critical frequency parameter (Normal_Frequency_) and (Critical_Error_Frequency_.
6. Initial Burn Coefficient (BURN_Coef)(Bf) parameter in gallons per hour used to re-compute the burner coefficient along with the burner Pre purge and Post Purge parameter values. An initial burn coefficient value GPH is computed using heating system parameter information such as nozzle size and pump pressure (PSI) that is separately provided by the installation technician which determines the value for the parameter BURN_Coef. More specifically, the initial value burn coefficient value GPH for actual flow rate is computed according to the following standard equation:

$$\text{Initial Burn } Coef = \sqrt{\frac{\text{Pump pressure } (PSI)}{\text{Nozzle Pressure at } 100 \; PSI}} \times \text{Nozzle } GPH$$

7. Burn Pre purge constant parameter (Burn_Pre) defines an initial startup time interval during which no fuel is expended;
8. Burn Post purge constant parameter (Burn_Post) defines an end time interval during which no fuel is expended;
9. Tank Size (Tank_Size) parameter;
10. Low Fuel Threshold parameter (LowFuel);
11. Hi Current Threshold (HiCur) and
12. Programmable Call In Fuel Used Level (CIFI).
13. Tank Full Flag (Tank_Full_Flag);
14. Gallon Accumulated (Gallons_Accum);
15. Gallons Static Sum (GallonsStatic_Sum) is updated after a burner cycle of operation after computing fuel usage;
16. Gallons Programmed Used Sum (Gallon ProgUsed_Sum) is updated after a burner cycle of operation after computing fuel usage;
17. Computed (expected) number of Gallons Burned (Gr) is updated only during a reset operation or Burner cycle of operation after computing fuel usage;
18. Number of Gallons Delivered Since Last Fill-up Delivery or actual number of Gallons burned (Gu) is updated only during a reset operation or Burner cycle of operation after computing fuel usage; and,
19. Burn Coefficient Filter Sum Accumulator (Ba) is updated only during a reset operation or Burner cycle of operation after computing fuel usage. The Burn Coefficient filter sum accumulator is stored in EEPROM memory 135 to protect against power outages without having to start this process again because it takes a long time to receive back to back fill operations.

For ease of convenience, reference may be made to the Glossary at the end the specification for information regarding some of the above parameters.

Figure 5A:
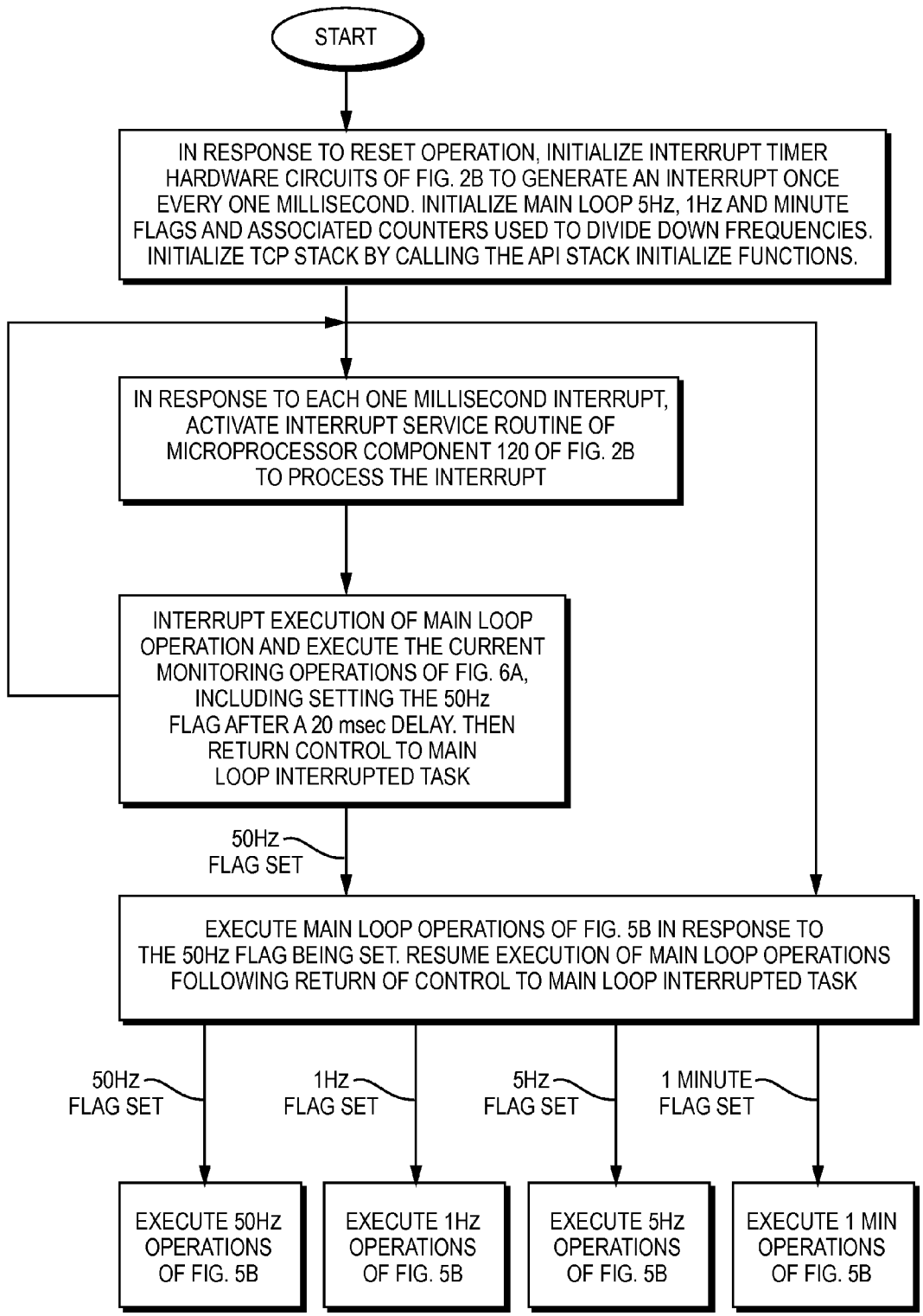
FIG. 5A is a high level flow diagram illustrating the operations performed in the initialization of the home site device 12 and overall sequence of operations of the main loop performed by the home site device of FIG. 2A.
Figure 7:
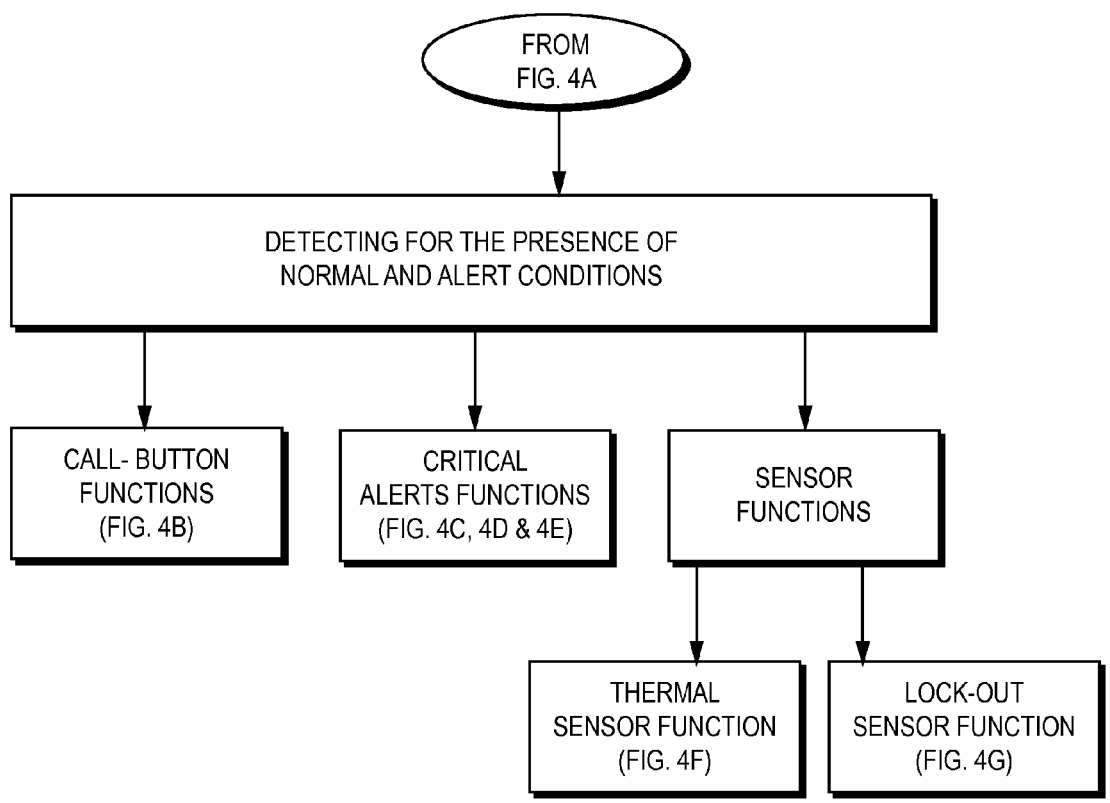
FIG. 7 illustrates the different types of monitoring operations performed by the home site device according to the system operation flow chart of FIG. 4A.

As indicated in FIG. 4A and discussed in greater detail herein with reference to FIG. 5A, the home site device 12 is powered up and initialized with parameter values that it downloaded from the central site system 20. The device 12 operates to continuously monitor the operation of the heating system 14. Additionally, the device 12 monitors a number of types of heating system conditions. FIG. 7 illustrates examples of some of the different types of heating system conditions and operations that are monitored by device 12. As shown, these conditions include call button status, critical alert functions such as a low temp thermal sensor and lock-out sensor functions. These operations will be described in greater detail in connection with the figures designated in FIG. 7.

The device 12 tracks each time that the heating system 14 is run or operated (i.e. its run time). The device 12 uses that run time to compute a resulting burn time (Time_Burn) by subtracting from that run time value, pre-fire and post-fire purge time constant values (i.e. the times during which no fuel is expended). Each burn time value (Time_Burn) is stored in a record along with its start time (i.e. time of day) obtained from the RTC module component 132 of FIG. 2B. This results in the home site monitor device 12 storing a record for each heating system run time cycle of operation since the last time the heating system received fuel (e.g. since the time of its last fuel delivery).

After recording each heating system run time cycle of operation, the home site monitor device 12 also uses the delivery information it downloaded from central site system 20 server to update its estimate of the amount of remaining gallons of fuel left and the gallons of fuel accumulated if the dates of deliveries are newer than the date of the last delivery.

As discussed herein, during such monitoring operations, at the established specified call in times (i.e. start and end times), the home site monitor device 12 makes calls to the central site system FTP server 200 over the Internet. As a result of such call in operations, the home site monitor device 12 performs a sequence of FTP data transfer operations that includes a download operation followed by an upload operation. During the download operation, the home site device 12 searches for new delivery file stored on the FTP server 200. When a file is found, the home site monitor device 12 downloads the file containing any new configuration information including new delivery data from the central site system FTP server 200. As discussed above, the device 12 uses this information to update its parameter values stored in EEPROM memory module component 132. More specifically, the home site monitor device 12 updates itself (i.e. contents of EEPROM memory module component 132) based on the following downloaded parameter information values:

1. Last Delivery Date (Delivery_Date, Delivery_Date_Old;
2. Last Delivery Time (Delivery_Time, _Delivery_Time_Old);
3. Last Delivery Gallons (Delivery_Gallons); and
4. Last Delivery Filled-up Fuel Tank (Tank_Full_Flag).

Following the FTP downloading of file records, the home site monitor device 12 takes the last saved delivery time stored in EEPROM memory component 135 and searches for any deliveries made after that time. If it finds any newer deliveries, it adds the value corresponding to the number of gallons of fuel delivered to the amount of fuel left in the fuel tank and to the amount of fuel accumulated. It overwrites the last saved delivery data (Delivery_Date_Old) and time value (Delivery_Time_Old) with the latest last known delivery date Delivery_Date and time value (Delivery_Time).

As described in greater detail herein, each time a new delivery results in the home site fuel tank being filled-up, the home site monitor device 12 uses the new delivery data to recalibrate its burn coefficient value according to the teachings of the present invention. Briefly, in the case of a new delivery fill-up operation, it uses the actual fuel usage values included in the new delivery data to recalibrate burn coefficient (gallons per hour) value that it uses in computing fuel usage. This usage value corresponds to the number of gallons of fuel delivered to the home site to fill-up the heating system fuel tank (Last Delivery Gallons and Last Delivery Filled Parameters). The home site monitor device 12 reconciles the actual time of the new fuel delivery with the stored accumulated run records by ignoring records stored after the time of delivery. The home site monitor device 12 also stores these updated delivery parameter values in its EEPROM memory component 135.

As discussed herein, by continuously recalibrating the operation of the device 12 by recomputing the burn coefficient value using actual delivery information, this provides an accurate burn rate coefficient value for use in computing or computing fuel usage. This process also eliminates the effects produced by differences in fuel fill operations and in heating system operational parameters (e.g. fuel pressure (PSI) and nozzle flow rate) from affecting the accuracy of the computed burn rate coefficient value.

As indicated in FIG. 4A, following the completion of the download operation, the home site monitor device 12 next performs an upload operation (i.e. FTP transfer). During the upload operation, the device 12 uploads a file of records accumulated during the monitoring of the heating system from the time of the last delivery or since initialization. These records contain fuel usage run data and status data pertaining to any alert conditions detected during such monitoring. As indicated in FIG. 4A, the FTP server 200 receives and stores the home site monitor device 12 uploaded file record parameter information into an allocated central site system device memory area. The parameter information includes the following:

1. Run Data:
   a. Average Motor Current (AvgCurrent);
   b. Current gallons used since last delivery (GalsUsed);
   c. Total run time in minutes not including Pre and Post Purge times (Runtime);
   d. Total number of heating system starts (Starts) that have occurred since the last fuel delivery.
2. Status Data: (The following Error Reason codes are sent indicating detection of the specified alert conditions)

| a. | System is in "reset mode" | "RESET" reason code; |
|---|---|---|
| b. | System is low on fuel | "LoFuel" reason code; |
| c. | System Motor is at High Current | "HiCur" reason code; |
| d. | Low Temp detected | "LoTemp" reason code; and, |
| e. | Heating System Lockout Detected | "Lockout" reason code. |

Also, the home site monitor device 12 updates a fuel present tank level local memory variable value (Gallons_Left). This is based upon the last filled fuel tank level (or the initial fuel tank level) and the total burn time (the sum of the burn times since the last fuel delivery (fuel fill-up). Additionally, during the FTP upload operation, the home site monitor device 12 computes what the total run time is from the last known delivery time. This total run time is then used to compute how many gallons of fuel were used since the last delivery time. As discussed, the device 12 also uses this information for recomputing/recalibrating the fuel usage burn coefficient value (BURN_Coef). The Appendix A describes in greater detail, the parameter information discussed above.

After completing the above sequence of operations of the main loop of FIG. 4A which will be described in greater detail with reference to FIG. 5B, the home site device 12 returns to its current monitoring operations. As described herein, the home site monitor device 12 continues performing periodically call ins, the sequences of download and upload operations, and the re-calibration of burn coefficient parameter values based on new delivery data obtained from the central site system FTP server 200. As discussed above, the home site monitor device's 12 continual re-calibration of the burn coefficient parameter value over time with actual fuel usage obtained from actual delivery data markedly increases the accuracy of recorded fuel usage amounts that are provided to the central site system FTP server 200.

As indicated in FIG. 4A, the central site system 20 processes the uploaded file usage data and status data indicating detected alert conditions. The results are stored in the central system site 20 in the system database and displayed to user in an unique manner described herein that facilitates identification and notification of critical alert conditions. Additionally, in accordance with the teachings of the present invention, the central site system 20 utilizes the computed fuel burn rate using the actual fuel usage
and run time data contained in the uploaded file for estimating fuel usage and for generating accurate delivery scheduling and fuel allocation data. This process is described in greater detail herein with reference to FIGS. 1C and 1F.

Detailed Description of the Initialization, Current Monitoring and Main Loop Operations of Home Site Monitoring Device 12

FIG. 5A

With reference to flow diagrams of FIGS. 3 through 8, the initialization, current monitoring and main loop operations performed by the home site device 12 according to the teachings of the present invention will now be described in greater detail.

Initialization Operation of FIG. 5A sheet 1

In response to being powered on or being reset, the microprocessor controller module component 120 performs a "boot-up" sequence of operations in response to being reset which will be also discussed with reference to FIG. 4B. This causes the device 12 to load into EEPROM memory module 135 component, pre-stored default parameter values for the home site device 12 obtained from its internal ROM control element (not shown). Prior to rewriting the contents of the EEPROM memory module 135 component, the device 12 performs a check on the EEPROM contents that are verified to determine if the module 135 component should be initialized to the default parameter values. When the device 12 is being initialized, the pre-stored default values are written into the appropriate areas of EEPROM memory module 135 component. Also, certain information values are written as zeros into the Processed Information Area of EEPROM module 135 indicative that the device 12 has been initialized.

Additionally, as indicated in FIG. 5A, it is seen that when power is applied to the microprocessor controller component 120 and the component 120 is reset, it comes out of the reset state and performs the following initialization operations. Initializes the rest of its variables (e.g. sets the main loop state machine control component 200A to an idle state, sets the average run current variable value to zero). For example, it initializes the main loop 5 Hz, 1 Hz and minute flags and associated counters used to divide down frequencies. It also initializes the hardware circuits of the microprocessor controller component 120 and associated A/D converter hardware and begins sampling the heating system burner current using the A/D converter hardware. Additionally, as shown, the microprocessor controller component 120 initializes the TCP/IP stack 200C by calling API stack initialize functions as discussed herein.

Also, the microprocessor controller component 120 initializes the hardware interrupt timer circuits so that it interrupts normal program execution of the microprocessor component 120 every millisecond. Since the default parameter values represent only estimates of what the actual values are, the device 12 microprocessor component 120 initially operates in a degraded manner in carrying out the main loop sequence of operations of FIG. 5A.

As indicated, in FIG. 5A, in response to each one millisecond interrupt, the hardware interrupt timer circuits activate the interrupt service routine of microprocessor component 120 of FIG. 2B to process the interrupt. This causes the microprocessor component 120 to begin executing the current monitoring operations of FIG. 6A. These operations are performed once every millisecond. During the execution of the current monitoring operations of FIG. 6A, the microprocessor component 120 sets the 50 Hz flag which returns control back to the main loop interrupted task as shown. As shown, the microprocessor component 120 continues execution of the main loop operations of FIG. 5B.

Figure 6A:
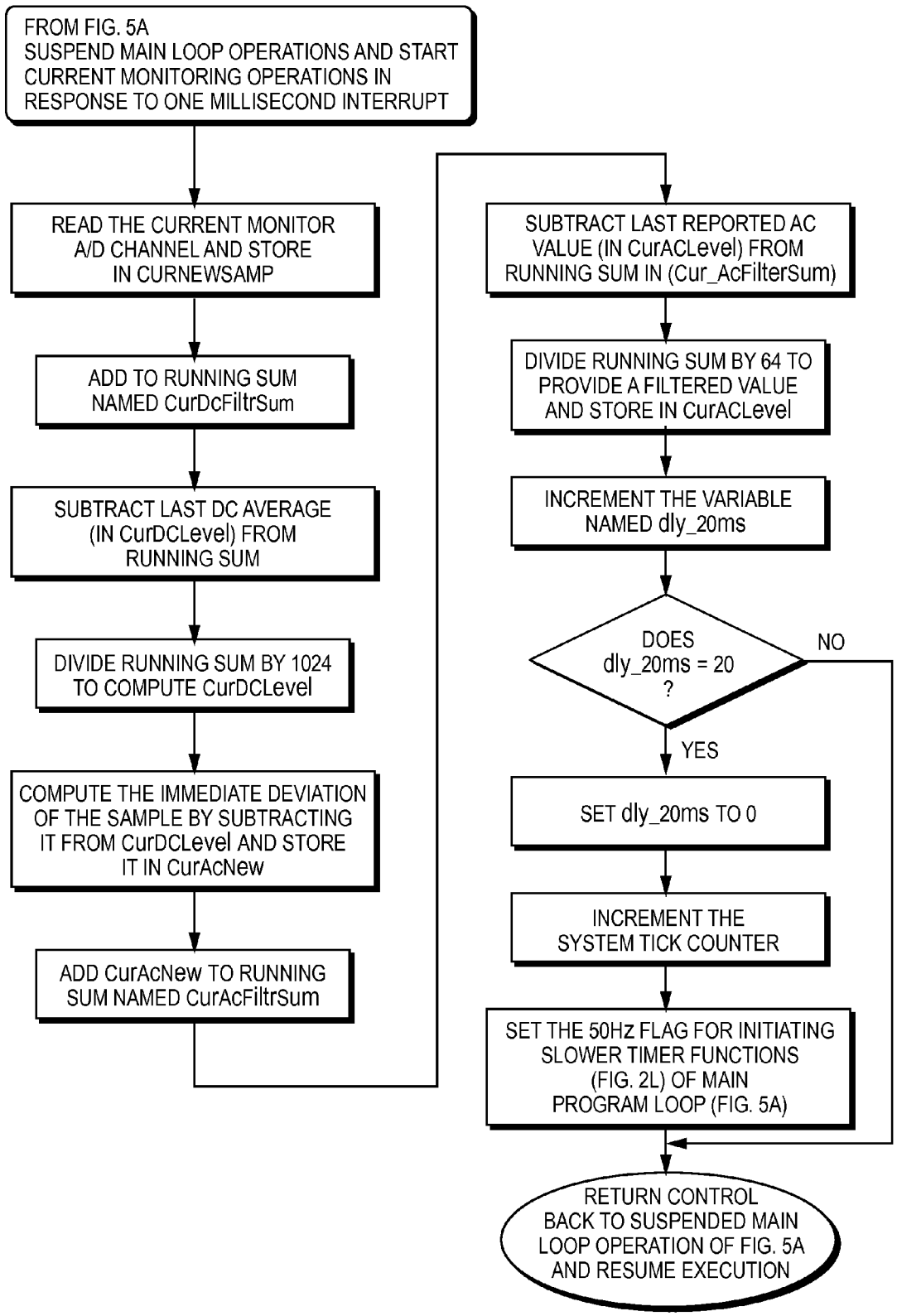
FIG. 6A-6B illustrates in greater detail, the current monitoring operations performed by the home site device concurrent with the operations of the main loop of FIG. 5A.

Thus, while executing the different operations of FIG. 5A, the microprocessor component 120 is periodically interrupted at one-millisecond intervals so that it can perform the current monitoring operations of FIG. 6A. In this manner, the microprocessor component 120 is able to concurrently execute both the current monitoring operations and main loop operations. As indicated in FIG. 5A, the different main loop operations are performed at the appropriate intervals by the microprocessor component 120 as a function of the states of the 50 Hz, 5 Hz, 1 Hz and one minute flags. The current monitoring operations will now be described in greater detail with reference to FIG. 6A.

FIG. 6A

Current Monitoring Operations of FIG. 5A sheet 1

As previously discussed, following the initialization operation, the home site monitor device 12 begins monitoring the operations of the home heating system 14. Briefly, it determines the time periods that the home heating system 14 is running by periodically sampling the heating system current and computing burn times that are accumulated and used to calculate fuel usage whose results are stored in EEPROM memory component 135. Also, the home site monitoring device performs a number of other monitoring operations including run event detection operations involving detecting and processing alert conditions as described herein. These operations will now be described in greater detail with reference to FIG. 6A.

FIG. 6A

In greater detail, the microprocessor module component 120 monitors the duration of operation of the heating system by monitoring the AC level current flow through the current sensor output of FIG. 2A applied to the control input circuits of FIG. 2C. When the AC current reaches a level that is greater than the predefined current threshold value corresponding to the motor's maximum idle current draw value, this signals the detection of the "motor on" condition as discussed herein. As shown in FIG. 6A, motor AC current level is continuously monitored by the microprocessor module component 120 at time intervals of one millisecond to provide an filtered current value which is stored and whose duration determines when to increment a tick counter. As discussed above, the hardware interrupt timer circuits of microprocessor module component 120 are programmed to interrupt the microprocessor module component 120 every millisecond. At that time, it reads or samples the current monitor A/D channel input/port from the amplifier circuit of the Control Input Circuits module component 128 of FIG. 2C and then stores the sampled value designated as "curnewsamp" in the microprocessor module component 120's local memory (not shown). As shown in FIG. 6A, this value is then added to a running filtered current sum value CurDcFiltrSum stored in an assigned local memory location CurDcFiltrSum. The microprocessor module component 120 subtracts the last DC Average value (Cur- DCLevel) from the running sum value and computes the current DC level CurDCLevel value by dividing the subtraction result by the value 1024.

As indicated in FIG. 6A, the microprocessor module component 120 computes the immediate deviation of the sample by subtracting it from the CurDCLevel value. It stores the new result curAcNew in an assigned local memory location curAcNew. The microprocessor module component 120 adds the curAcNew value to the running sum value CurDcFiltrSum. Next, the microprocessor module component 120 subtracts the last reported AC value CurACLevel (stored in an assigned local memory location CurACLevel from the running sum value CurDcFiltrSum. The microprocessor module component 120 computes a filtered value CurACLevel by dividing the running sum value CurDcFiltrSum by the value 64 and stores the result CurACLevel in the current AC level local memory location CurACLevel.

Also, as shown in FIG. 6A, the microprocessor module component 120 increments a local memory delay variable named dly 20 ms. If the delay variable equals 20 ms, the microprocessor module component 120 sets the delay variable dly 20 ms to zero and advances a free running system tick counter by one. Next, the microprocessor component 120 sets the 50 hz flag for initiating performance of the slower timer functions of the main loop of FIG. 5B.

Figure 5B:
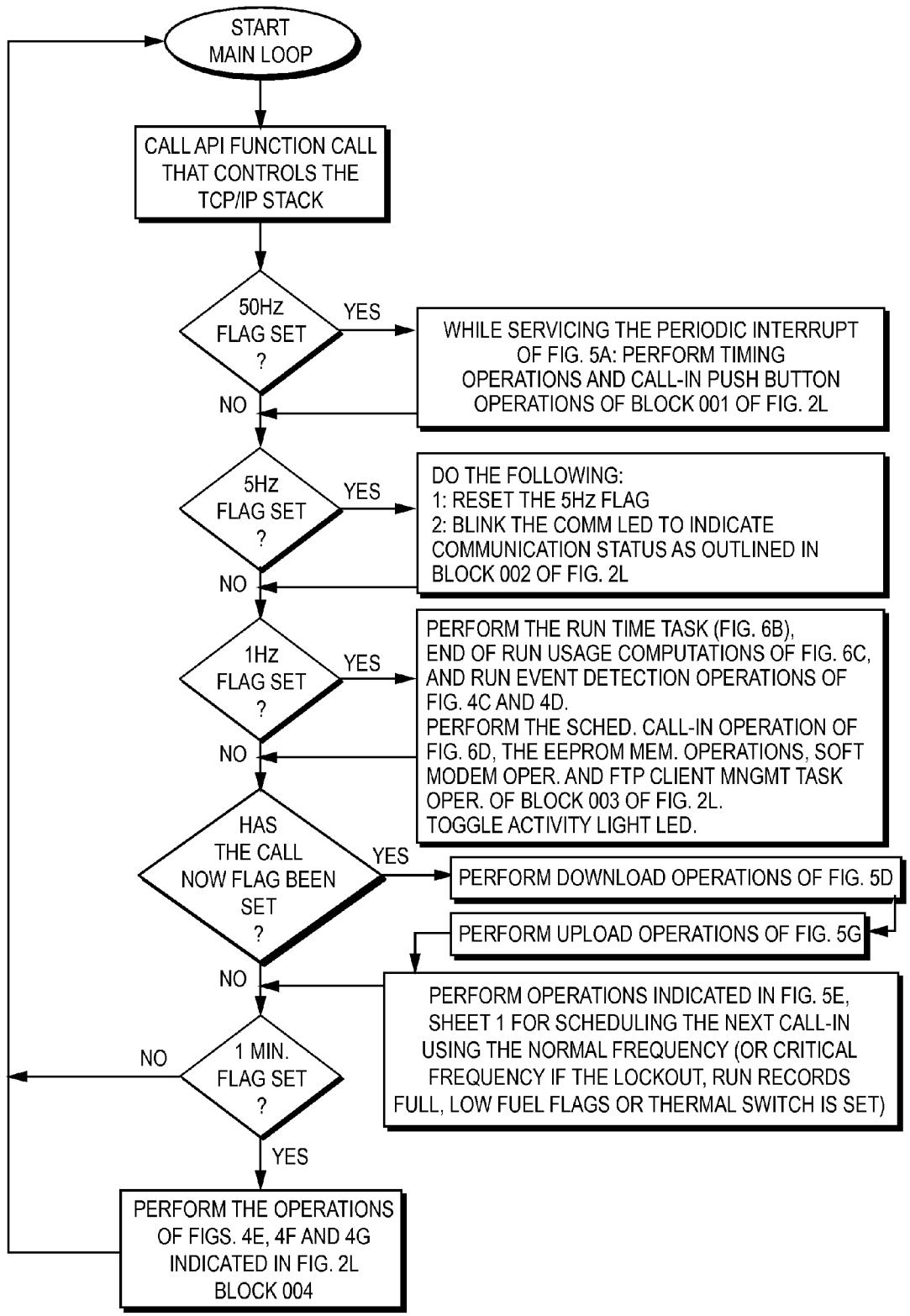
FIG. 5B is a high level flow diagram illustrating in greater detail, the sequence of operations of the main loop performed by the home site device of FIG. 2A.

Main Loop Operations of FIG. 5B

As indicated in FIG. 5B, the microprocessor controller component 120 first performs the operation of calling the API function that controls the TCP/IP stack 200C. In response to the call, in a conventional manner, the TCP/IP stack 200C searches through the layers of the stack 200C and performs any timed operations that the stack requires and handles the transmission and reception of data packets. This function also routes any packets that have been received to the appropriate application protocol-level function to handle it.

As indicated in FIG. 5B, the discussed API function call is included in the main loop and is called once during the execution of the main loop without having to set any of the flags as indicated in FIG. 5B. The API function enables the TCP/IP stack 200C to respond to any connection requests to the central site system 20 server by the FTP client component 200F without having to wait for the setting of the designated flags. For example, when the FTP client software component 200F makes an API request to connect to the central site system 20 server, the request (message) will work down the TCP/IP stack function level that performs the operations required for making the connection and returns a message to the FTP client software component 200F when the connection has been established with the central site system 20 server. This operation is further discussed herein.

Considering the main loop operations of FIG. 5B in greater detail, as previously discussed the microprocessor component 120 starts the main loop sequence of operations when the 50 Hz flag has been set following execution of the current monitoring operations of FIG. 6A described above and the making of any call/request to the API function that controls the TCP/IP stack component 200C. As discussed and indicated in FIG. 5B, the microprocessor component 120 performs the operations of the first three blocks 001 through 003 in response to setting the 50 Hz, 5 Hz and 1 Hz flags respectively. In greater detail, when the 50 Hz flag has been set, the device 12 microprocessor component performs the timing and call-in button operations of FIG. 4B as indicated in block 001 of FIG. 2L. These operations will now be described with reference to FIG. 4B.

FIG. 4B

In greater detail, as indicated in FIG. 4B, the microprocessor module 120 component checks the call push button status after determining that the call now flag has not been already set (i.e. the home site device 12 is not already calling into the central site system 20). When the call push button on the device 12 front panel of FIG. 2A is depressed for longer than 10 seconds, the microprocessor module component 120 performs essentially a "reset" operation that includes the operations of lighting up RUN and the COMM light emitting diodes (LEDs) on the front panel of the home site monitor device 12 of FIG. 2A. It also erases the contents of a run log area of EEPROM memory module 135 component and reloads the default parameter values obtained from the device's ROM into the EEPROM module 135 component as was done when the device 12 was first installed and powered on. This reset operation enables the device 12 to recover from undefined conditions such as the loading of incorrect dial-up numbers etc caused by data corruption. Upon the completion of this operation, the device 12 then returns to the main loop of FIG. 5B, as indicated in FIG. 4B.

Figure 5C:
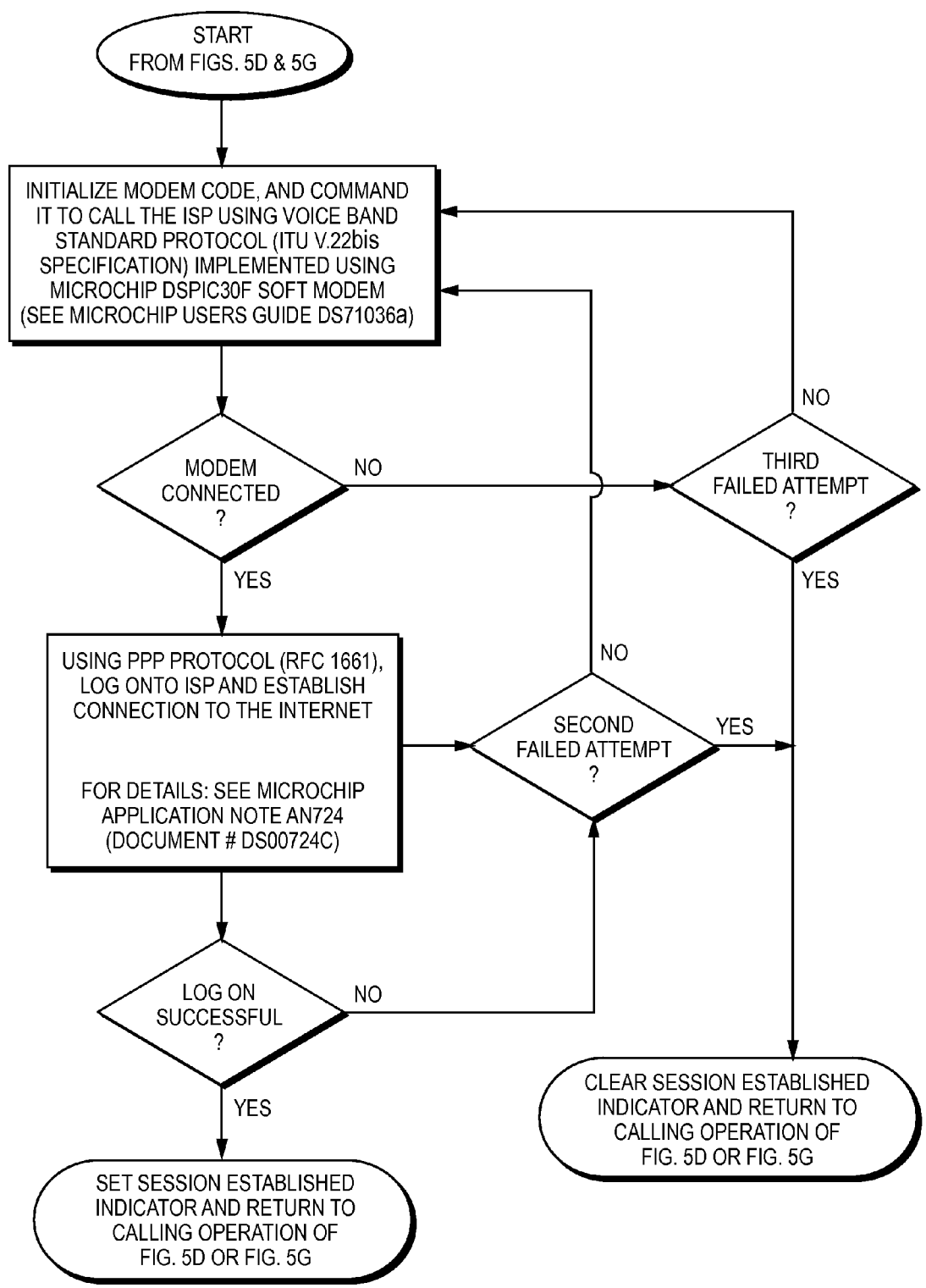
FIG. 5C is a high level flow diagram illustrating in greater detail, the make call operation performed by the home site device make call function module component of FIG. 2A included in the main loop of FIG. 5A.
Figure 5D:
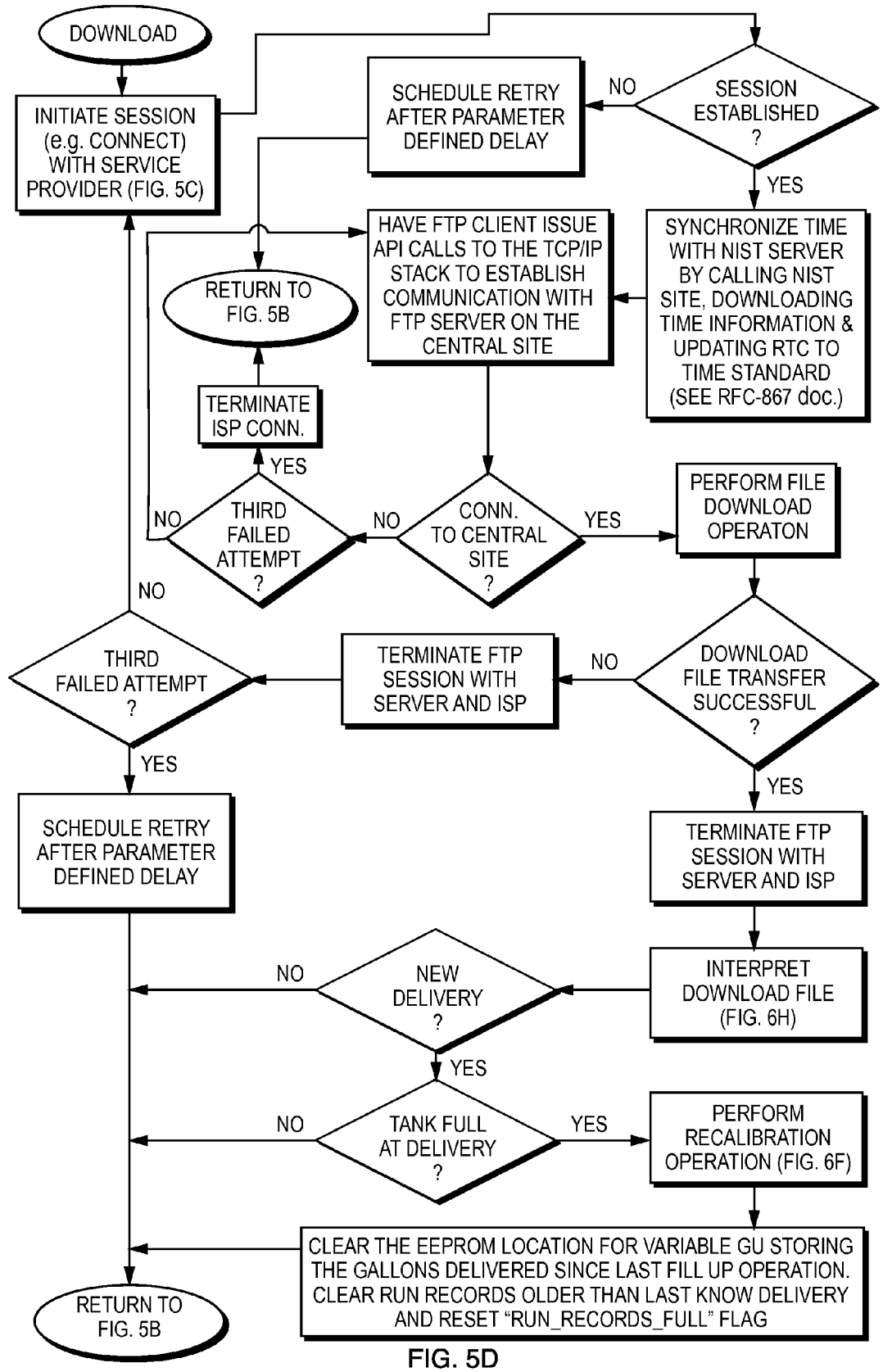
FIG. 5D is a high level flow diagram illustrating in greater detail, the download operation performed by the home site device down load function module component of FIG. 2K as part of the main loop of FIG. 5A.

In the case where the pushbutton has been just released, as in the case of the device having been first installed and powered on, the device 12 sets the call now flag to cause execution of the connection sequence as indicated in FIG. 4B (i.e. executes an ISP server connection sequence of FIG. 5C referenced in FIG. 5D). Also, the device microprocessor module component 120 sets a status flag indicator "Pbut" which is used in generating an upload file for the next upload operation. The microprocessor module component 120 then returns to executing the operations of the main loop of FIG. 5B.

As indicated in block 001 of FIG. 2L referenced in FIG. 5B, when the microprocessor component 120 during execution of the main loop acknowledges the 50 Hz flag (resets it), it sets the 5 Hz and 1 Hz flags on the counts indicated. When the 5 Hz flag is set that causes the device 12 to perform the operations of block 002 of FIG. 2L. This involves resetting the 5 Hz flag and activating the COMM LED the communication status as indicated. More specifically, the microprocessor component 120 causes the COMM LED to toggle at a rate of 5 Hz when the device 12 is connected to the central site system and when not connected, the COMM LED is placed in an off state. Next, when the 1 Hz flag has been set, the device 12 performs the main loop one second operations of block 003 of FIG. 2L. These operations include the run-time monitoring operations of FIG. 6B, end of run usage computation operations of FIG. 6C and the run event detection operations of FIG. 4C-FIG. 4D. Additionally, device 12 performs the scheduled call-in, EEPROM memory operations, soft modem and FTP client management task operations of FIG. 5B and the related operations of FIGS. 5D, 5E and 5F. As discussed herein, EEPROM memory operations include performing write operations for back up of changes in variables and population of factory default parameter values in EEPROM memory component 135. The soft modem operations include implementing ITU V.22 bis standard as illustrated in FIG. 5C and responding to commands for terminating ISP server communication connections in accordance with the operations of FIGS. 5D and 5G. The FTP client management tasks operations include implementing various well known protocols described in standard RFC specifications such as the File Transfer Protocol (FTP), Transport Control Protocol (TCP), Internet Protocol (IP) and Point to Point Protocol (PPP). For the purpose of the present invention, these operations can be considered well known in the art. These operations will be discussed herein in connection with the indicated figures.

Figure 6B:
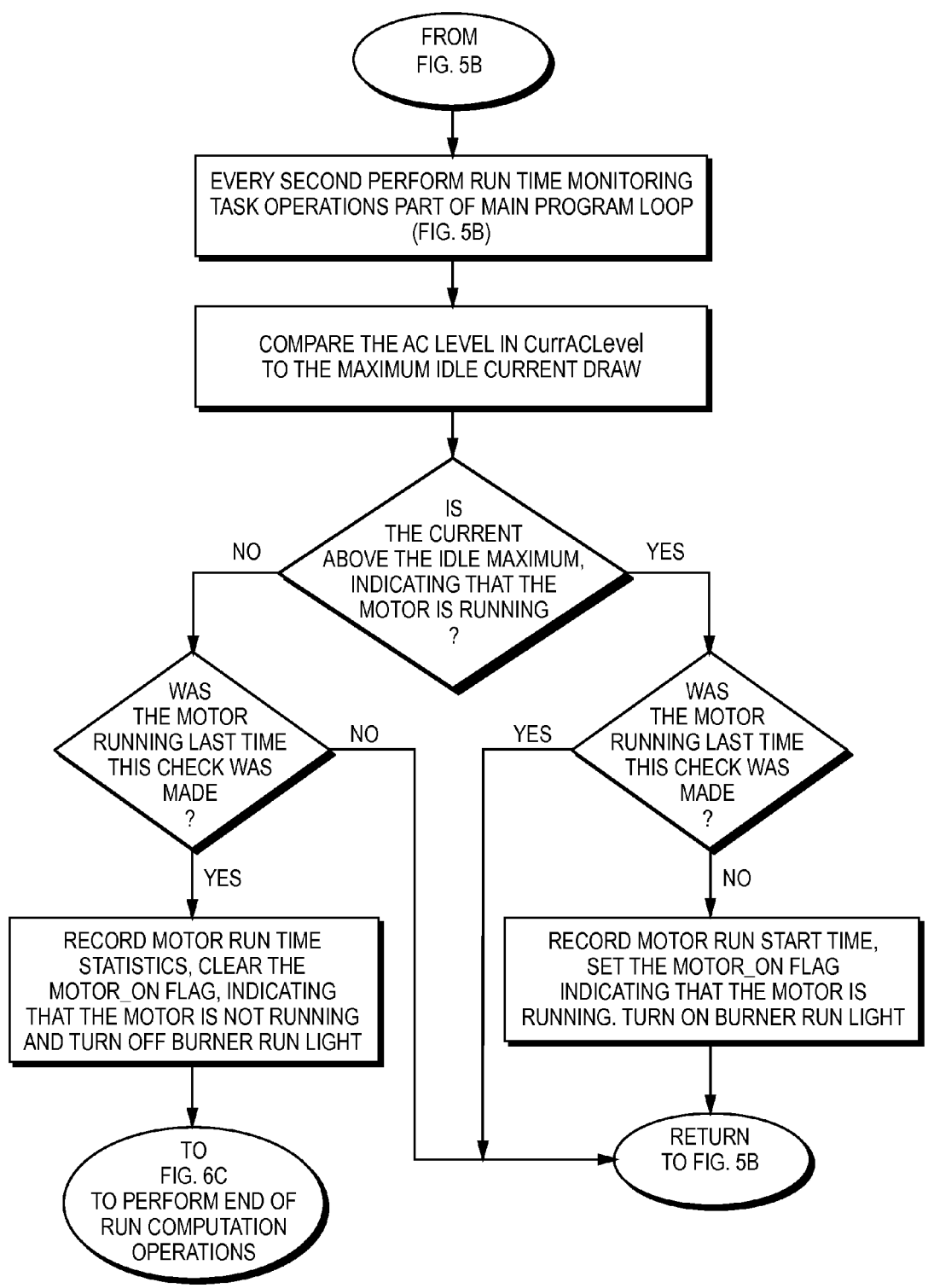

One Second Operations of Main Loop of FIG. 5B
End of Runtime Computation of FIG. 6B.

In greater detail, the main loop one second operations of FIG. 5B following the above-described sampling operation will now be described. Every second as defined by the state of the 1 Hz flag, the microprocessor module component 120 performs a run time monitoring sequence of operations used to detect the "Motor On Detected" and "Motor Off Detected" conditions indicated in FIG. 6B. The microprocessor module component 120 detects these conditions by comparing the AC level value CurACLevel stored in the assigned local memory location CurACLevel to the maximum value of idle current being drawn corresponding to the average idle current value_AvgMotCur utilized by the microprocessor component 120. It will be appreciated that the CurAC level value represents the results of performing the current monitoring operations of FIG. 6A at one millisecond intervals concurrently with executing the main loop operations. The current monitoring operations will be discussed in greater detail in connection with FIG. 6A.

As indicated in FIG. 6B, if the current is detected to be above the idle maximum value indicating that the heating system is running, the microprocessor module component 120 next determines if the heating system was not running the last time that the check was made (i.e. MOTOR_ON flag set). If that is the case, the microprocessor module component 120 records the heating system run start time and sets the MOTOR_ON flag indicating that that heating system is now running as well as returning to FIG. 5B. Also, the microprocessor module component 120 turns on the burner run light (RUN) LED on the device 12 front panel of FIG. 2A.

The microprocessor module component 120 obtains the start time from the real time clock (RTC) module component 132 that operatively connects to the microprocessor module component 120. More specifically, the microprocessor module component 120 obtains the start time value in seconds from the real time clock module component 132 and stores that time in a MOTOR ON_TIME variable location in the microprocessor module component 120's local memory.

As indicated in FIG. 6B, when the microprocessor module component 120 detects that the current value is not above the idle maximum idle value, it next checks if heating system 14 was running the last time that the check was made. If that is the case, microprocessor module component 120 records the run time values and clears the MOTOR_ON flag indicating that the heating system 14 is no longer running. That is, when the motor current falls below this threshold idle value, this signals the detection of the "motor off" condition. The microprocessor module component 120 records this time value obtained from the real time clock module component 132. More specifically, the microprocessor module component 120 obtains the stop time value in seconds from the real time clock module component 132 and stores it in a MOTOR OFF_TIME variable location of the microprocessor module 120's local memory. It then turns off the burner run light (RUN) LED on the device 12 front panel of FIG. 2A. Both on and off time values are recorded as run time statistics in the run log as described herein. The microprocessor component 120 then performs the end of run usage computation operations of FIG. 6C.

Figure 6C:
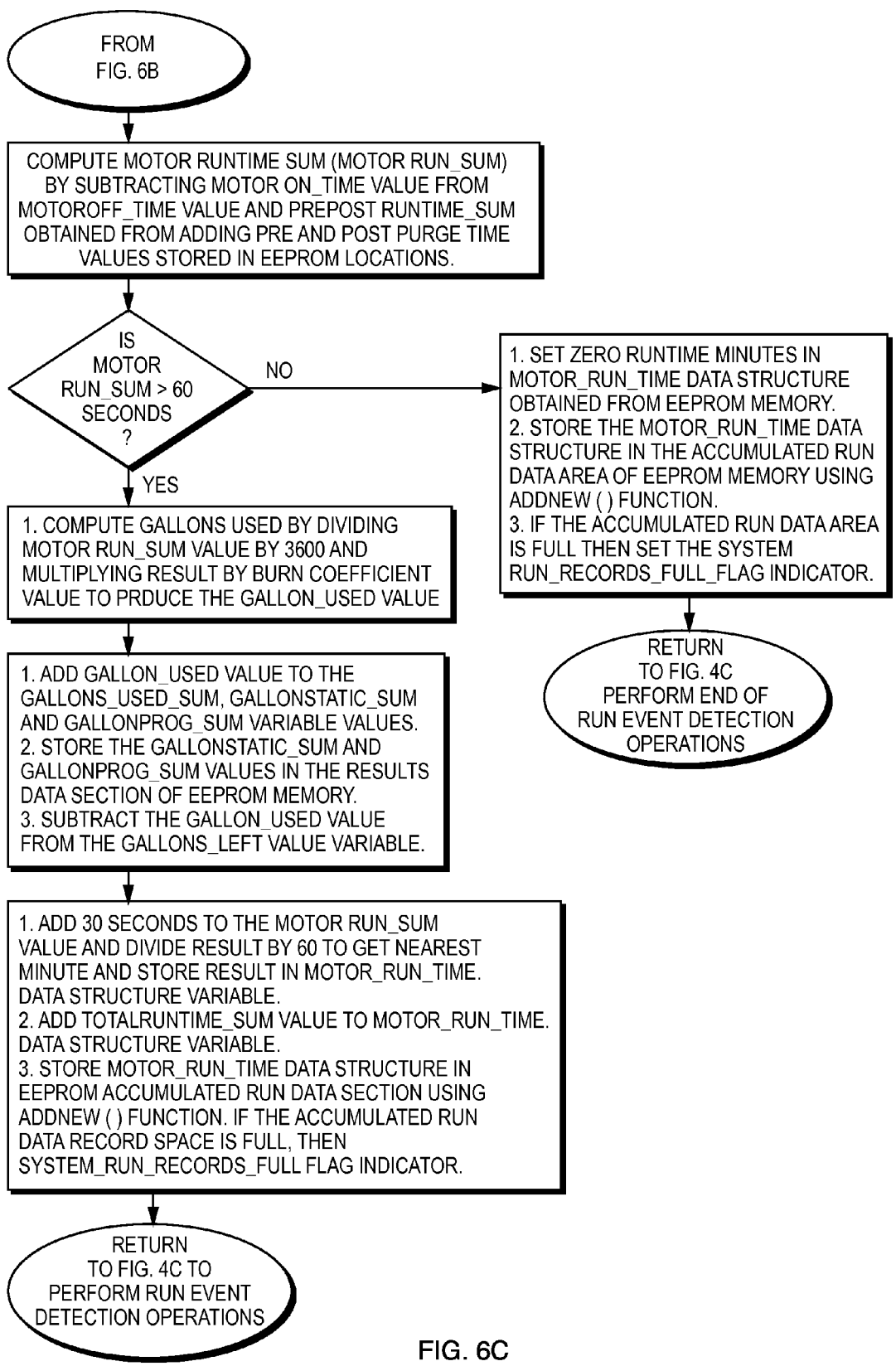
FIG. 6C illustrates in greater detail, the end of run time usage computation operations performed by the home site device as part of the main loop of FIG. 5A.

FIG. 6C—End of Run Time Usage Computation

As indicated in FIG. 6C, the microprocessor module component 120 computes the runtime sum MOTOR RUN_SUM and stores the result in the run log structure contained in EEPROM memory module component 135 as indicated in FIG. 6C. More specifically, microprocessor component 120 computes the motor runtime sum (MOTOR RUN_SUM) by subtracting the stored MOTOR ON_TIME value from the MOTOR OFF_TIME value and a PREPOST RUNTIME SUM value. This latter value is obtained by adding Pre and Post Purge Time constant values (BURN_Pre) and (BURN_Post) stored in the Fuel Burner Parameters section of EEPROM memory 135 of FIG. 3. Upon completing these operations, the microprocessor component 120 next determines if the MOTOR RUN_SUM value is greater than 60 seconds. This value establishes the minimum amount of time for recording the operation as a runtime record in contrast to being recorded as a start in the Processed Information Area of EEPROM component 135.

Start Record Processing

As indicated in FIG. 6C, when the value of the MOTOR RUN_SUM is not greater than 60 seconds, the microprocessor module component 120 executes the operations in the last box in FIG. 6C. As indicated, the microprocessor component 120 sets to zero, the runtime minutes in the Motor_Run_Time Data Structure stored in the EEPROM memory module component 135. The Motor_Run_Time data structure is then stored as a start record in the Processed Information Area Section (i.e. the Accumulated Run Data portion) of the EEPROM memory module component 135 using the AddNew( ) function. The microprocessor component 120 uses an internal counter which it increments each time a start record is recorded in Motor_Run_Time data structure in EEPROM component 135. If the Accumulated Run Data record space is detected as being full by the microprocessor component 120, it sets a System_Run_Records_Full flag indicator in its local memory.

Run Record Processing

As indicated in FIG. 6C, if value is greater than 60 seconds, the microprocessor module component 120 performs the operations of FIG. 6C to compute the motor run sum. As indicated in FIG. 6C, the microprocessor component 120 computes the gallons used by dividing the MOTOR RUN_SUM value by 3600 and multiplying the result by the Burn Coefficient value (BURN_PARMS) stored in the fuel burner parameter section (BURN_PARMS) of EEPROM memory module component 135 of FIG. 3.

The execution of the above operations results in producing a Gallons_Used value that is temporarily stored in a variable location of the microprocessor module component 120's local memory. The microprocessor module component 120 then adds the Gallon_Used value to the Gallons_Used_Sum, GallonsStatic_Sum and GallonProgUsed_Sum variables. The GallonsStatic_Sum and GallonProgUsed_Sum are stored in the assigned variable locations of the Results Data Section of the EEPROM memory module component 135 of FIG. 3. Also, the microprocessor module component 120 subtracts the local memory Gallon_Used value from a Gallons_Left variable value also stored in local memory.

After performing the above operations, the microprocessor module component 120 next computes the value for the Motor_Run_Time variable as indicated in FIG. 6C. More specifically, the microprocessor module component 120 adds 30 seconds to the MOTOR RUN_SUM value and divides the result by 60 to obtain the value to the nearest minute. The result is then stored in the Motor_Run_Time Data Structure variable location included in the Processed Information Area section of the EEPROM memory module component 135 of FIG. 3. Next, the microprocessor module component 120 adds the TotalRun_Sum value to the Motor_Run_Time Data Structure variable value and also stores this result in the Motor_Run_Time_Data Structure variable location of EEPROM component 135 using the AddNew( ) function. Also, as indicated in FIG. 6C, if the Accumulated Run Data record space is detected as being full, the microprocessor module component 120 sets the System Run_Records_Full flag indicator in its local memory.

FIG. 4C-E*nd* of Run Event Detection Operations

As indicated in FIG. 6C, the microprocessor module component 120 next performs the end of run event detection operations of FIG. 4C. As indicated in FIG. 4C, the microprocessor component 120 first determines if the AddNew( ) function was successfully performed (i.e. the Run_Records_Full flag is not set). It may be helpful at this time to discuss in greater detail, the organization of the runlog data structure referenced in FIG. 4C.

RunLog Data Structure and RUNLOG AddNew( ) Function

By way of background, the run log data structure defines a chronologically sorted database of run records. Each run record includes the following fields: the second the run started, the number of minutes the run lasted and a value for indicating that the record location actually contains a record (i.e. to facilitate counting the number of records present). On start-up, the device 12 catalogs all potential records noting the locations of the oldest valid record and the next available record along with the number of valid records present (i.e. to facilitate overrun protection).

As described in connection with FIG. 6C, the microprocessor component 120 saves the run information using the RUNLOG_AddNewRecord( ) function. This function increments a pointer to the location of the "newest record", writes the run data into that location and increments a record count value. During such recording operation, the microprocessor component 120 determines if the add new record function was successfully performed or failed because the run log section of the EEPROM component 135 was full. If it failed, the microprocessor component 120 sets the system Run_Records_Full flag during execution of the operations as indicated in FIG. 6B.

As shown in FIG. 4C, the state of the above mentioned Run_Records_Full flag is tested and if it was set, the microprocessor component 120 sets the call now flag to cause the execution of the connection sequence of FIG. 5C and then sets the call-in-critical flag indicator. Next, the microprocessor component 120 determines if the next call-in has been rescheduled to use the Critical error Frequency value specified in EEPROM component 135. It makes this determination by performing the operations of FIG. 5F as later described herein. If the call-in has not been so scheduled, the microprocessor component 120 reschedules the next call-in to use the Critical error Frequency value. The microprocessor component 120 performs this rescheduling operation by performing the operations of FIG. 5E as described herein using the Critical Error Frequency value stored in the call schedule parameters section of EEPROM memory component 135.

As indicated in FIG. 4C when the run_records_full flag was not set or the next call-in was scheduled to use the Critical Frequency value, the microprocessor component 120 next compares the remaining gallons value (Gallon_Left) processed in FIG. 6C to the Low Fuel threshold value (Low Fuel) contained in the TANKP structure stored in the system operational status data section of EEPROM component 135. When the gallons left value is less than the gallons low fuel threshold value, the microprocessor component 120 sets the low fuel threshold flag indicator "LoFuel" in its local memory to be used in generating a "CFreq" message for the next upload operation with the Status Data error code "LoFuel". It also sets the call now flag to cause execution of the connection sequence in FIG. 5C. As shown, the microprocessor component 120 then determines if the next call in has been rescheduled to use the critical error frequency value specified in EEPROM component 135. As previously discussed, it makes this determination by performing the operations of FIG. 5F as later described herein. As previously discussed, the microprocessor component 120 reschedules the next call-in to use the critical error frequency value if the call-in has not been so scheduled. The microprocessor component performs this rescheduling operation by executing the operations of FIG. 5E as described herein using the Critical_Error_Frequency value stored in the call schedule parameters section of the EEPROM component 135.

As indicated in FIG. 4C, when the low fuel threshold value has not been exceeded, microprocessor component 120 next performs the comparison operations of FIG. 4D. As shown, the microprocessor component 120 compares the gallons used sum value accumulated since the last call-in (i.e. the GallonProgUsed_Sum stored in the results data section of the EEPROM component 135) processed in FIG. 6C to the downloaded programmable usage threshold value obtained from the CIFI fuel Used Threshold structure stored in the System Operational Status Data Section of the EEPROM component 135. When the Call in Fuel Threshold value (CIFI) is exceeded, the microprocessor component 120 sets the flag indicator GProg for generating the "Gprog" threshold message when the next upload record is built. Also, the microprocessor component 120 reschedules the next call in to use the critical frequency value. The rescheduling is performed unconditionally to reduce complexity and save time (i.e. eliminates tracking, resetting and saving the state of another status flag).

If the threshold is not exceeded, the microprocessor component 120 next compares the Gallons used value since the last call-in (Gallon Static_Sum value) processed in FIG. 6C to the Fuel Used Static value (i.e. defined as 100). The Gallon Static Sum represents an accumulator sum. Every time the heating system burns fuel, the burn fuel computed value is added to Gallon_Static_Sum variable and compared to the constant value FuelUsedStatic as shown in FIG. 4C. The variable FuelUsedStatic resides in program memory and is not loaded by a parameter value provided in any upload or down load operation. It is set to a static constant value of 100 as indicated above. If Gallon Static Sum value is greater than FuelUsedStatic value, then the 100 Gallons Used flag (G100) indicator is set which is referenced in the upload section of Appendix A. The Gallons Static Sum value is then cleared and the entire operation is started over again. When the Gallon Static Sum value exceeds the Fuel Used Static value, the microprocessor component 120 sets the 100 Gallons Used flag indicator G100 that is used for generating a 100 gallon threshold message when the next upload record file is built. Also, the microprocessor component 120 unconditionally reschedules the next call in to use the Critical Frequency value. When the value is not exceeded, the microprocessor component 120 next performs the operations of FIG. 4D as indicated.

Referring to FIG. 4D, it is seen that the microprocessor component 120 first compares the motor current value contained in the high current threshold structure HICUR stored in the system operational status data section of EEPROM component 135 of FIG. 3. If the current is too high (i.e. greater than the HiCur_Limit value), then the microprocessor component 120 sets a "High Current" (HI CUR) status flag to be used for generating a HiCur status data error code message to be used for the next upload operation. When the current is not too high, the microprocessor component 120 returns to executing the main loop operations of FIG. 5B.

In addition to performing the above run event detection monitoring operations, the microprocessor component 120 performs additional monitoring functions such as checking to see if there has been an occurrence of a thermal condition or a heating system lockout condition. These operations are performed at one-minute intervals as indicated in FIG. 5B. These operations are later described with reference to FIG. 4E in the order indicated in FIG. 5B.

Figure 6D:
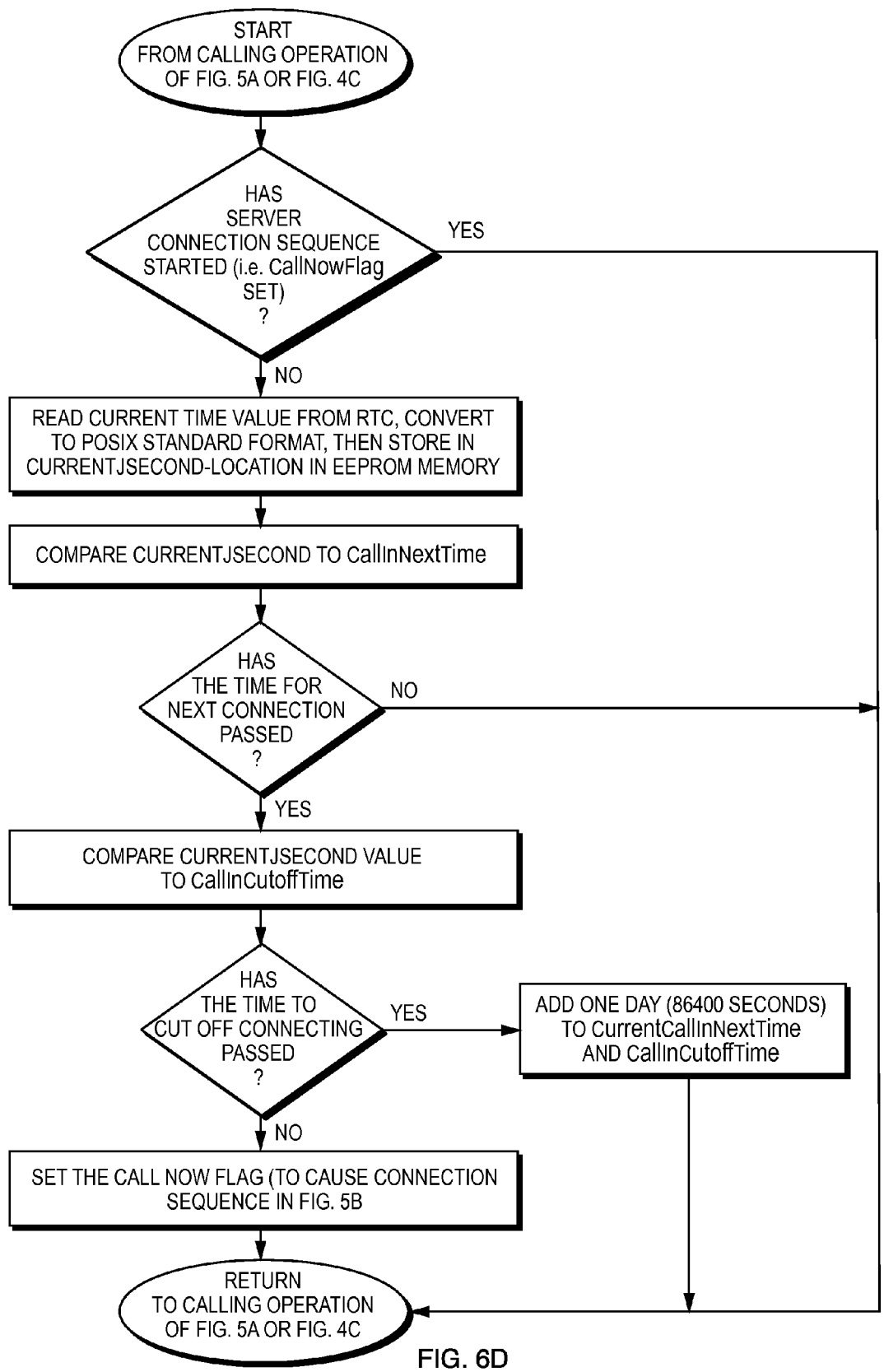
FIG. 6D illustrates in greater detail, the next call time computation operation performed by the home site device concurrently with the operations of the main loop of FIG. 5A.

Scheduled Time to Call-in Check of FIG. 6D

Upon returning to main loop operations of FIG. 5B, the microprocessor component 120 continuing with the execution of the indicated one second operations, next determines if it has reached the scheduled time to call in. The microprocessor component 120 makes this determination by performing the sequence of operations shown in FIG. 6D.

FIG. 6D

Referring to FIG. 6D, it seen that the microprocessor module component 120 after determining that the device 12 is not already calling in, it reads the current time value obtained from the real time clock module component 132. It converts the time value to the POSIX standard format and then stores this converted time value in the CurrentJsecond location of local memory of microprocessor component 120.

Next, the microprocessor module component 120 compares this value to the value stored in the CallInNextTime local memory variable. If the time for the next call has passed, the microprocessor module component 120 next compares the value CurrentJsecond to the value CallInCutOffTime. When the time has not passed, the microprocessor module component 120 sets the call now flag to cause execution of the connection sequence in FIG. 5C and then returns to executing the main loop operations of FIG. 5B as indicated in FIG. 6D. In the case where, the time has passed for making the call-in, the microprocessor module component 120 adds the seconds value equal to one day to both the CurrentCallInNextTime and CallInCutOffTime variables.

As indicated in FIG. 5B, the device 12 microprocessor component 120 next performs the remaining one second various management tasks such as those relating to the operation of EEPROM memory 135, the soft modem and FTP client management discussed above. The device 12 then returns to executing the main loop operations of FIG. 5B following the completion of these tasks. As indicated in FIG. 5B, next the device 12 determines if the call now flag has been set requesting an immediate connection to the ISP server. In the case where the device 12 had previously set the call now flag, the device 12 next performs the download operations of FIG. 5D. More specifically, as seen from FIG. 5D, device 12 first initiates a session with the ISP service provider by invoking the make call module 202 component which performs the operations of FIG. 5C resulting in establishing a connection to the central site system FTP server 200. The server connection sequence of FIG. 5C will now be discussed in greater detail.

FIG. 5C

As shown, the device 12 is initialized with the required modem code and commanded to call the ISP using a standard voice protocol implemented in a conventional manner. When the modem is connected, the device 12 logs onto the ISP site with the appropriate password information stored in the EEPROM memory via a standard PPP protocol. Assuming that the log on is successful, the device 12 seta a Session Established indicator and returns to the calling operation of FIG. 5D. In the event that the attempt to connect the modem fails or the attempt to log on fails, the device 12 repeats the operations several times. As indicated in FIG. 5C, if the attempts still fail after a third failed attempt, the device 12 clears the Session Established indicator and returns to the calling operation of FIG. 5D.

FIG. 5D Download Operation of Main Loop of FIG. 5B

In the case of a successful log on as indicated by the set state of the Session Established indicator, the microprocessor component 120 returns to execute the download operations of FIG. 5D. As shown in FIG. 5D, assuming that a session was established, the microprocessor component 120 next performs the operations for synchronizing its time with the NIST server. First, the microprocessor component 120 accesses the NIST timeserver located at the following URL: http//132.163.4.101.14. The microprocessor component 120 uses the time values to update the contents of the real time clock module component 132. The following four time formats are used in conjunction with the operation of the real time clock module component 132 and its synchronization to the NIST timeserver standard.

1. The first is "the tick" which is a free running counter that starts at zero following the resetting of the home site monitor device 12 and is incremented every milliseconds.

2. The second is a "Julian Second" which is a POSIX format timestamp. This format is defined by the POSIX specification for the return of "time ( )" function. More specifically, it is a 32 bit integer representing the number of seconds (excluding NIST added leap year second) since 1 Jan. 1970.

3. The third is "time strings" which are Time values held as strings that are returned from the NIST timeserver; and 4. The fourth is a TimeSync structure that is used to hold a local copy of what the real time clock module component contains and a copy of the current tick value taken when the real time clock module component was last read. The TimeSync structure contains the following fields:

| Field Name Code Designation | Valid Range | Description |
| --- | --- | --- |
| RealTimeTick | $0-(2^{32} - 1)$ | 20 ms tick as defined in the first format |
| Second | 0-59 | Current Second |
| Minute | 0-59 | Current Minute |
| Hour | 0-23 | Current Hour (military format) |
| DayOfWeek | 0-6 | Number for Day Of Week |
| DayOfMonth | 1-31 | Day Of Month |
| Month | 1-12 | Number of Month |
| Year | 0-99 | Last two digits of the year |
| Century | 0-1 | 1 = 1900's; 0 = 2000's |

The NIST timeserver returns a standard time string compliant with the Daytime protocol described in the Internet document RFC-867. This time string consists of a Modified Julian day number, followed by the current date and a time of day in a formatted string containing fields in fixed locations. For further information regarding this string and the service used, reference may be made to the web page located at http//tf.nist.gov/timefreq/service/its.htm.

The microprocessor module component 120 operates to convert the time values needed to set the real time clock module component 132 into binary coded decimal format from the fixed formatted time string. This is done by converting the numerical values at the following locations based on the number of characters from the beginning of the time string:

1. Locations 0-4 contain a Modified Julian day number that is not used by home site monitor devices 12;
2. Locations 6,7 contain the last two digits of the current year;
3. Locations 9,10 contain the value for the current month;
4. Locations 12, 13 contain the value for the current day of the month;

5. Locations 15, 16 contain the value for the current hour (24H format;
6. Locations 18, 19 contain the value for the current minute; and
7. Locations 21, 22 contain the value for the current second.

The following is an example time string obtained from the NIST basic timeserver:

54189-07-03-30 15:20:35 50 0 0 427.8 UTC (NIST)

wherein:
54189=the Modified Julian day for 30 Mar. 2007;
07=the year;
03=the month;
30=the day of the month;
15=the current hour of the day (in this case 3 pm);
20=the current minute; and
35=the current second.

The above converted binary coded decimal value is loaded into the real time clock module component 132 and that completes the operation of synchronization of the module component 132 to the NIST time standard. The make call module component 202 terminates the connection to the NIST timeserver and then makes calls to the FTP client component 200F to establish a connection with the Central site system FTP server 200. As indicated in FIG. 5D, when the session has not been established (Session Established Indicator is not set), the microprocessor component 120 schedules a retry after a period of delay specified in the delay parameter followed by returning to FIG. 5B.

As indicated, the microprocessor component 120 causes uses the FTP client component 200F to issue a series of API calls to the TCP/IP stack control function to establish the connection with the central site system 20 server in the manner previously discussed. If the connection has not been established, the microprocessor component 120 returns to the FTP client component 200F to have further attempts made to establish communications with the central site system 20 server. After three failed attempts, the FTP client component 200F terminates the ISP connection established by performing the operations of FIG. 5C. The microprocessor component 120 then returns to FIG. 5B as indicated.

Once the home site monitor device 12 establishes a connection with the FTP server 200, the microprocessor module component 120 sends FTP commands to the central site system 20 server. The FTP command causes the downloading the named file from named download directory (i.e. specified in the initialization file). As indicated, when the downloaded file has been successfully transferred, the microprocessor component 120 terminates its connection with the FTP server 200 and ISP as shown in FIG. 5D. This determination is performed in a well known manner. Briefly, the FTP protocol defines a control message (i.e. a transfer complete code) that the server generates when the last byte of the file being transferred arrives at the data channel. The FTP home site device 12 FTP client component 200F/state machine watches for the arrival of this control message and upon its receipt causes the state machine to transition to a download or upload successful state. If the transfer is not successful, the microprocessor component terminates the FTP session with the server and ISP and makes further attempts to initiate the session by again performing the operations of FIG. 5C. After making three unsuccessful attempts, the microprocessor component 120 schedules a further retry after the period of time specified by the delay defined parameter.

The above described FTP client operations are implemented through the use of FTP client commands described in the published RFC 959 document entitled "File Transfer Protocol". For convenience, a discussion of the commands used to carry out the required operations is included in the GLOSSARY located at the end of the description of the illustrated embodiment.

FIG. 5D Interpretation of Download File Parameters

Figure 6E:
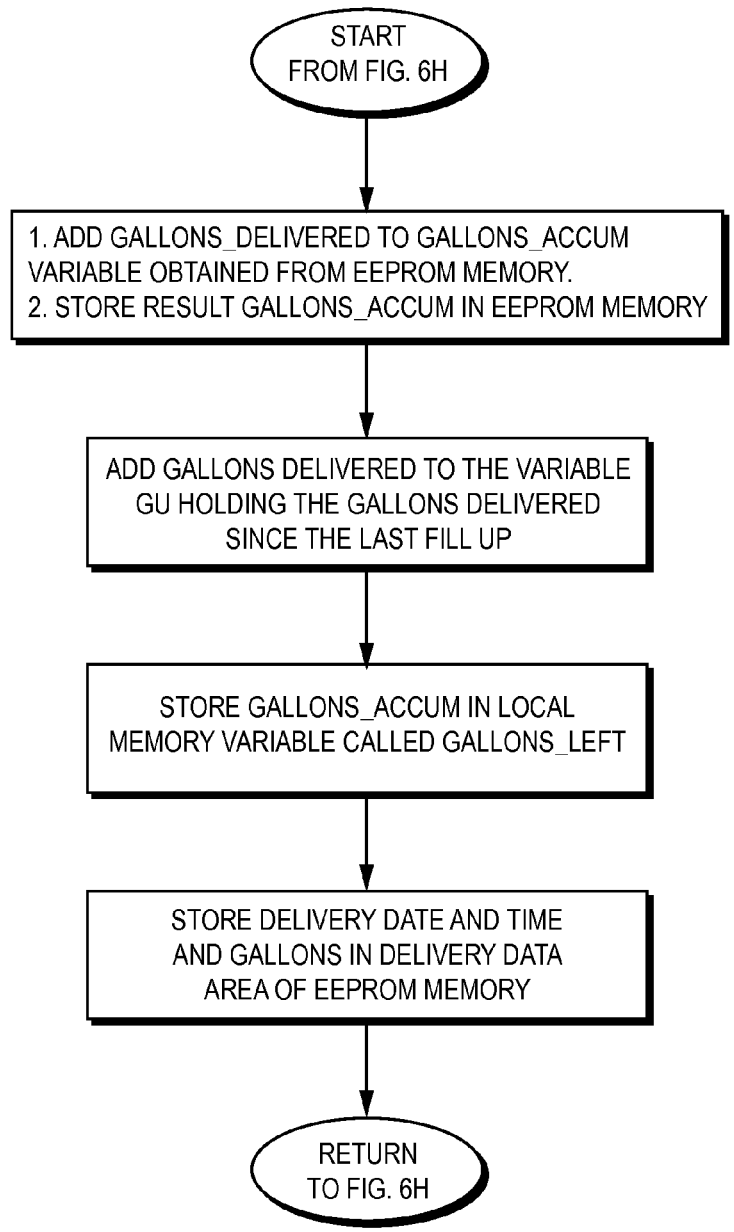
FIG. 6E illustrates in greater detail, the update fuel accumulation operations performed by the home site device according to the teachings of the present invention as part of the download operations of FIG. 5D.
Figure 6F:
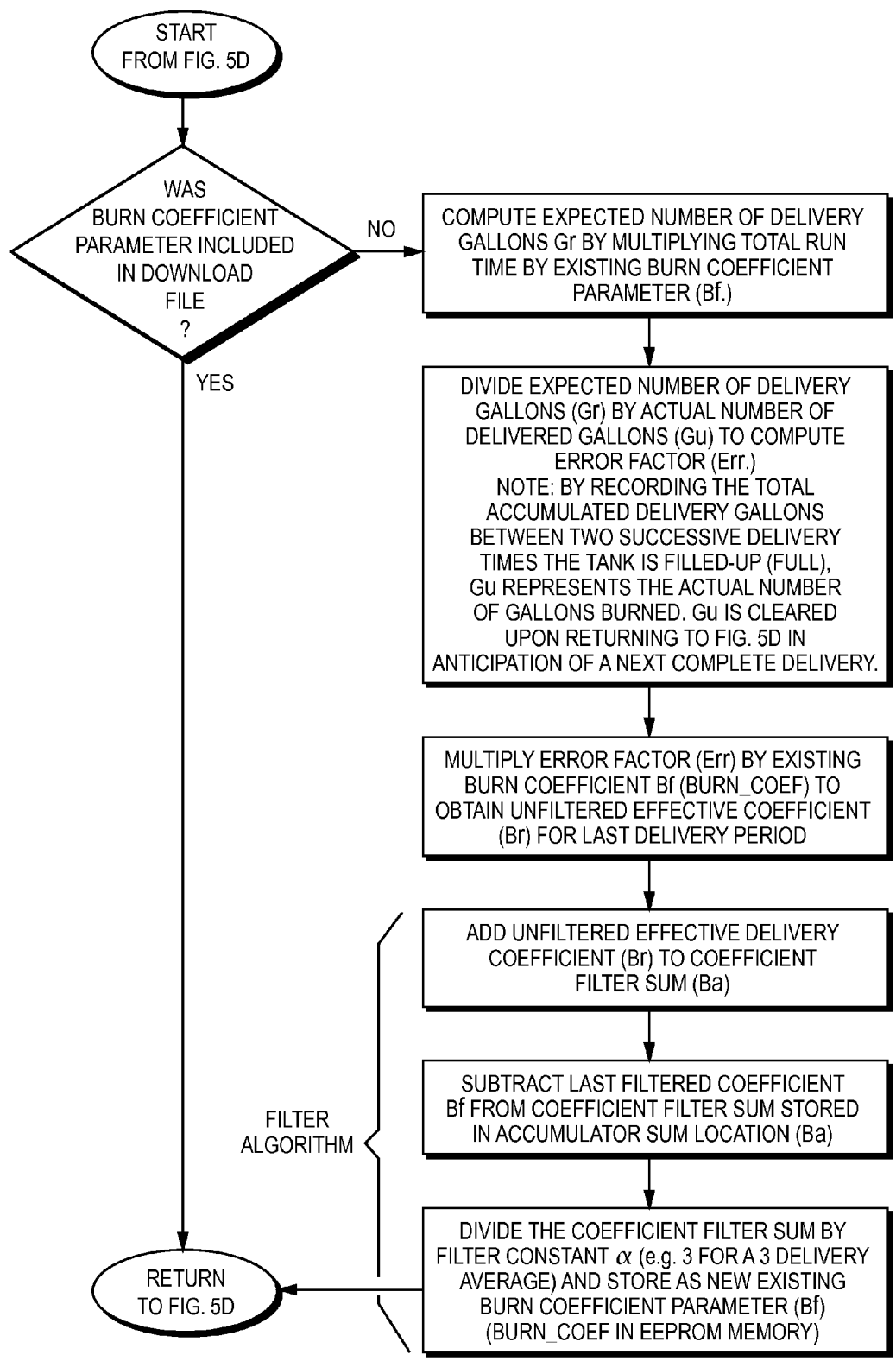
FIG. 6F illustrates the operations performed by the home site device in updating the burn coefficient parameter value according to the teachings of the present invention as part of the download operation of FIG. 5D.
Figure 6G:
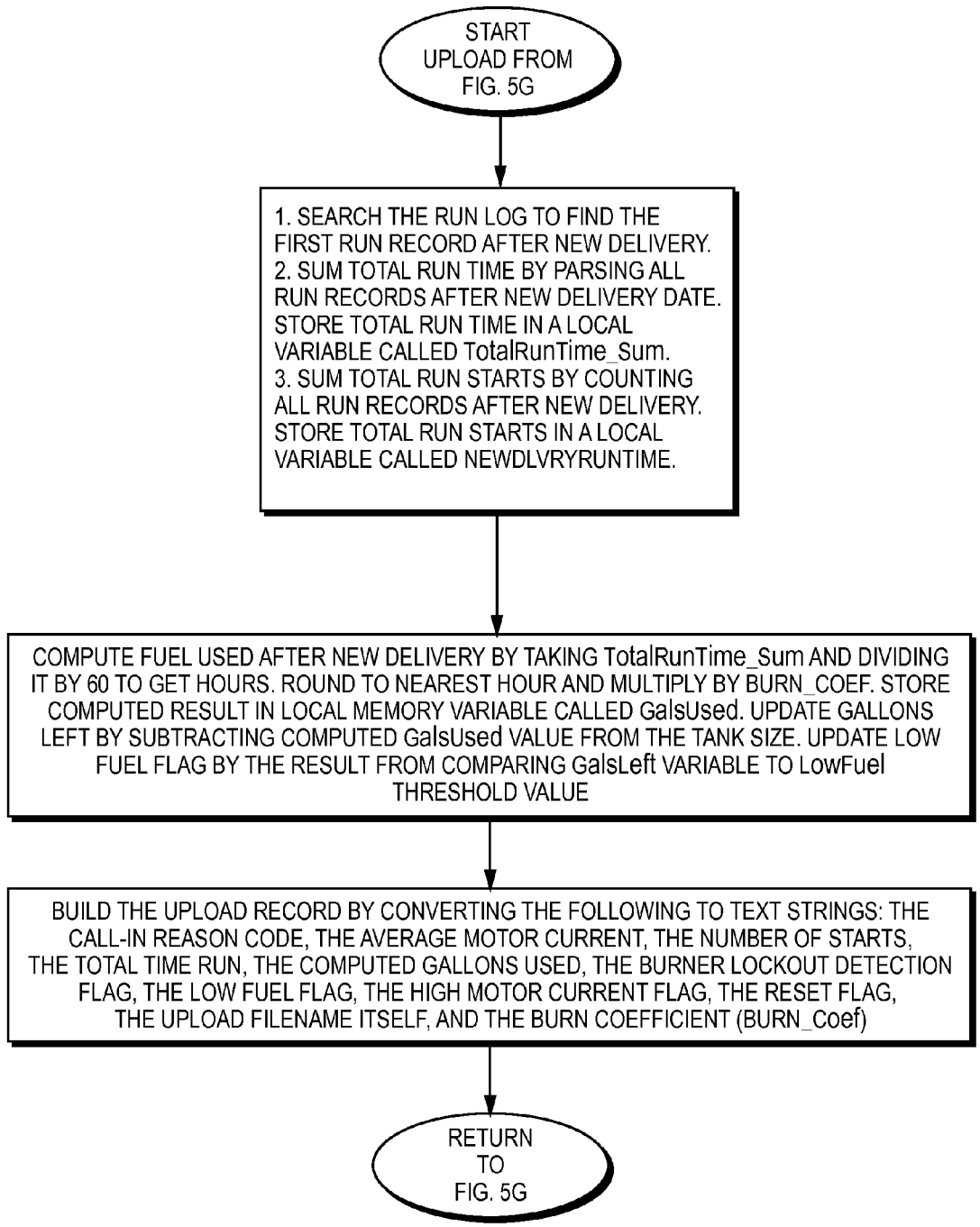
FIG. 6G illustrates in greater detail, the parse run record logs, calculate fuel used, and build upload record file operations performed by the home site device as part of the upload operation of FIG. 5G.
Figure 6H:
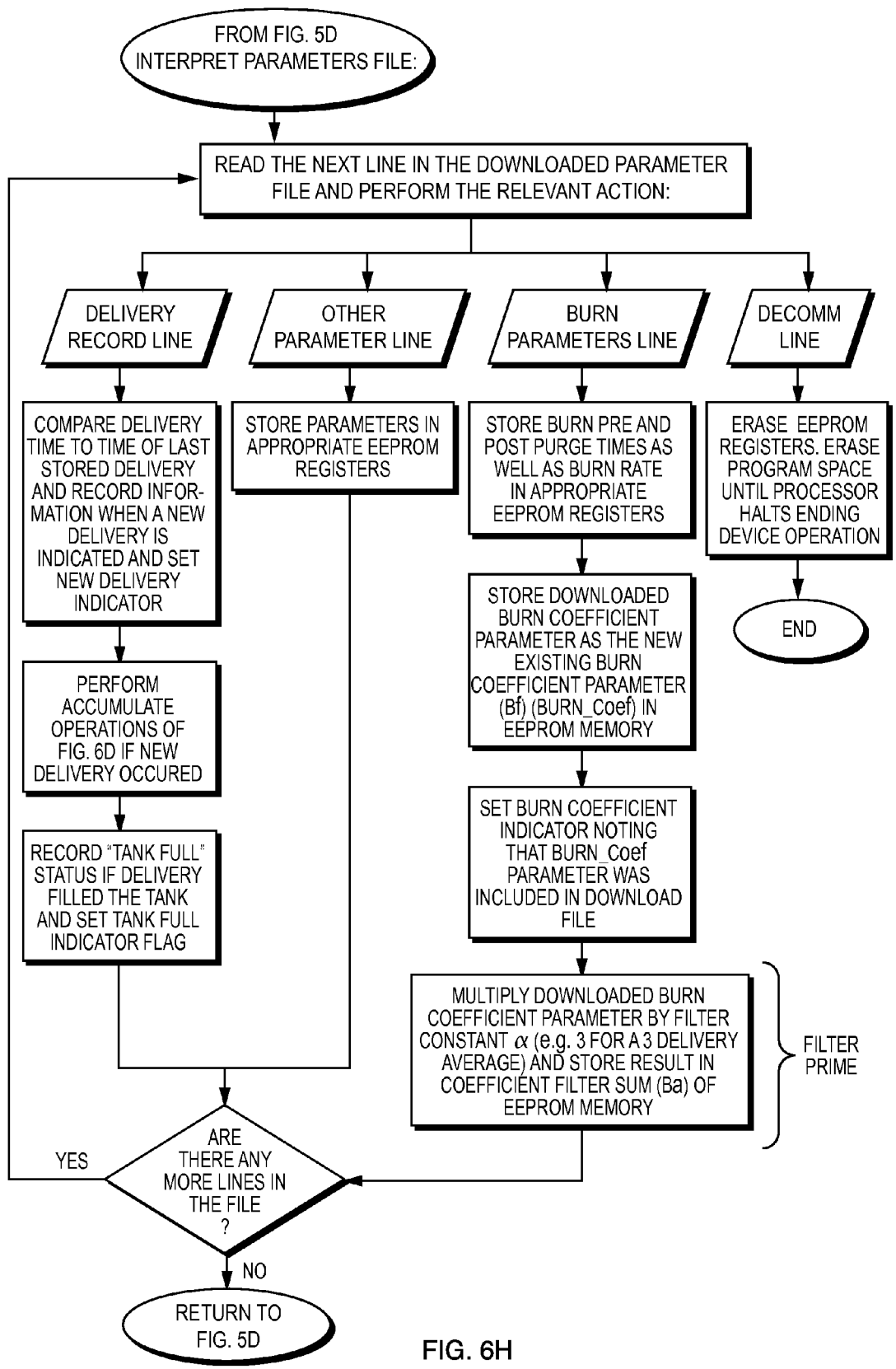
FIG. 6H illustrates in greater detail, the operations performed by the home site device in interpreting a downloaded file as part of the download operation of FIG. 5D according to the teachings of the present invention.

As indicated in FIG. 5D, the microprocessor module component 120 begins processing the down loaded file parameter records by performing the operations of FIG. 6H. Referring to FIG. 6H, it is seen that the microprocessor component 120 processes each line of the file by reading in each line at a time and performing the relevant action or operation. Each line includes a parameter code that indicates the type of parameters including in the line. As shown, by way of illustration, there are four categories of record lines that are processed. When the record line contains delivery data (i.e. delivery record line), the microprocessor component 120 checks for new fuel delivery dates by comparing the delivery time to the time of the last stored delivery. If the results of the comparison indicate a new delivery, the microprocessor component 120 records that information in the delivery data section of the EEPROM component 135 of FIG. 3 as discussed above. The microprocessor component 120 also sets a New Delivery indicator. When a new fuel delivery has been recorded, the microprocessor module component 120 next performs the operations indicated in FIG. 6E that results in the accumulating/updating and storage of the parameter Gallons_Accum location in EEPROM memory component 135.

FIG. 6E Accumulating Data

Considering the accumulating operations in greater detail, the microprocessor component 120 adds the number of gallons delivered specified in the new delivery data contained in the delivery record line of FIG. 6H to the Gallons_Accum variable value obtained from EEPROM component 135. The resulting sum is then stored in the EEPROM Gallons_Accum variable and in a local memory variable called Gallons_Left. Also, the microprocessor component 120 adds the number of gallons delivered to the variable GU that stores the gallons delivered since the last fill up operation. Additionally, the microprocessor component 120 stores the delivery date and time included in the new delivery record line in the delivery data section of EEPROM component 135. Lastly as indicated in FIG. 6H, upon completing the operations of FIG. 6E, the microprocessor component 135 records or sets the Tank Full flag indicator when the delivery filled up the heating system tank that is used to signal performance of a recalibration operation as discussed herein.

As indicated in FIG. 6H, next the microprocessor component 120 processes the other parameter line (checks for new parameters) and stores the parameters in the appropriate sections of the EEPROM component 135 (e.g. Internet service parameters, call scheduling parameters). This processing is followed by processing the burn parameter line. As shown, the microprocessor component 120 stores the fuel heating parameters such as burn pre and post purge times as well as the burn rate in the fuel heating parameter section of the EEPROM component 135.

Additionally, as indicated in FIG. 6H, the microprocessor component 120 stores any downloaded burn coefficient parameter as a new existing burn coefficient value corresponding to (Bf) in the BURN_COEF location of the EEPROM component 135. Also, as indicated, the microprocessor component 120 sets a burn coefficient indicator noting that the burn coefficient parameter was included in the downloaded file. Next, the microprocessor component 120 performs a prime filter operation as indicated in FIG. 6H. Briefly, the microprocessor component 120 multiplies the burn coefficient parameter by the filter constant α selected as three, equivalent to dividing by α (e.g. 3 for a 3 delivery average).

The microprocessor component 120 then stores the result in the coefficient filter sum accumulator (Ba) location in the Processed Information Area of EEPROM memory component 135 as shown in FIG. 3.

As shown in FIG. 6H, the microprocessor component 120 also processes a DECOM parameter line when it is included in the downloaded file. This line contains a command parameter value that causes the microprocessor component 120 to erase the EEPROM component 135 resulting in the microprocessor component 120 terminating all operations. In greater detail, upon parsing the "DECOMM" line in the download file, the microprocessor component 120 performs the following operations in response to the command:
1: it systematically erases all the run log information;
2: it systematically erases all the stored EEPROM run parameters; and
3: it systematically erases all the program space by repeatedly calling the code listed in the Microchip DSPIC33F Family Reference Manual Section 5.4.2.2; example 5-6 (DS70191B.pdf; page 5-9), specifying each page sequentially starting at page 0, and finishing when it reaches itself. Once the page with the self-erase code is wiped out, the microprocessor component 120 will then attempt executing code in the blanked out space and then go into an idle/reset state. Due to the destructive nature of the DECOM command, the command does not depend on either the presence or absence of any other parameters in the downloaded file. They can be present, but will have no effect.

Upon completing the operations of FIG. 6H, the microprocessor component 120 returns to FIG. 5D.

As shown in FIG. 5D, the microprocessor component 120 next tests the state of the new delivery indicator that may have been set during the processing of the delivery record line discussed in connection with FIG. 6H. In the case of a new delivery, the microprocessor component 120 then tests the state of the Tank Full indicator that also may have been set during the processing of the delivery record line in connection with FIG. 6H. When both indicators are set, the microprocessor component 120 performs the recalibration operation according to the teachings of the present invention. This operation will now be described with reference to FIG. 6F.

FIG. 6F Home Site Device Recalibration Operation

FIG. 6F illustrates the operation of the home site device in recalibrating itself using new delivery information that it downloaded from the central site system 20 during a down load operation. More specifically, the home site device uses the actual number of delivered gallons information contained in the new delivery information to update the burn coefficient (BURN_Coef) value stored in the EEPROM memory component 135. As previously discussed, this process makes the BURN_Coef value more accurate over time and is able to be utilized by the central site system 20 in improving its scheduling of deliveries and in predicting fuel usage as discussed herein in connection with FIG. 8.

Before discussing the operation of the home site, it is helpful to understand the home delivery process. Each time a fuel delivery is made that results in the home site fuel tank being filled up, this provides an opportunity for the home site device 20 to compute what the actual burn rate was or has been over the most recent period that fuel was last delivered. One problem is that there are conditions or errors that can creep into the heating system that can affect the accuracy of the amount of gallons of fuel delivered. For example, during each fill-up operation, fuel delivery personnel may not shut off the fuel shutoff valve exactly at the same point each time after hearing a sound indication (whistling) to stop the fill-up operation. This can cause a discrepancy in gallons of fuel delivered during each fill-up operation.

These disparities can be viewed as "noise" within the heating system. Therefore, if the number of gallons of fuel delivered were to be used directly, this could cause the computed BURN_Coef value to keep varying back and forth. For example, the home site device 20 after a first fill-up delivery could compute the coefficient to be 1.2 gallons per hour, then after a second fill-up delivery compute it to be 1.0 gallons per hour. After a third fill-up delivery the device 20 could again compute it to be 1.2 gallons per hour, this all being caused by "noise" occurring within the operation of the heating system.

This approach has been determined as not providing the type of adjustment that would result in the most accurate recalibration of home site device operation with the actual amount of fuel being delivered. Therefore, in order to eliminate the "noise" factor, the recalibration process includes the utilization of a moving average adjustment termed "exponentially-weighted moving average" of the most recent computation of the BURN_Coef value in order to provide accurate recalibration.

As explained herein in greater detail, the recalibration algorithm utilized in the illustrated embodiment of the home site device 20 includes the steps that basically take a portion of the most recent computed BURN_Coef value which it combines with the accumulated BURN_Coef value. The accumulated value essentially reflects the history of fill-up deliveries made over time since the central site system 20 initialized or changed the BURN_Coef value. Using such a device or algorithm, the coefficient of the filter algorithm can be adjusted to make it operate at a faster or slower rate. This results in using less of the most recent data (i.e. most recent computed BURN_Coef value) and more of the accumulated data (i.e. accumulated BURN_Coef value) or visa versa. The value of "3" specified in FIG. 6F was selected as an example but is not intended to be a limitation on the values that can be selected.

With this background, the recalibration operation performed by the home site device 20 will be now described with reference to FIG. 6F. As stated, a value of 3 (⅓ or 0.333) was selected for a convergence coefficient $\alpha$ described herein, was selected for establishing the portion of the most recent computed coefficient value to be combined with the accumulated value. This means that 33 percent of the most recent computed coefficient value will be utilized. This value was selected to provide a reasonable adjustment. For example, it will be appreciated that a value of 0.01 if selected would take too long to adjust or recalibrate the coefficient while a value of 1.0 would be the same as using the most recent computed value. Thus, the value of 0.333 should be a reasonable choice. It will be appreciated that other values could also have been selected to provide accurate results over a reasonable number of delivery fill-up operations which in this case is three. In the illustrated embodiment of the present invention, the microprocessor component 120 is "hardwired" to provide a fixed value for $\alpha$. However, it will be appreciated that it is easy to make the value of $\alpha$ programmable (i.e. included as a parameter in the downloaded initialization file). This has been deemed unnecessary since it can be predetermined in advance.

Development of the Filtering Algorithm Pseudo Code

The filtering algorithm pseudo code utilized in FIG. 6F is derived from the following pseudo code known and described as being used to simulate the effect or operation of a low-pass filter on a series of digital samples:

```
// Return RC low-pass filter output samples, given input samples,
// time interval dt, and time constant RC
function lowpass(real[0..n] x, real dt, real RC)
    var real[0..n] y
    var real α := dt / (RC + dt)
    y[0] := x[0]
    for i from 1 to n
        y[i] := α * x[i] + (1-α) * y[i-1]
    return y
```

The loop which computes each of the n outputs can be refactored into the equivalent:

for i from 1 to n $$y[i] := y[i-1] + \alpha*(x[i] - y[i-1]).$$

That is, the change from one filter output to the next is proportional to the difference between the previous output and the next input. This exponential smoothing property matches the exponential decay seen in a continuous-time system. As indicated, as the time constant RC increases, the discrete-time smoothing parameter α decreases, and the output samples ($y_1, y_2, \ldots, y_n$) respond more slowly to a change in the input samples ($x_1, x_2, \ldots, x_n$) the system will have more inertial. For further information on the described algorithm pseudo code, reference may be made to the material located at the following Wikipedia site: http://en.wilipedia.org/wiki/Low-pass_filter.

The above pseudo code has been made more efficient and faster by eliminating the need to re-read run records from the EEPROM component 135 run log section. Also, eliminated is the need to perform tracking, summing and dividing operations on the last three burn coefficient values in this case (or more coefficient values when other values of α are selected) for computing a traditional moving average. The first need is eliminated by utilizing an error value determined from the ratio of fuel usage computed and reported since the last fill-up operation. The second need is eliminated by algebraically rearranging the terms of the above resulting equation for y [i] so that the indicated two multiplication operations can be replaced by a single divide operation. This simplification can be made as follows:

$$y[i] = \alpha*x[i] + (1-\alpha)*y[i-1]$$

$$y[i]/\alpha = x[i] + (1-\alpha)*y[i-1]/\alpha$$

$$y[i]/\alpha = x[i] + y[i-1]/\alpha - \alpha*y[i-1]/\alpha$$

$$y[i]/\alpha = x[i] + y[i-1]/\alpha - y[i-1]$$

$$y[i] = (x[i] + y[i-1]/\alpha - y[i-1])*\alpha \quad \text{(IIR Filter Equation)}.$$

As used herein, the designation Ba is used to represent the filter accumulator value that corresponds to the variable (y[i-1]/α in the IIR filter equation. The designation Bf is used to represent the filtered coefficient value (BURN_Coef) that corresponds to the variable (y) in the IIR filter equation. The existing value of the filtered coefficient value represented by Bf [existing] corresponds to the variable y [i-1] in the IIR filter equation while the computed new filtered coefficient value represented by Bf [new] corresponds to the variable y[i]. The designation Br is used to represent the unfiltered burn coefficient value based on fuel usage computed from the last delivery and corresponds to the variable x[i] in the IIR filter equation. When Ba, Bf and Br are substituted into the above IIR filter equation, this results in the following expression:

Bf [new]=(Br+Ba−Bf [existing])*(1/filter constant). In the IIR filter equation, a value of ⅓ or 0.33 for α was established by specifying a value of 3 for the time constant as indicated above.

As described herein in greater detail, the device microprocessor controller component 120 maintains or stores the BURN_Coef accumulator value designated as Ba in a similarly designated accumulator sum location Ba of EEPROM memory component 135 that is representative of previous computed coefficient values. This makes it possible to implement the IIR filter algorithm by just adding the instantaneous value designated as Br representative of the unfiltered input burn coefficient value followed by subtracting the last filtered value designated as Bf [existing] from Ba and then dividing the result by 3 or by multiplying the result by a (e.g. ⅓ or 1/time constant RC in the initial equation). This sequence of operations provides the new filtered value designated as Bf [new] that is then stored as the new BURN_Coef value in location BURN_Coef of EEPROM component 135.

Now, considering the sequence of operations illustrated in flow chart of FIG. 6F, it is seen that the microprocessor component 120 enters this sequence as indicated in FIG. 5D as a result of the home site device 20 having detected the presence of a "tank full" condition flag that was set by the central site system 200 in the appropriate record parameter contained in the downloaded file. Prior to this time, the setting of the parameter flag occurred during the processing of the burn parameter line (i.e. detection of the presence of a BURN_Coef parameter) as previously discussed in connection with FIG. 6H. As previously described, this caused the home site device to prime the filter algorithm with the specified BURN_Coef value so that it behaves as if the system had always been operating at that specified value.

As shown in FIG. 5D, the detection of a "tank full" flag at delivery having been set causes the microprocessor component 120 to perform the recalibration operation by executing the sequence of operations indicated in the right hand branch of the flow chart of FIG. 6F. As shown in FIG. 6F, the microprocessor component 120 first computes what is expected to be the number of delivery gallons (Gr) by multiplying the total runtime of the heating system occurring between two fill-up delivery times by Bf [existing] stored as the BURN_Coef parameter in EEPROM component 135. Next, as indicated by the next block of the FIG. 6F, the microprocessor component 120 divides the expected/computed number of gallons used Gr by the actual number of gallons delivered Gu to obtain an error factor value designated as Err. The values designated as Gr and Gu are then stored in the appropriate locations of the Processed Information Area of EEPROM component 135 of FIG. 3.

As shown in FIG. 6F, the microprocessor component 120 next multiplies the computed error factor value Err by the value designated as Bf [existing] stored as burn coefficient value BURN_Coef in EEPROM component 135 to obtain the unfiltered effective coefficient value Br for the last delivery period (i.e. time between the last two fill-up deliveries).

Next, as shown, the microprocessor component 120 performs the operations or steps of the filter algorithm implemented by the above described pseudo code. This effectively passes the computed unfiltered effective coefficient value Br through the filter algorithm. As shown in implementing the filter algorithm of FIG. 6F, the microprocessor component 120 first adds the unfiltered effective coefficient value Br to the coefficient filter sum value stored in the accumulator sum Ba of EEPROM memory component 135.

Next, the device 12 subtracts the last filtered coefficient value Bf (existing) stored as parameter BURN_Coef in EEPROM memory component 135 from the filtered sum value stored in accumulator sum Ba. For the selected value of α equal to ⅓, Ba is now composed of ⅔ of the old coefficient value Bf (existing) plus ⅓ of the unfiltered effective coefficient value Br. At this time, the accumulator sum Ba holds a value equal to three times the new filtered coefficient value Bf [new]. This resulting value of Ba is then divided by 3 (multiplied by a) to produce the new filtered value Bf (new) (i.e. BURN_Coef) to be used in the next recalibration operation for estimating the amount of fuel remaining in the heating system fuel tank and is also used as the new BURN_Coef to compute fuel burn rate. The microprocessor component 120 stored the new filtered value Bf as the new existing burn coefficient parameter in the BURN_Coef location of EEPROM memory 135. The microprocessor component 120 then returns to executing the operations of FIG. 5D.

As indicated in FIG. 5D, upon completing the recalibration operation of FIG. 6F, the microprocessor component 120 then clears the EEPROM location for storing the variable GU in anticipation of a next complete delivery. Also, the microprocessor component 120 clears the run records having delivery dates older than the last known delivery date and resets the system Run_Records_Full flag. This recalibration sequence of operations of FIG. 6F is performed each time that the microprocessor component 120 detects the occurrence of a new delivery of fuel that fills up the heating system tank as indicated by the setting of the new delivery and tank full indicator flags. That is, this same sequence of operations is performed for each occurrence of a fuel fill-up delivery and after 12 such deliveries, the portion of the most recent computed coefficient value will be within 99% of the real burn rate regardless of the initial value. This means that the fuel burn coefficient value computed by the home site device 20 becomes synchronized or recalibrated based on the actual fuel amounts being delivered. Stated differently, over time the fuel usage values established by the home site device 20 very closely approximates the actual amounts of fuel being delivered.

Figure 5E:
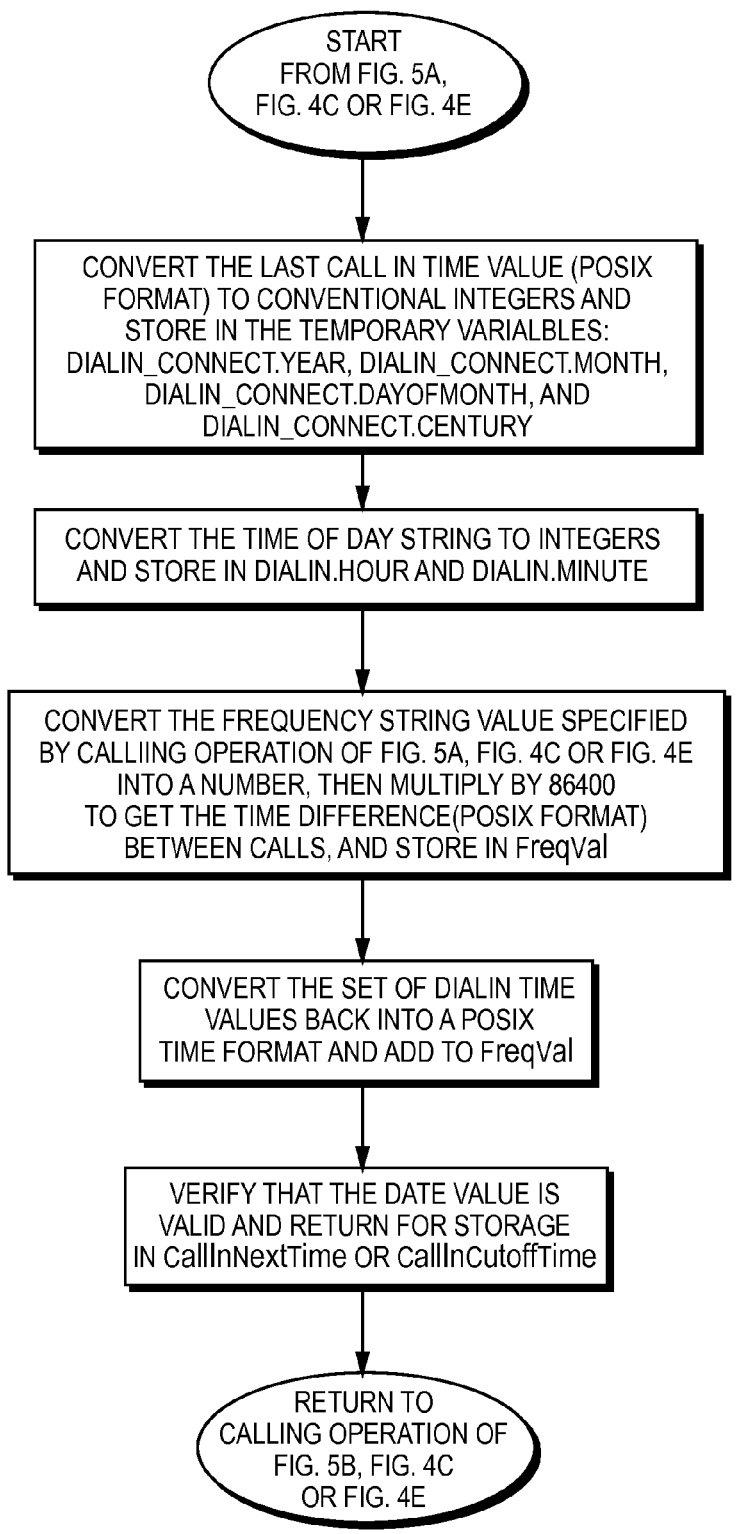
FIG. 5E is a high level flow diagram illustrating the call scheduling computation operations performed by the home site device as part of the main loop of FIG. 5A and the run event detection operations of FIG. 4C, FIG. 4D and FIG. 4E.
Figure 5F:
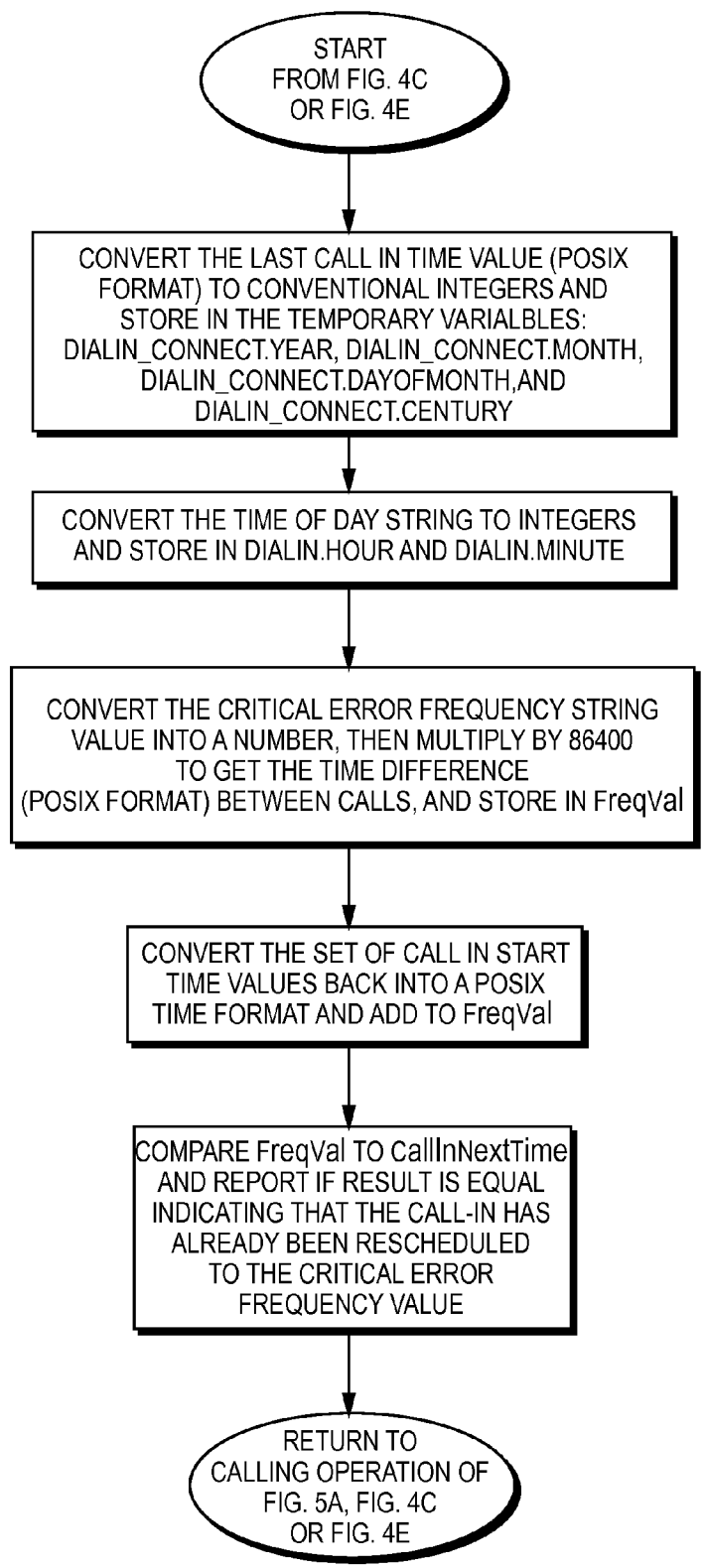
FIG. 5F is a high level flow diagram illustrating the operation performed by the home site device for determining if a call-in has been rescheduled to the critical error frequency.
Figure 5G:
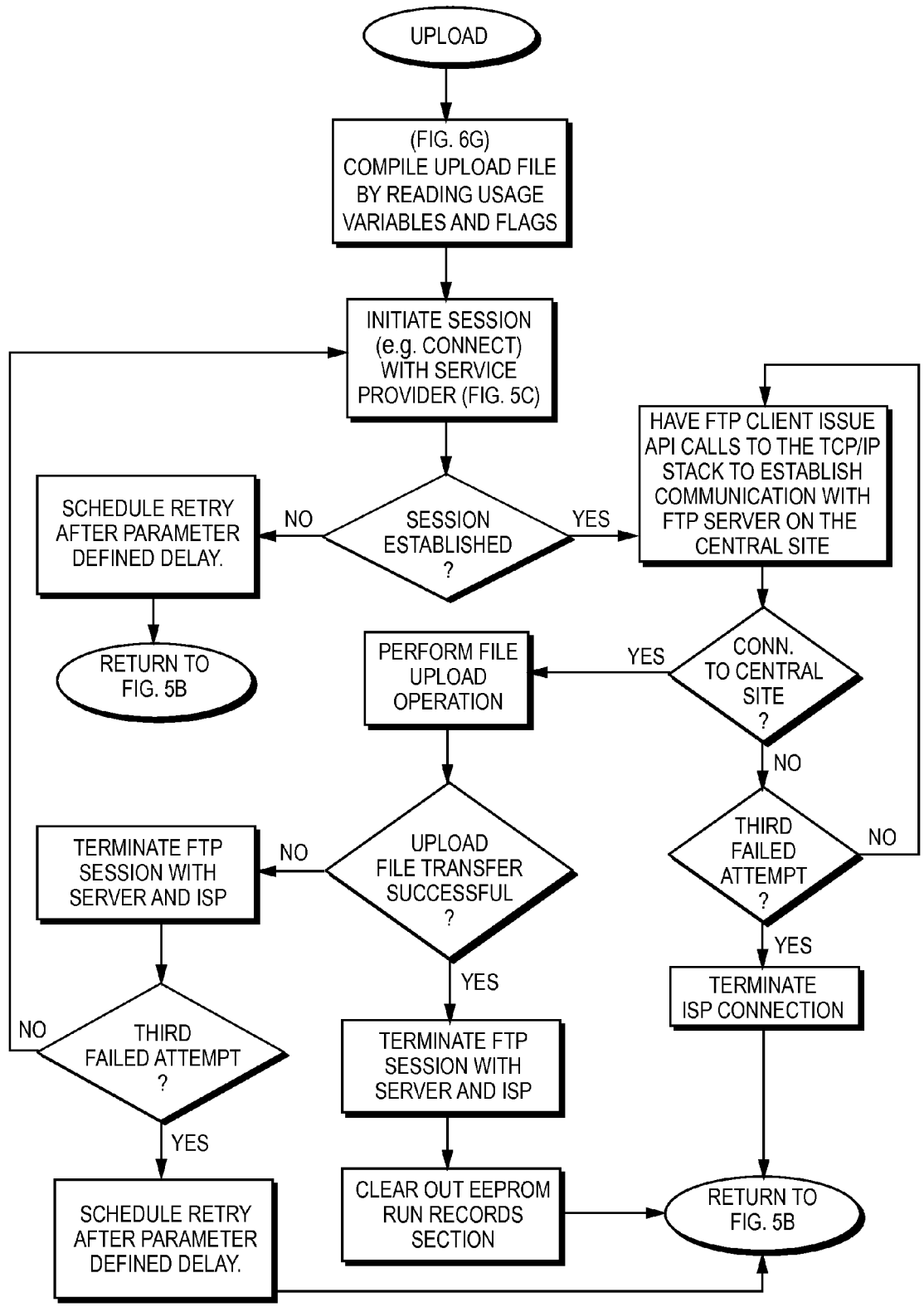
FIG. 5G is a high level flow diagram illustrating in greater detail, the upload operation performed by the home site device upload function module component of FIG. 2K as part of the main loop of FIG. 5A.

FIG. 5G Upload Operation of Main Loop of FIG. 5A

Following completion of the download operation of FIG. 5D, the microprocessor module component 120 returns to FIG. 5B and next performs an upload operation utilizing upload file module component 208 as described in greater detail herein. The component 208 performs the upload operations of FIG. 5G as indicated in main loop operations of FIG. 5B. As indicated in FIG. 5G, the microprocessor module component 120 compiles the upload file by reading usage variables and flags wherein it first parses the run record logs produced by the home site device 12 during its monitoring operations and uses the recorded information to compute the amount of fuel usage. The microprocessor module component 120 carries out these operations by performing the sequence of operations indicated in FIG. 6G.

FIG. 6G

In greater detail, as indicated in FIG. 6G, the microprocessor module component 120 searches the run log to find the first run record having a date after the new delivery date and time stored in the EEPROM memory module component 135. It then sums the total run time by parsing all run records after the new delivery date and stores the total run time in its local memory variable called TotalRunTime_Sum. Next, as indicated in FIG. 6G, the microprocessor module component 120 sums the number of run starts by counting all run records after the new delivery date and time and stores the result in its local memory variable location called NewDlvryRunTime.

An alternative way to performing this operation is to allocate local memory variables to store runtime results such as gallons burned, total starts and total run time sum since last delivery. After powering on the device, the microprocessor can be programmed to parse the run records in EEPROM to find the total starts, total run time sum and gallons burned since last delivery and store the results in the local memory variables the programmer defined. Every time a burner run cycle is detected and the computed fuel usage is determined, a write to EEPROM memory is performed to store the run record. Before or after the write to EEPROM, the programmer can then sum the result using the appropriate local variables. Then these local memory variables can be used to build the upload file instead of parsing the records stored in EEPROM memory if no new delivery was reported. These variables would be set to zero if all of the run records were deleted which is the case where there is a full system reset caused by holding down the test button for longer then 10 secs. If a new delivery was detected, the microprocessor as described above parses the run records in EEPROM memory, determines the total run time sum, starts and gallons burned since the new delivery and stores the results using the local memory variables as a way to initialize the local memory variables for use in subsequent burn cycle detection operations Next, the microprocessor module component 120 computes the fuel usage for the total number of run records since last delivery by taking the value stored in the variable TotalRunTime_Sum and multiplying that by the BURN_Coef and dividing the result by 60 which converts the result into hours. The result is then rounded off to the nearest and stored in the local memory location GalsUsed. The microprocessor component 120 also updates the Gallons Left value by subtracting the computed GalsUsed value from the tank size value stored in EEPROM memory component 150. Lastly, the microprocessor component 120 updates the state of the "Low Fuel" flag based on the result of comparing the Gallons Left and Low Fuel threshold values.

As indicated in FIG. 6G, the microprocessor module component 120 then builds an upload record by converting the following items to text strings: the call-in reason code(s), the average motor current, the number of starts (Starts) since last delivery, the total run time (Runtime) since last delivery, the computed gallons used value (GalsUsed) since last delivery, the burner lockout detection flag, the low fuel flag, the high motor current flag, in addition to the status of select system flags, the upload filename and the burn coefficient value (BURN_Coef). This file is formatted as shown in APPENDIX A. Upon the completing the upload file build operation, the microprocessor module component 120 returns to FIG. 5G. As indicated in upload operation of FIG. 5G, the microprocessor component 120 initiates a session with the ISP by performing the operations of FIG. 5C. In the manner discussed in connection with the download operation of FIG. 5D, when the session with the ISP has been established, the microprocessor component 120 utilizes the FTP client component 200F to establish a connection with the central site system FTP server 200.

Upon establishing a FTP connection with the central site system 20 server, the microprocessor module component 120 sends FTP commands enabling it to upload the upload file to the central system site 200 server in the assigned name directory. Following completion of a successful FTP transfer, the microprocessor module component 120 terminates its connection and clears out the EEPROM memory module component 135 run record locations as indicated in FIG. 5G. As in the case of the download operation, when a connection is not established, the microprocessor component 120 again has the FITP client component 200F issue API calls to the TCP/IP stack control to establish communication with the central site system 20 server. After a third failed attempt, the microprocessor component 120 terminates the ISP connection as indicated in FIG. 5G. Similarly, when in the Upload File transfer is not successful, the microprocessor component 120 terminates the FTP Session with the central site system 20 server and ISP after which it then repeats the same operations as indicated in FIG. 5G. After a third failed attempt, to complete a successful Upload File transfer operation, the microprocessor component 120 then reschedules a retry after a parameter defined delay This completes the operations of FIG. 5G. As indicated, the microprocessor component 120 then returns to FIG. 5B. As indicated in FIG. 5B, the microprocessor module component 120 next performs the scheduling operations of FIG. 5E.

FIG. 5E Schedule Next Call-in Operation of Main Loop of FIG. 5A

Following the completion of the upload operation, the microprocessor component 120 next computes the next scheduled call in time as indicated in FIG. 5A. The microprocessor module component 120 performs this computation by carrying out the sequence of operations shown in FIG. 5E. As shown, the microprocessor module component 120 converts the last call in time value (POSIX format) into conventional integer values. It stores the converted values in the following the local memory temporary variable locations: Dialin.year; Dialin.month; Dialin.DayOfMonth; and Dialin.Century.

Next, module component 120 converts the time of day string value obtained from the real time clock module component 132 into integer values and stores the results in local memory temporary variable locations Dialin.hour and Dialin.minute.

As shown in FIG. 5E, the microprocessor module component 120 converts each call in frequency string value into a number, then multiplies the value by 86400 to obtain the time difference (POSIX format) between calls and then stores the resulting value in the local memory variable location FreqVal. Next, the microprocessor module component 120 converts the set of Dialin time values back into a POSIX time format and adds the result to the local memory variable FreqVal. The microprocessor module component 120 verifies that the date value is valid and then returns the value for storage in the CallInNextTime or CallInCutoffTime locations of EEPROM component 135. Completion of these operations causes the microprocessor component 120 to return to executing the main loop operations of FIG. 5B.

As indicated in FIG. 5E, the same sequence of operations is also used to reschedule the next call-in to use the Critical Error Frequency value when called during the execution of the run event detection operations of FIG. 4C-FIG.4D and FIG. 4E (i.e. when the microprocessor component 120 detects the occurrence of a Lockout, Run_Records_Full or Low Fuel condition or a thermal switch condition). This sequence of operations is only executed when a determination is made that the next call-in time has not been rescheduled to use the Critical Error Frequency value. The microprocessor component 120 makes this determination by performing the sequence of operations of FIG. 5F. As discussed herein, this sequence of operations is similar to those of FIG. 5E. During this sequence, microprocessor component 120 compares the Critical Frequency value (FreqVal) to the next call-in time for determining if the next call in time has already been scheduled to the Critical Frequency value.

If it has been so scheduled, the microprocessor component 120 reports the result as equal (e.g. sets an appropriate indicator) indicating that the next call-in time has been rescheduled to the Critical Error Frequency value. This causes a return to FIG. 4C or FIG. 4D as described herein whereupon the microprocessor component 120 continues executing the run detection operations of FIG. 4C or FIG. 4E. If the microprocessor component 120 does not report the result as being equal, this causes microprocessor component 120 to execute the sequence of operations of FIG. 5E to reschedule the next call-in to use the Critical Error Frequency value. Considering the operations of FIG. 5F in greater detail, it is seen that microprocessor component 120 converts the last call-in time value (POSIX format) into conventional integer values. It stores the converted values into the indicated local memory temporary variable locations. Next, the microprocessor component 120 converts the time of day string value obtained from the real time clock module component 132 into integer values and stores the result in the indicated local memory temporary variable locations. As shown, the microprocessor component 120 converts the critical error frequency string value into a number, then multiplies the value by 86400 to obtain the time difference (POSIX format) between calls and then stores the value in the local memory variable location FreqVal. Next, the microprocessor component 120 converts the set of call start time values back into a POSIX time format and adds the result to the local memory variable location FreqVal. As discussed above, the microprocessor component 120 then compares the FreqVal location contents to the Call In Next Time value. If they are determined to be equal, the microprocessor component 120 reports the result indicating that the call-in time has been already rescheduled to the Critical Error Frequency value. This causes the microprocessor component 120 to return to executing the operations of FIG. 4C or FIG. 4E as previously discussed.

One Minute Monitoring Operations of Main Loop of FIG. 5B

As shown in FIG. 5B, when the one minute flag is set, the microprocessor component 120 begins executing the monitoring operations of FIG. 4E. As indicated in FIG. 4E, the microprocessor component 120 first performs the thermal monitoring task operations of FIG. 4F. Referring to FIG. 4F, it is seen that the microprocessor component 120 reads or samples the state of the thermal switch input applied from the thermal sensor 130 to the control input circuits module 128 of FIG. 2B. If the microprocessor component 120 detects the temp contacts input that is provided by the control circuits module 128 are closed, microprocessor component 120 sets the temp switch closure flag indicator. This flag when set, indicates that the temperature of the home site has fallen below the established temperature threshold since the time that the last upload operation was performed. This flag indication is used in generating the Low Temp status message (LoTemp) when the upload record is built. That is, if the flag has been set, the microprocessor component 120 adds the message string "LoTemp" to the upload record. If the flag is not set, the microprocessor component 120 instead adds a "zero" to the upload record file. After completing the operations of FIG. 4F, the microprocessor component 120 returns to continue executing the operations of FIG. 4E.

Next, as shown the microprocessor component 120 tests the state of the temp closure flag indicator to determine if it has been set. If it has been set, the microprocessor component 120 resets the flag indicator and sets the call now flag for causing the execution of the connection sequence in FIG. 5C. Also, the microprocessor component 120 determines if the next call-in has been scheduled to use the critical frequency value (i.e. FIG. 5F) and reschedules it when it has not been so scheduled (i.e. FIG. 5E).

As indicated in FIG. 4E, the microprocessor component 120 next checks for the occurrence of a heating system lockout condition by executing the operations of FIG. 4G. Referring to FIG. 4G, it is seen that the microprocessor component 120 first checks if the heating system is running. This is determined by checking the current input sampled by the current sensor 132 of FIG. 2J that is provided as an input to the microprocessor component 120 by the control input circuits module 128. If the microprocessor component 120 detects that the heating system is running (i.e. current is sensed), the microprocessor component 120 clears the System Lock-out flag indicator and then returns to FIG. 4E.

When the microprocessor component 120 detects that the heating system is not running (i.e. no current being sensed), the microprocessor component 120 accesses the runlog of EEPROM component 135. It then checks the last time that the heating system was running (i.e. specified in the last run log entry recorded during the execution of the operations of FIG. 4D). Next, the microprocessor component 120 determines if the heating system has been running for more than 60 minutes. If it has not been running for more than 60 minutes, this causes the microprocessor component 120 to return to FIG. 4E.

As indicated in FIG. 4G, if the heating system has been running for more than 60 minutes, the microprocessor component 120 reads the duration of time recorded in the last run entry. As shown, it the last run time duration was not greater than 30 seconds or the lockout flag indicator is not set, the microprocessor component 120 sets the System Lock out flag to notify the central site system 20 that the heating system has prematurely stopped (i.e. no longer running). This flag indication is used in generating the lockout message when the upload record is built as described above. Also, the microprocessor component 120 sets the call now flag for causing the execution of the connection sequence in FIG. 5C. As shown, upon completing the operations of FIG. 4G, the microprocessor component 120 then returns to complete executing the operations of FIG. 4E. Also, as indicated in FIG. 4G, it is seen that when the microprocessor component 120 determines that the last run was greater than seconds or that the Lock out flag is set, it returns to executing the operations of FIG. 4E.

As illustrated in FIG. 5B, the microprocessor component 120, continues executing the sequence of operations of the main loop in the manner described above. As a result of the repeated execution of the operations of the main loop of FIG. 5B and in particular, the recalibration operation of FIG. 6F, causes the BURN_Coef value to change over time so as to become synchronized with the actual amount of fuel delivered included in the delivery data as discussed. These changes will now be discussed in greater detail with reference to FIG. 8.

FIG. 8

Figure 8:
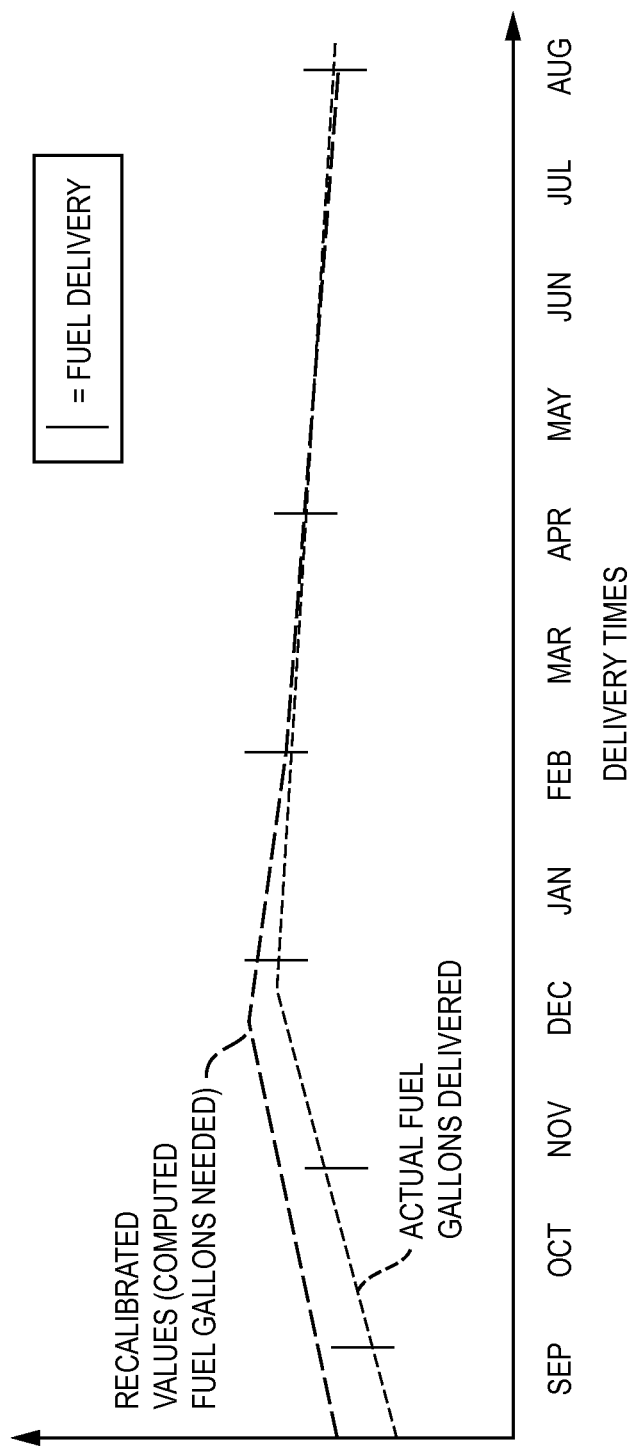
FIG. 8 is a diagram illustrating the results obtained from recalibrating the home site monitor device operation with actual delivery data resulting in increased accuracy over time in accordance with the teachings of the present invention.

Before discussing FIG. 8, it may be useful to discuss how the BURN_Coef value Br can change over time relative to each effective BURN_Coef value Br. When there is noise in the delivery fill-up event in that the value jumps up and down; and that over time, due to changes in the heating system, the value Br is caused to increase slightly (e.g. Dirty Nozzle). More importantly, over time, the BURN_Coef value Bf adjusts to a new average. Thus, over a period of time, the BURN_Coef value Bf is able to be adjusted to a new average and that it is able to rejects "noise" in the system indicated by the jumping up and down of the coefficient value when it is computed from the most recent delivery fill-up operation.

Thus, the home site device 20 is able to operate more accurately by performing the recalibration operation described above in computing the BURN_Coef value that defines the actual burn rate of the heating system. In other words, this coefficient value is the constant in gallons/hour that when initially computed, is subsequently utilized in performing all subsequent burn computations performed in determining how much fuel is being used during each burn operation and for computing fuel usage. The burn coefficient value is adjusted or recalibrated after each delivery fill-up operation takes place utilizing actual delivery data indicating the actual amount of fuel delivered to the home site that was downloaded by the home site device 12 from the central site system 20 server.

As described herein, the central site system uses the BURN_Coef information computed by the home site device 12 for more accurately determining or predicting how much fuel a heating system is expected to use. This improves efficiency in optimizing fuel delivery scheduling/routing and in determining fuel delivery amounts. This results in conserving energy (e.g. reduces routing times and resources) over approaches that solely rely on using degree days calculations.

Summarizing the above operations of the home site device 12, it is seen that each call in operation results in downloading via an FTP transfer, the records of the previously built text file containing initialization parameters or other parameter values from the central site system FTP server 200 to device 12. During the initialization process, the home site device 12 processes an initialization text file that it down loaded from the central site system 20. The home site monitor device 12 performs any required conversions and writes the above-discussed Internet, configuration and control parameters contained in the file into the appropriate areas of the home site device's EEPROM memory component 135 of FIG. 3. As previously discussed, the parameter information enables the home site device 12 to communicate with the central site system 20 in the manner described. Each download operation is followed by an upload operation. That is, using parameter information contained in the initialization text file (e.g. Internet Server Parameters), the home site monitor device 12 performs a FTP transfer operation in which it uploads data record files back to the central site system FTP server 200 component. In the case where device 12 has just been initialized, the uploaded record information derived from the EEPROM component 135 only includes records containing zeros since the device 12 has not been operational. In the case where the device 12 has been operating over a period of time with downloaded initialization parameters, the uploaded information includes records derived from the processed information area of the EEPROM component 135. As previously discussed, this sequence of download and upload operations is periodically performed at the time intervals specified in the schedule parameter information contained in the previously stored initialization file information.

Detailed Description of operation of Central Site System 20

With reference to FIGS. 1A-1C, 4A, 5C, 9 and 10, the operation of the central site system 20 will now be described in greater detail with particular reference to FIG. 1C-FIG. 1F. As discussed relative to FIG. 4A, the central site system FTP server 200 in response to a call in from the home site monitor device 12 generated in response to the depression of the home site monitor device 12's call button of FIG. 2A. As discussed, the device 12 performs a download operation in which it down loads a file containing initialization parameters obtained from the FTP server 200.

Prior to this taking place, as previously discussed, the central site system 20 performs an initialization operation. That is, the Initialize/Reinitialize module 206A of the MONITOR1.EXE process running on the application server 200 component accesses the Params Table of FIG. 1F of the database 203 component using the home site device 12 serial number as a key. The module 206A creates a text file with a "txt" file extension that is identified by using the device 12 serial number as the file name. This text file is then placed on the FTP server 200 component by the module 206A for retrieval by the device 12 during a download operation as previously described. The sequence for performing these operations is as follows:

1. Start Program;
2. Display monitor device's parameters on Input Screen to operator;
3. Enter monitor device's Serial number;
4. Check for device's Parameters in Database (Monitor.mdf/ Params Table);
5. If Parameters exist in database 203 then retrieve them;
6. If the parameters do not exist in database 203 then read the default values from INITALIZE.CONF file (a template containing the specific fields to be used);
7. Display default parameters to operator;
8. Enter/Edit Parameters furnished by operator into the template;
9. Save parameters in database 203;
10. Write parameters out to file (designated by serialnumber.txt); and
11. Send serialnumber.txt file to FTP Server 200 for retrieval by the home site device.

As indicated in item 6 when the parameters do not exist in database 203, the module 206A fills in specific fields of a template that is used in generating the screen of FIG. 9. The module 206A reads data from the initialization file INITIAL-IZE.CONF into the fields of the template that was previously created using information obtained from file records initially provided by the home site monitor device 12. The central site system operator enters into the database 203 component via web server 208, those parameters that are unique to the particular home site device 12. As discussed above, such parameters include information such as pre purge and post purge and initial burn coefficient values. As previously discussed, an initial burn coefficient parameter value is generated by combining the heating system's nozzle coefficient and the pump pressure (PSI) values in the manner previously described. The specific formatting and structures of the data contained in these records are described in a general setup section of APPENDIX A included herein along with examples of the format and the construction of the initialization files.

As briefly discussed, FIG. 9 is a representation of an initialization display screen used to initialize the home site monitor device in addition to updating or changing any of the parameters being utilized by the home site device. As seen from FIG. 9, the display screen representation includes a number of different sections such as: a general account information section; Primary and Secondary ISP information section; a heating system information section; a Timing and Control Information section; a Programmable Call In information section; and, A Delivery/Inventory information section arranged as shown. As indicated in FIG. 9, these sections are used to display, enter and update the indicated information in the format shown. For a further description of the various fields displayed, reference may be made to Appendix A.

Also, as indicated in FIG. 9, the initialization display screen representation includes a status box that is used to display status of the initialization process as performed by the central site system such as: Connecting to the FTP server; Sending an Initialization File to the FTP server; Notification that a File was sent successfully or a Failure Notification, Disconnecting from the FTP server or Process Complete. The status conditions are derived in a conventional manner by detecting the completion of various commands generated by the application server monitor program component. Additionally, the initialization display screen further includes a "Decommission this monitor device" button which when enabled, causes the central site system server monitor program component to send a command to the home site device that will render it unusable. For a further description of this command, reference may be made to Appendix A.

During the download operation, the central site system FTP server 200 transfers the series of records accessed by the home site device 12 which the device uses to update as required the previously provided configuration and control parameters contained in the initialization file discussed above. After completing the download operation, the device 12 performs an upload operation in which it transfers a file of uploaded records containing the record types previously discussed herein shown in APPENDIX A. This records file upon being received by the central site system FTP server 200 causes it to enter an entry for the file into a directory identified by the serial number assigned to the home site monitor device 12. The FTP server 200 then writes the file into the area of memory assigned to the home site monitor device 12.

Monitor1Exe Component Module 206C Operations

The Monitor Devices Module 206C and in particular the file process module 206C-1 continuously parses through the FTP server directory looking for entries identifying files received from the home site monitor devices 12. The module 206C-1 upon finding a home site device entry, it locates/accesses it, reads the identified file and logs the data into the SQL database 203 component. As previously discussed, the Monitor Devices Module 206C in particular, the decode module 206C-2 decodes the file contents and the update database/delete module 206C-3 uses the decoded contents to update the appropriate device 12 locations of monitoring table and monitoring_index table of FIG. 1F and upon completion of the operation deletes the file from FTP server 200. Next, the monitor devices module 206C in particular the process alerts module 206C-4 processes alerts as described herein in connection with FIG. 1D. To perform the above operations, the monitor devices module 206C executes the following sequence of operations:

Loop: Parse FTP Server for files
    File found
    Retrieve file from FTP Server
    Open File
    Read File
    Decode File Contents
    Update Database (Monitor.mdf/Monitoring Table & Monitoring_Index Table)
    Delete File From Ftp Server
    Process Alerts & Email Alerts
    Go to Loop.

In decoding the file contents, the decode module 206-2 executes the following sequence of operations:
    If Record='FILEN'
    a. Get File Name
1. If Record="System_Data' record (i.e. record type):
    a. Get 'Average Motor Current'
    b. Get 'Current Gallons Used Since Last Delivery'
    c. Get 'Total Run Time (minutes)'
    d. Get 'Total Number Of Starts'
2. If Record="CALL" (i.e. record type)
    a. Check for 'Normal Frequency
    If 'True' no alert set
    b. Check for 'Critical Frequency'
    If 'True' set 'Critical' flag
    c. Check for '100 Gallons Used (G100)
    If 'True' set '100 Gallons Used' flag
    d. Check for 'Programmable Gallons Used'
    If 'True' set 'Programmable Gallons-Used Level' flag e. Check for 'Pushbutton Pressed'
  If 'true' set 'Pushbutton Pressed' flag
3. If Record="STAT" (i.e. record type)
  a. Check for "System In Reset"
  If 'True' set 'System In Reset' Flag
  b. Check for 'Low Fuel'
  If 'True' set "Low Fuel"flag
  c. Check for 'High Current'
  If 'True' set 'High Current' Flag
  d. Check for 'Low Temp'
  If 'True' set 'Low Temp' Flag
  e. Check for 'Run Records Log Full'
  If 'True' set 'Run Records Log Full' Flag
4. If Record="COEFF" (i.e. record type)
  a. Get 'BURN Coefficient'

The Monitor1.exe component of application server 206 then processes various alert conditions and the status information. The web server 208 continuously reads the data records stored in the SQL database 203 via the file server 202. Both the web server 208 and the process alerts module 206C-4 analyze the contents of the data records for the presence of alert condition information.

FIG. 1D illustrates in greater detail, the functions/operations performed by process alerts module 206C of FIG. 1C. As indicated, the module obtains the current status record index for each home site device 12 from the monitoring_index table of FIG. 1F. Using this index information, module 206C-4 retrieves the actual monitoring record from the monitoring table. In the case where an alert is found (exists), the module 206C-4 obtains the alert type (i.e. Low Fuel, Low Temp, High Current etc.) from the monitoring table and then uses the alert type information to read the appropriate recipients information from the recipients table of FIG. 1F. The module 206C-4 then sends both the recipients and alert information to the email module 206C-5.

The web server 208 reads and displays to the user, device monitor 12 information and any alerts it receives from the SQL database 203. The web server 208 presents a number of monitor operations on screens displayed by display unit 210 as discussed herein.

The web server 208 reads the monitoring table of FIG. 1F of database 203 and then displays Status according to user chosen options. Additionally, the web server 208 is programmed to display the different types of alerts in various colors (e.g. critical alerts in red, non-critical alerts in yellow and normal operating conditions in green). An example of the type of information displayed is illustrated by the graphical display screen representations shown in FIGS. 10A and 10B. As shown in greater detail, FIG. 10A is a display screen representation illustrating one of four user chosen view options that include: a "Show Low Fuel" option, a "Show All Critical or Show All Non Critical" option, a "Show Resets" option and a "Show Low Temp" option. The options are displayed as buttons on the screen and are selected by simply clicking on the particular button with a mouse or similar input device. It will be noted that In the case of the "Show All Critical or Show All Non Critical" option, the different option are selectable by this single button that functions as a "toggle" switch. More specifically, when the user wants to view all of the critical alerts, selection of this button results in the display representation shown in FIG. 10A wherein the button will display the option "Show All Non Critical" as indicated. When the user selects the same button to view all non critical alerts, this results in the display screen representation shown in FIG. 10B wherein the button now displays the option "Show All Critical" as indicated. This arrangement enables the user to quickly switch between displaying critical and non critical alert status. As indicated above, the normal, non critical and critical status is displayed in "Green", "Yellow" and "Red" respectively as represented in FIGS. 10A and 10B.

As also indicated in FIGS. 10A and 10B, selecting the different display options produces the following:

1. Show All Critical: displays the status of all devices that have any critical flags set to a true state indicative of a critical alert condition, the critical flags include Low Temp (LoTemp), Low Fuel (LoFuel), Reset (RESET) and Lock Out (Lockout).

2. Show All Non Critical displays the status of all devices that have any non critical flags set to a true state indicative of a non critical alert, the critical flags include Push Button Pressed (PBut), 100 Gals Used (G100), Run Record Full (Run_Record_Full).

3. Show Low Fuel displays only the status of devices that have the Low Fuel Status (LoFuel) flag set to a true state.

4. Show All displays the status of every device that is being monitored by the central site system and all their status fields whether indicating critical or non critical status.

5. Show Resets displays the status of only the devices that are in reset mode (RESET).

6. Show Low Temp displays the status of only the devices that have the Low Temp (LoTemp) flag set to a true state.

The email module 206C-5 receives the new Recipients and Alert Type(s) information from the process alerts module 206C-4. Upon receipt of a new alert message, module 206C-5 performs the functions/operations of FIG. 1C. As indicated, the module saves the alert and recipient information in the Email_Alert Table of database 203 shown in FIG. 1F. Also, the module gets a new alert_message number generated during the save operation. Next, the module generates an alert email message to be subsequently sent to the named recipient via the Email Server SMTP link connection. The email message is generated to have the following message format:

Format Message:
To: recipient email address
Fr: monitor@company.com
Subject: Alert #Alert_Message_Number
Body:
  'Monitor_Status Number'
  Alert Type (e.g. Low Fuel)
  Acct#
  Name
  Address
  Phone#
  Monitor device S/N.

Next, the module 206C-5 checks for message acknowledgments. This function is carried out by a module that operates as a standard email reader. This module is an email reader that continuously scans incoming email for a 'Subject' field containing 'Alert #'. This field indicates that it is an email response from an alert email message. The module performs its operations by executing the following sequence of operations:

1. Continuously read the 'Subject' line for incoming email
2. If 'Subject' line contains 'Alert #' then extract the Alert_Message_Number
3. Access the Email_Alerts Table for the specified Alert_Message_Number
4. Update the 'Acknowledge' field of the table entry.

If an acknowledgement is received, the module updates the Email_Alerts Table (sets acknowledged indicator) and updates the monitoring table to include the date and time of acknowledgement. If no acknowledgement was received, the module 206C-5 waits a pre-established interval of 30 minutes and then returns to the send message function as indicated in FIG. 1C.

Monitor2.Exe Component Operations

As previously discussed, the Delivery Computation Module 206D of FIG. 1C operates to continuously look for requests being sent to and received from the "Generic Systems" via the FTP server interface to the generic system via the communications module of the facility or remote company site 24.

During operation, the generic system sends a text file (Tanks.txt) listing the home site devices for which it is requesting a return file of K-Factor, Gallons and routing information. The tanks.txt file is basically a file that lists all the customer sites that have a home monitor device attached to their heating system that allows the central site system 20 to process only user accounts that actually have home site monitoring devices installed. Each record provided is formatted to include device serial number, latitude and longitude. If routing information is not requested then the latitude and longitude fields of the record are left blank. Also, the generic system creates a text file (Delivs.txt) having the following structure:

Monitor Device Serial Number, Delivery_Date, Delivery_Time, Tank_full. (The Delivs.txt file contains the most recent delivery information for the particular home site device)

The following is an example of Delivs.txt text file:
00000123010,2007/04/20,10:00,0100.50,F.

The module 206D performs the following sequence of operations:
1. Receive & Read Delivs.txt File
2. For each Monitor Device Serial Number update the most recent delivery information by writing the data into the Deliveries table of the database.
3. Then for each home site monitor device listed in the file (Tanks.txt)
   a. Get most current Delivery record from Deliveries Table: (Field(1) Date_of Most_Current_Delivery
   b. Get zip code for the device
   c. Get Current Degree Day for the Zip Code (from Degree_Day_Log Table)
   d. Get Degree Day of Most Current Delivery for the Zip Code (from Degree_Day_Log Table)
      Get most recent BURN_Coef from Monitoring Table (Updated via Monitor1.exe above)
   e. Compute Degree Day Interval defined as:
      Degree Day Interval=Current Degree Day–Degree Day of Most Current Delivery.
   f. Create a computed K-Factor defined as:
      Computed K-Factor=Degree Day Interval divided by (GalsUsed) Gallons Used Since Last Delivery.

A more precise K-Factor is able to be computed using the knowledge of the actual gallons used since last delivery (GalsUsed). In normal degree day computations the gallons used is an estimate based on the heating system k-factor of the previous delivery)

g. Verify Gallons Used From Home Site Device as follows:

Computed Gallons Used=(Run time/60)*Calibrated BURN_Coef value(from home site device 12).

Wherein Run Time is the Total Run Time (in minutes) since Last Delivery (See Appendix A: RunTime)

As indicated in FIG. 1C, the Routing Computation Module 206E receives a list containing the results of all of the computed K-Factors for all of the home site devices from the delivery computation module 206D. The module 206E reads through the previously discussed Tanks.txt file or list and creates an optimized route based on need) using the previously discussed standard optimization software product such as Microsoft Mappoint's route optimization API. Again, by knowing the actual gallons used provided by each of the home site monitoring devices 12, the central site system 20 is able to compute a very accurate K-Factor. This accurate K-Factor is used to compute a heating system's fuel "need" defined as Degree Day Interval divided by K-Factor. Reference may be made to the Glossary for a further discussion of these terms.

In greater detail, a heating system with a fuel requirement or "need" less than 'X' gallons would not be included or excluded by the routing module. It is assumed that management personnel would establish the threshold values for 'X' to be used by the routing module which is usually dependent upon the time of year. For example: in the colder season X may be made to equal 125 gallons and in the warmer seasons X may equal 95 gallons. During the colder months, delivery companies are generally busier and can not afford the additional overhead of making smaller than optimal fuel deliveries. Before generating the list of home sites to which fuel deliveries are to be made, the routing module will prompt the user (e.g. Usually the dispatcher) via the user interface of display unit 210 for the 'X' Value to be used in determining which home site heating systems are to be excluded. Fore example, the display user interface will generate the prompt: "Enter The Minimum Need (in Gallons) to be considered by Routing Module". The module 206F using these results then computes the distance from one account home site location to another as follows:

Compute route using Standard Distance Computation:

$$z1=69.1*(\text{latitude Of Account2}-\text{latitude Of Account1})$$

$$z2=69.1*(\text{longitude Of Account2}-\text{longitude Of Account1})*\text{Cos}(\text{latitude Of Account1}/57.3)$$

$$\text{distance}=\text{Sqr}((z1*z1)+(z2*z2)).$$

Next module 206F builds a new file (Tanks2.txt)—for each home site device 12 record (in order of the optimized route) containing the following information:
Average motor current
Current gallons used since last delivery
Total run time in minutes
Total number of starts
Burn Coefficient
Alerts
Computed K-Factor
Computed Gallons Burned
Accurately estimated Gallons to be delivered
Distance to next delivery stop The module 206F sends Tanks2.txt to the FTP Server 200 for retrieval by the Communications Module (i.e. Monitor-Comm-Comm3 Module).

The uniqueness of the above described process is that it uses the actual gallons used (Gallons Used Since Last Delivery) values provided by the home site device 12 in performing the degree day computation. This is contrast to the prior art performance of degree day and K-Factor computations where the actual gallons used is unknown and therefore, it constitutes only a best guess estimate. Additionally, the process is able to make an accurate verification of the Gallons Burned using the recalibrated BURN_Coef value obtained from the home site device 12.

From this process, the central site system 20 is able to accurately determine the fuel usage of each home site and therefore is able to more accurately schedule fuel amounts and deliveries. This both conserves energy and ensures that timely deliveries are made to home sites.

GLOSSARY

A number of terms used in the descriptions and drawing figures are described herein for ease of understanding and reference.

1. Gallons_Accum (floating point value):
   (a) This value is incremented with the number of gallons delivered parameter provided in a download file operation.
   (b) This value is decremented by the Gallons_Used_Sum variable that is updated in the compute fuel usage.
   (c) This value is used to set the Gallons_Left value.

2. Gallons_Left (Floating Point Value):
   (a) This value is set equal to the Gallons_Accum value in response to each new delivery (i.e. represents a running total number of gallons of fuel remaining in the tank at any given time). It is initialized to the number of gallons delivered on the first download delivery record.
   (b) This value is decremented at the end of each run by the number of gallons used (Gallons Used) during that run, as computed using the current burn coefficient value. When there is run time (fuel consumption) occurring between the download operation and the last fill-up delivery times (or the system resets and must re-initialize the GallonsLeft variable), the run time since the last fill-up delivery is added up by reading all run records stored since the time of that delivery fill-up. The fuel consumption since that last delivery fill-up is then computed using the current burn coefficient value. As a final step, the computed fuel consumption is then subtracted from the tank size value to produce the GallonsLeft variable. Additionally, when a run concludes and the fuel usage computations are performed, the fuel usage for that particular run is deducted from the GallonsLeft variable.
   (c) This value is read to detect a low fuel condition.

3. Gallons_Used_Sum (floating point value that includes fractions of a gallon):
   (a) This value is set to zero after the end of an upload operation when the run log is cleared and when the local memory is initialized.
   (b) This value is set on reboot operation to include the number of gallons used since the last delivery by parsing the run log.
   (c) This value incremented at the end of each run by the number of gallons used during that run as computed based on the current burn coefficient value.
   (d) This value is used to report the number of gallons used during an upload operation if no new delivery is detected.

5. GalsUsed is a value that is the same as the Gallons_Used_Sum rounded to the nearest gallon for reporting purposes.

6. TotalRunTime_Sum (UINT16 value):
   (a) This value is set to zero after end of an upload operations when the run log is cleared and when the local memory is initialized.
   (b) This value is set on reboot operation to include the number of gallons used since the last delivery by parsing the run log.
   (c) This value is incremented at the end of each run by the number of gallons used during that run computed based on the current burn coefficient value.
   (d) This value is used to report the number of gallons used during an upload operation.

7. RUNLOG_record count value is equivalent to the sum of the total run times obtained by parsing all run records from the run log. The value is stored in the local memory variable TotalRunTime_Sum.

8. FTP commands used to download and upload a file are the five listed below. These commands are transmitted over the FTP control Socket except where otherwise noted. The file itself is transmitted over the FTP data socket. The commands include the following:
   a. CMD=this command is used to change the working directory. This command is used by the home site to order the central site system to change to the specified UPLOAD or DOWNLOAD directory.
   b. PASV=this command tells the central site system to enter passive mode and to tell the home site which data port to transfer data on. This command is used when a data socket is opened on the port that the central site system server requested in response to the PASV command.
   c. RETR=this command orders the central site system server to send the file to the home site device 12. That is, this command is used to download a file. The file is sent over the data socket at this time. The control socket is continuously checked by the device 12 for receipt of a transfer complete code which is "226". The home site device 12 will then terminate the data socket via An API call to the TCP stack control.
   d. STOR=this command orders the central site system server to get ready to receive a file from the home site device 12. That is, this command is used to upload a file. The file is sent over the data socket at this time. Once the home site device 12 completes the file transfer it will terminate the data socket via an API call to the TCP stack control. The central site system server will detect the disconnect from the data socket by the home site device 12 and send a response over the FTP control socket that it has completed execution of the command to store the file.
   e. QUIT=this is the FTP quit command used to log off the central site system server. The device 12 issues this command and then closes the FTP control socket via an API call to the TCP stack control.

9. Generic System: Refers to a back office computer system that is used for the day to day business aspects of company. I.E. A heating company that delivers fuel would have a computer system that tracks degree days, calculates K-Factors and estimates deliver consumption/schedules.

10. Degree Day: a unit used to measure how cold it has been over a 24 hour period. The base temperature for Degree-Day calculations is 65 degrees Fahrenheit. The daily average temperature is compared to the 65 degree base temperature. If the average temperature is lower, the difference is the number of Degree-Days for that day. For example, if the average temperature for a 24 hour period was 30 degrees (F) then 65−30=35 degree days for the day (referred to herein as Daily Degree Day).

11. K-Factor: is a burning rateanalogous to miles per gallon. Relating to fuel usage, a home site customer's K-factor is the number of Degree-Days that it takes for a given heating system associated with a given tank to use one gallon of fuel. For example, a K-Factor of 6 means that the heating system burns 1 gallon of fuel every 6 degree days.

12. Degree Day Interval: K-Factor*Ideal Delivery. For example the Degree Day Interval for an ideal delivery of 150 and a K-Factor of 6-is: 150*6=900. This means that for every 900 degree days that pass this particular heating system would take an estimated delivery of 150 gallons of fuel.

13. Cumulative Degree Day is defined as: The sum of Daily Degree Days beginning on a "zero" reference date such as from zero on August 31$^{st}$. An example of computing cumulative degree day values is:

| Date | Daily Degree Day | Cumulative Degree Day |
|---|---|---|
| Aug. 31, 2010 | 0 | 0 |
| Sept. 1, 2010 | 6 | 6 |
| Sept. 2, 2010 | 10 | 16 |
| Sept. 3, 2010 | 8 | 24 and |
| Sept. 4, 2011 | 6 | 30 |

14. Ideal Delivery: The amount of fuel to deliver without risking having a heating system run out of fuel, and without having to deliver fuel too early and without having to deliver only a small amount of fuel. Usually in the case of a heating system with a 275 gallon tank, the ideal delivery amount is set between 150 and 180 gallons.

15. Standard Degree Day Computation:

a. Get number of Cumulative Degree Days since last delivery=Today's Cumulative Degree Day reading (minus) the Cumulative Degree Day reading of the heating system's last delivery.

b. compute/check a heating system's Degree Day interval (Ideal Delivery*K-Factor)

c. If the result from Step a is greater than or equal to the result from step b then the heating system needs a delivery of fuel.

16. Delivery need=defined as Today's computed Cumulative Degree Day value (DD2) minus the computed Cumulative degree day of the last delivery for the heating system (DD1)) divided by the K-factor (K) which results in the expression:

$$\text{Delivery need}=\text{Gallons To Be Delivered}=(DD2-DD1)/K.$$

An example of computing delivery need is as follows:
If today's Cumulative degree day is 1000 and Customer Mr. Smith's last delivery was completed on a computed value for Cumulative Degree Day of 100 and Mr. Smith's K-Factor is 6 then, the computed delivery need for Mr. Smith is: (1000−100)/6=150 and therefore, Mr. Smith's heating system tank requires that a delivery of 150 gallons of fuel be made today. Of course it will be appreciated that this computation would be done in advance using estimated degree days/temperatures obtained from advanced weather forecasting resources.

APPENDIX A

I. Initialization File Example

For an initialization file, all records are required to be present for proper initialization of the Home Site Monitor Device 12. Once a Home site Monitor Device 12 has been initialized, the subsequent downloaded files will contain only the records that have been changed, in particular the delivery (DLV) record described herein containing data indicating the occurrence of a new delivery that the device needs for updating or recalibrating its operation. Other records such as the burn parameters (BURNP) record will rarely be changed during normal operation since the Home Site Monitor Device 12 will be recalibrating the burn coefficient value (BURN_Coef) included therein. Accordingly, not all records need to be present in normal downloaded files following initialization.

A. Example of Initialization template file:
INITIALIZE.CONF:
DLV:2011/04/30,12:32,0100,F
TIME:01:00,05:00
FREQ:05,02
ISP1#:D,18001234567
ISP1U:user@sp.net
ISP1P: ********
ISP2#:D,18004441234
ISP2U:user2@isp.net
ISP2P:********
FTP1N:216.66.23.7
FTPU: ftpuser
FTPP: ********
FTP2N:216.68.101.99
DNDIR:DOWNLOAD
UPDIR:UPLOAD
BURNP: 1.00,50,50
FILEN:000000000001
TANKP:0275,0040
HICUR:0200
CIFI: 75
COEF: 0.57

B. Example of Unique Data Parameters Added by the User:

| Monitor serial number (S/N) | Tank Size | Call In Start Time |
|---|---|---|
| | Nozzle GPH | Call In End Time |
| Date Installed | Pre Purge | Normal Frequency |
| Account# | Post Purge | Critical Error Frequency |
| Last Name | PSI | Last Delivery Date |
| Street Address | Low Fuel Level | Last Delivery Time |
| City | High Current | Initial Inventory (amount of fuel in tank) |
| State | | |
| Zip | | Tank Full Y/N |

The data is saved in a text file. The text file is named/identified using the home site device monitor Serial Number as the file name. For example, if the home site device monitor serial number is 15 then the file name is 00000000015.txt. The file is then saved in a storage area of the FITP server 200 waiting to be downloaded by the Home Site Monitor Device 12. When the Home Site Monitor Device 12 logs onto the central site system FTP server 200, it determines if a file has been stored for the device's serial number and downloads the file for processing by the Home Site Monitor Device 12.

C. Example of finalized Initialization text file 0000000015.txt.:
DLV:2011/5/26,10:00,0155,F
TIME:01:00,05:00
FREQ:05,02
ISP1#:D,18001234567
ISP1U:user@isp.net
ISPIP: ********
ISP2#:D,18004441234
ISP2U:user2@isp.net
ISP2P:********
FTP1N:216.66.23.7
FTPU: ftpuser
FTPP: ********
FTP2N:216.68.101.99
DNDIR:DOWNLOAD
UPDIR:UPLOAD
BURNP: 1.08,50,50
FILEN:000000000015
TANKP:0275,0040
HICUR:0200
CIFI: 75

D. Example of a delivery file (Download)
00000000003.TXT
DLV:2011/5/31,9:40,0195,F
FILEN:00000000003.txt
(May 31, 2011 at 9:40 am delivered 195 gallons which filled the tank)
E. Example of an upload file (from Home Site Device)
00000000003.TXT
CALL:GPROG (Programmable Gallons Used)
SYSDA:00168,00189,34549,07052 (Average Current, Gallons Used Since Last Delivery
STAT:0,LoFuel,HiCur,0,0
 FILEN:00000000003.txt
Explanation:
CALL:GPROG
(Call Reason: Programmable Gallons Used)
SYSDA:00168,00225,34549,07052
(Average Current, Gallons Used Since Last Delivery, Runtime minutes, number of starts)
STAT:0,LoFuel,HiCur,0,0
(Not In Reset, Low Fuel, High Current detected, temp ok, not locked out)
FILEN:00000000003.txt II. General Information Parameters for Home Site Device A. Download Record Specifics The following information defines specific record types and record data fields. All parameters are limited in character length. Most parameters are maximum character length. This is shown in the structure field for each record type. The record type is given in the specified example of each structure. Please note the example below. Example: The Delivery Gallons maximum parameter is seven characters long and has to be seven characters long. If gallons delivered value is only 100.01 gallons, the parameter is filled in as follows: 0100.01. For each parameter that requires the maximum character length to be filled in and where is not enough data, zeros are added to complete the absent data just as in the case of Delivery Gallons parameter. The largest file size for downloading can not exceed 400 bytes.

General Setup Information

1. Delivery information:
This record provides the Home Site Monitor Device 12 information required to update the present tank level, and to recompute the fuel burn use coefficient.
 Structure:
 DeliveryID: Delivery_Date, Delivery_Time, Delivery_Gallons, Tank_Full_Flag
 Delivery_Date maximum size is 10 characters and has to be 10 characters long
 Delivery_Time maximum size is 5 characters and has to be 5 characters long
 Delivery Gallons maximum size is 7 characters and has to be 7 charters long
 Tank_Full_Flag maximum size is 1 characters
 Example of record type DLB:
 DLV:2006/08/04,13:12,0100.23,F
Notes:
 1 If multiple deliveries have taken place, multiple records may be present.
 2. The Home Site Monitor Device 12 will ignore multiple records with the same Delivery Date.

2. Timing Control:
This record provides the Home Site Monitor Device 12 with information that defines a call window during which time period the device 12 can make a call to the central site system 20 server.
 Structure:
 Time_Control_ID: Call In_Start_Time, Call In_End_Time
 Call_In_Start_Time maximum size is 5 characters and has to be 5 characters long
 Call_In_End_Time maximum size is 5 characters and has to be 5 characters long
 Example of record type TIME:
 TIME:01:00,05:00
Note: The start and end times define the earliest and latest times that a Home Site Monitor Device 12 will attempt to initially connect with the FTP server 200.

3. Access Frequency Control:
This record provides the Home Site Monitor Device 12 with information required to determine how frequently to access the FTP server 200. There are two frequencies used, one for normal accesses and another higher frequency for reporting critical alert conditions.
 Structure:
 Frequency_Control_ID: Normal_Frequency, Critical_Error_Frequency
 Normal_Frequency maximum size is 2 characters and has to be 2 characters long
 Critical_Error_Frequency maximum size is 2 characters and has to be 2 characters long
 Example of record type FREQ
 FREQ:05,01
Note: Frequency is in day (24 hour) units (0-99 days).

Primary ISP Access Information for Dial-Up Operations

4. Primary ISP Access Phone Number:
This record provides the Home Site Monitor Device 12 with information required to dial the Primary ISP access point.
 Structure:
 ISP1_Phone_ID: ISP1_Phone_Mode, ISP1_Phone_Number
 ISP1_Phone_Mode maximum size is 1 characters
 ISP1_Phone_Number maximum size is 15 characters
 Example of record type ISP#1:
 ISP #:D,15084781234
 Note: Mode is D for DTMF, P for Pulse dialing 5. Primary ISP User Name:
This record provides the Home Site Monitor Device 12 with information required to logon to the Primary ISP access point.
 Structure:
 ISP1_User_ID: ISP1_User
 ISP1_User maximum size is 15 characters
 Example of record type ISP1U
 ISP1U:smith 6. Primary ISP Access Password:
This record provides the Home Site Monitor Device 12 with information required to logon to the Primary ISP access point.
 Structure:
 ISP1_Password_ID: ISP1_Password
 ISP1_Password maximum size is 10 characters
 Example of record type ISP1P
 ISP1P:smith314159

Secondary ISP Access for Dial-Up Operations

7. Secondary ISP Access Phone Number:
This record provides the Home Site Monitor Device 12 with information required to dial the Secondary ISP access point.
Structure:
ISP2_Phone_ID: ISP2_Phone_Mode, ISP2_Phone_Number
ISP2_Phone_Mode maximum size is 1 characters
ISP2_Phone_Number maximum size is 15 characters
Example of record type ISP2#
ISP2#: D, 15084781234
Note: Mode is D for DTMF, P for Pulse dialing
8. Secondary ISP User Name:
This record provides the Home Site Monitor Device 12 with information required to logon to the Primary ISP access point.
Structure:
ISP2_User_ID: ISP2_User
ISP2_User maximum size is 15 characters
Example of record type ISP2U:
ISP2U: smith
9. Secondary ISP Access Password:
This record provides the Home Site Monitor Device 12 with information required to logon to the Secondary ISP access point.
Structure:
ISP2_Password_ID: ISP2_Password
ISP2_Password maximum size is 11 characters
Example of record type ISP2P
ISP2P:smith314159

Primary FTP Site Access

10. Primary FTP Access IP:
This record provides the Home Site Monitor Device 12 with the IP Address required to access the Primary FTP host server 200.
Structure:
FTP1_IP ID: FTP1_IP
FTP1_IP maximum size is 15 characters
Example of record type FTP1N
FTP1N:101.102.145.099
11. FTP Access Host User Name:
This record provides the Home Site Monitor Device 12 with the "User ID" required to access the FTP host server.
Structure:
FTP_User_ID: FTP_Name
FTP_Name maximum size is 15 characters
Example of record type FTPU
FTPU: smithtech
12. FTP Host Password:
This record provides the Home Site Monitor Device 12 with the "Password" required to logon to the FTP Host server 200.
Structure:
FTP_Password_ID: FTP_Password
FTP_Password maximum size is 11 characters
Example of record type FTPP
FTPP:smith 1234

Secondary FTP Site Access

13. Secondary FTP Access IP:
This record provides the Home Site Monitor Device 12 with the IP Address required to access the Secondary FTP host server 200.
Structure:
FTP2_IP ID: FTP2_IP
FTP2_IP maximum size is 15 characters
Example of record type FTP2N
FTP2N: 101.102.145.099

FUEL BURNER PARAMETERS

14. Burner Parameters:
This record provides the Home Site Monitor Device 12 with information required for computing fuel usage using the burn coefficient in gallons/hour and pre and post purge times in seconds.
Structure:
BURN_PARMS: BURN_Coef, BURN_Pre, BURN_Post
BURN_Coef maximum size is 4 characters and has to be 4 characters long
BURN_Pre maximum size is 3 characters and has to be 3 characters long
BURN_Post maximum size is 3 characters and has to be 3 characters long
Example of record type BURNP
BURNP:0.57,010,030
15. File Name:
This record provides the Home Site Monitor Device 12 with the file name for the next download operation. It is typically the Home Site Monitor Device 12 serial number.
Structure:
FILENAME: FileName
FileName maximum size is 15 characters
Example of record type FILEN:
FILEN:0000001.txt
16. Tank Size/Low Fuel Threshold:
This record provides the Home Site Monitor Device 12 with the tanks size and low fuel threshold for the next download operation.
Structure:
TANKP: TankSize, LowFuel
TankSize maximum size is 4 characters and has to be 4 characters long
LowFuel maximum size is 4 characters and has to be 4 characters long
Example of record type TANKP
TANKP:0275,0040
17. Hi Current Threshold:
This record provides the Home Site Monitor Device 12 with the heating system 14 motor hi current threshold for the next download operation.
Structure:
HICUR: HiCur
HiCur maximum size is 4 characters and has to be 4 characters long
Example of record type HICUR
HICUR:0200.
18. Programmable Call in Fuel Used Level:
This record provides the Home Site Monitor Device 12 with fuel used call in threshold for the next download operation.
Structure:
CiFuel: CIFI
CIFI maximum size is 4 characters and has to be 4 characters long
Example of record type CIFI
CIFI:0160
The Programmable Fuel threshold value is loaded in to the CallInFuel variable (CIFI) stored in the microprocessor's local memory. The GallonsProgUsedSum variable functions as an accumulator in that every time fuel is burned, that value is added to GallonsProgUsedSum variable and checked against the value of the CallInFuel variable (CIFI). Once the threshold is met, the GallonsProgUsedSum value is cleared to zero.

The FuelUsedStatic value is a pre-established constant in code that never is changed. It is used to determine if GallonStaticSum accumulator value is greater than the constant FuelUsedStatic value. If it is greater, the G100 flag indicator is set and the GallonStaticSum accumulator is cleared to zero. The GallonStaticSum is updated In the same way as GallonsProgUsedSum value. Every time fuel is burned that value is added to GallonStaticSum value and the value is cleared once the threshold is met.

19. Programmable Download Directory

This record provides the Home Site Monitor Device 12 with the directory name to be used for the next download operation to store the file.

Structure:
DNDIR: Directory Name
Directory Name maximum size is 10 characters
Example of record type DNDIR
DNDIR: DOWNLOAD 20. Decommissioning Command:

This record commands the Home Site Monitor Device 12 to put itself out of commission. Upon interpreting this command, the Home Site Monitor Device 12 will proceed to erase all of the downloaded run parameters, the entire run log accumulated and the program memory (at least until the Home Site Monitor Device 12 reaches its own erasure function at the end of the program space). This command will render the Home Site Monitor Device 12 incapable of performing any operation and will be required to be returned for reprogramming.

Structure:
DECOMM
Example of record type DECOMM:
DECOMM.

B. Upload Record Types

In general, the following record types and structures are used for the transfer of the following information from the Home Site Monitor Device 12 to the central site system FTP server 200. As in the case of download records, all parameters are limited in character length. Most parameters need to be maximum character length. This is shown in the structure field for each record type. The record type is given in the specified example of each structure.

1. Run Data:
Average motor current (AvgCurrent)
Computed gallons used (GalsUsed) since last delivery
Total run time in minutes (Runtime) since last delivery (Does Not Include Pre & Post parameter values)
Total number of starts (Starts) since last delivery
Structure:
SYSTEM_DATA:AvgCurrent, GalsUsed, Runtime, Starts
AvgCurrent maximum size is 5 characters and will always be 5 characters long.
GalsUsed maximum size is 5 characters and will always be 5 characters long.
Runtime maximum size is 5 characters and will always be 5 characters long.
Example of record type SYSDA:
SYSDA: 00168,00189,34549,07052

2. Call In Reason: (Reason why device called in)
Normal frequency="NFreq"
Critical frequency="CFreq"
100 Gallons Used="G100"
Programmable Gallons Used="GProg"
Pushbutton was pressed="Pbut".
RUNLOG Run_Records_Full="RFull.

Structure:
CALL: Call In Reason
Call in Reason maximum size is 5 characters
Example of record type CALL
CALL:NFreq 3. Status Data: (Error Codes)
System is in "reset mode" "RESET"
System is low on fuel "LoFuel"
System Motor is High Current "HiCur"
Low Temp detected "LoTemp"
System Lockout detected "Lockout"

The status data of all codes are sent with each upload. If a status code is not true, a '0' is sent in its place.

Structure:
STATUS: Mode, Low Fuel, Hi Current, Low Temp
Example of record type STAT::
STAT:RESET,LoFuel,0,0

4. File Name:

The File name is also uploaded in the form of data. This is the same file name as the download file name.

Structure:
FILENAME: FileName
FileName maximum size is 15 characters
Example of record type FILEN
FILEN:0000001.txt 5. Burner Coefficient:

The burner coefficient value is also uploaded in the form of data. This value is the new computed burner coefficient that the Home Site Monitor Device 12 uses to compute fuel usage.

Structure:
COEF: BURN_Coef.
BURN_Coef maximum size is 4 characters and has to be 4 characters in length.
Example of record type COEFF:
COEF: 0.57.

III. Communications Module Implementation

The communications module includes the following components.

A. A communication directory, referenced below, is a shared directory accessible by both the "Generic System" and the system (computer) that runs the communications module software. The path for the directory is stored in a configurable file 'xcomm.conf' that resides in the same directory path as the communications module (MonitorComm1.exe).

B. Comm1 Module scans or searches the shared communication directory for "Delivs.txt" files each of which contains delivery data of a delivery that has been made that it to be sent to the Home Site Monitor Device 12 for recalibrating its operations. When a file is found, it is sent to the central site system's FTP server 200 to be processed by the deliveries module 206E of the Monitor1.exe component. This operation is carried out by performing the following sequence of operations:

1. Open xcomm.conf (to access the shared communication directory for storing and retrieving files)
2. Retrieve 'Communication Directory' (i.e. \\server\monitor)
3. Loop:
   a. Check if Delivs.txt exists in 'Communication Directory';
   b. If file exists
      Get file from 'Communication Directory'
      Send File To Central Site System 20
   c. Go To Loop C. The Comm2 Module scans or searches the shared communication directory for 'Tanks.txt' files indicating that a request has been made for home site device tank inventory list. When a file is found, the Comm2 Module sends the file to the central site system's FTP server 200 to be processed by the Delivery Computation Module 206F of the Monitor2.exe component. This operation is carried out by performing the following sequence of operations:

1. Open xcomm.conf (to access the shared communication directory for storing and retrieving files)
2. Retrieve 'Communication Directory' (i.e. \\server\monitor)
3. Loop:
   a. Check if Tanks.txt entry exists in 'Communication Directory'
   b. If file exists
      (1) Get file from 'Communication Directory'
      (2) Send File To Central Site System
   c. Go To Loop D. The Comm3 Module performs the following sequence of operations:
1. retrieve 'Communication Directory' (i.e. \\server\monitor)
2. Loop:
   a. Check if Tanks2.txt exists on the FTP Server
   b. If file exists
      (1) Get file from FTP Server
      (2) Store file (Tanks2.txt) in the 'Communication Directory'
   c. Go To Loop It will be noted that once a 'Tanks2.txt' file entry exists in the Communications Directory' is can be used by a company dispatcher as needed.

E. Xcomm.conf is a configuration file used to indicate the shared communication directory that is to be shared by both the "generic system" and the system (computer) that runs the communications module. The file has only one record:
Communication Directory.
Example: S:\Monitors or \\Server\Monitor This invention has been disclosed in terms of an illustrated embodiment. However, it will be apparent that many modifications can be made to the disclosed apparatus without departing from the invention. Therefore, it is the intent of the appended claims to cover all such variations and modifications as come within the true spirit and scope of this invention.

What is claimed is:

1. A low cost self-calibrating home site monitor device for use in a system employing a number of monitor devices, each monitor device being coupled to a heating system operated by fuel for accurately computing fuel usage of said heating system, each self-calibrating home site monitor device comprising:

(a) a current sensor circuit component coupled to a motor of said heating system operated by fuel for detecting motor current to be used in computing burn times;
(b) a real time clock component used for measuring run time durations of fuel heating system burn times;
(c) a microprocessor operatively coupled to the current sensor circuit and to the real time clock unit;
(d) a memory operatively coupled to the microprocessor for storing burn pre-purge and burn post-purge parameters, and fuel usage rate parameters including an initial burn coefficient and recalibrated burn coefficients;
(e) said microprocessor being operative to compute said initial burn coefficient using parameters of said home site heating system including nozzle size, pump pressure and nozzle pressure to compute burn times periodically using real time intervals when the heating system is operating, and said burn pre-purge and burn post-purge parameters, and to determine fuel usage using total burn times occurring between two successive fuel deliveries and said recalibrated burn coefficient for the rate of fuel usage value;
(f) in response to each receipt of delivery time data, said microprocessor being operative to recalibrate the burn coefficient using said delivery time data, which includes an actual amount of fuel required to fill up a fuel tank of said heating system, so as to provide a high degree of accuracy over time in determining actual fuel usage by the heating system to enable efficient scheduling of fuel deliveries; and
(g) communication interface circuits coupled to the microprocessor for enabling said home site monitor device to establish two way communication for downloading files containing initialization data, said delivery time data, and any change in heating system parameters and for uploading files containing records including recalibrated burn coefficients for the rate of fuel usage values, and most recent fuel usage computed by said microprocessor since a last fuel delivery.

2. The fuel monitor device of claim 1 wherein repeated updating of the recalibrated burn coefficient for the rate of fuel usage value upon each receipt of delivery time data over time increases accuracy in computing the actual fuel usage being expended by the fuel heating system.

3. The fuel monitor device of claim 1 wherein the microprocessor upon detecting that a predetermined current threshold has been exceeded by the current sensor circuit component being operative to activate the real time clock unit and record a start time and a present time of day value, each time that the predetermined current threshold is exceeded and the microprocessor being operative upon detecting that the current falls below the predetermined current threshold following the start time, to produce a record including an elapsed time value obtained from the real time clock unit, the elapsed time value corresponding to a run time duration used to compute the burn times and fuel usage, the record being written into a run time log area of the memory.

4. The fuel monitor device of claim 1 wherein the delivery time data comprises delivery date information, delivery time data, delivery gallons data and tank full flag data indicating a fuel fill-up operation.

5. The fuel monitor device of claim 1 wherein the memory further includes an area that stores timing control information for defining earliest and latest times that the monitor device attempts to initially connect with a remote central site system for uploading fuel usage information in addition to access frequency control information required for determining how frequently to access the remote central site system.

6. The fuel monitor device of claim 4 wherein the memory further includes a second storage area allocated for storing record information to be used in a next download operation, the record information including file name, fuel tank size, low fuel threshold, high current threshold, and programmable call in fuel used level threshold.

7. The fuel monitor device of claim 2 wherein the fuel usage results uploaded to a remote central site system includee run data containing average motor current, gallons used since last delivery, total run time and total number of starts, call in reason data and status data.

* * * * *